United States Patent
Agiwal et al.

(10) Patent No.: US 12,388,513 B2
(45) Date of Patent: Aug. 12, 2025

(54) METHOD AND APPARATUS FOR RADIO LINK FAILURE REPORTING IN WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR); Jaehyuk Jang, Suwon-si (KR); Mangesh Abhimanyu Ingale, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/923,084

(22) PCT Filed: Apr. 30, 2021

(86) PCT No.: PCT/KR2021/005496
§ 371 (c)(1),
(2) Date: Nov. 3, 2022

(87) PCT Pub. No.: WO2021/230544
PCT Pub. Date: Nov. 18, 2021

(65) Prior Publication Data
US 2023/0156819 A1    May 18, 2023

Related U.S. Application Data

(60) Provisional application No. 63/088,625, filed on Oct. 7, 2020, provisional application No. 63/029,630, filed
(Continued)

(51) Int. Cl.
*H04W 74/0833*     (2024.01)
*H04B 7/06*     (2006.01)
(Continued)

(52) U.S. Cl.
CPC ....... *H04W 74/0841* (2013.01); *H04W 76/19* (2018.02)

(58) Field of Classification Search
CPC . H04W 74/0841; H04W 76/19; H04W 76/15; H04W 24/08; H04W 16/28;
(Continued)

(56) References Cited

U.S. PATENT DOCUMENTS

2019/0245737 A1   8/2019   Zhou et al.
2019/0253949 A1   8/2019   Park et al.
(Continued)

FOREIGN PATENT DOCUMENTS

KR   10-2019-0098692 A   8/2019
KR   10-2020-0031186 A   3/2020
(Continued)

OTHER PUBLICATIONS

Ericsson, Capturing RRC Positioning Impacts after RAN2-109bis, R2-2003880, 3GPP TSG-RAN WG2 Meeting # 109bis-e, Electronic, May 11, 2020.
(Continued)

*Primary Examiner* — Harry H Kim
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides method and apparatus for RLF reporting.

11 Claims, 31 Drawing Sheets

Related U.S. Application Data on May 25, 2020, provisional application No. 62/704,506, filed on May 13, 2020, provisional application No. 63/023,417, filed on May 12, 2020.

(51) Int. Cl.
| | |
|---|---|
| *H04L 5/00* | (2006.01) |
| *H04W 16/28* | (2009.01) |
| *H04W 24/08* | (2009.01) |
| *H04W 24/10* | (2009.01) |
| *H04W 76/15* | (2018.01) |
| *H04W 76/19* | (2018.01) |

(58) Field of Classification Search
CPC ............ H04W 24/10; H04W 74/0833; H04B 7/0695; H04L 5/001
See application file for complete search history.

(56) References Cited

U.S. PATENT DOCUMENTS

| | | | |
|---|---|---|---|
| 2019/0306842 A1 | 10/2019 | Cirik et al. | |
| 2020/0053557 A1 | 2/2020 | Agiwal et al. | |
| 2020/0137821 A1* | 4/2020 | Cirik | H04W 72/1268 |
| 2020/0413457 A1 | 12/2020 | Hong | |
| 2022/0191961 A1* | 6/2022 | Qiu | H04B 7/0695 |
| 2022/0217785 A1* | 7/2022 | Jia | H04L 5/0023 |
| 2023/0053871 A1* | 2/2023 | Tran | H04B 7/0408 |

FOREIGN PATENT DOCUMENTS

| | | |
|---|---|---|
| WO | 2011/113371 A1 | 9/2011 |
| WO | 2019/154272 A1 | 8/2019 |
| WO | 2020/047080 A1 | 3/2020 |

OTHER PUBLICATIONS

Huawei, Connection failure due to mobility, R3-192959, 3GPP TSG-RAN3 Meeting #104, Reno, Nevada, US, May 4, 2019.
CATT et al., Beam recovery and RLF, R2-1711770, 3GPP TSG-RAN WG2 Meeting #99, Berlin, Germany, Oct. 8, 2017.
Ericsson, CR on the beam recovery impact and BWP impact on RLF triggering, R2-1805442, 3GPP TSG-WG2 Meeting #10 bis Sanya, P.R. China, Apr. 5, 2018.
Ericsson, Open issues related to the RLF report, R2-1915434, 3GPP TSG-RAN W62 #108, Reno, Nov. 7, 2019.
European Search Report dated May 26, 2023, issued in European Patent Application No. 21805096.1.
Samsung, Corrections to RA Report: [S480] [S481] [S482] [S483] [S484] [S485], 3GPP Draft; R2-2002562, 3GPP TSG-RAN2 Meeting #109bis Electronic, Apr. 9, 2020, XP052353558.
Huawei et al., RLF with beam failure recovery, R2-1803249, 3GPP TSG-RAN2 Meeting #101, Mar. 2, 2018.
Qualcomm Incorporated, Discussion of RLF caused by beam failure recovery, R2-1805201, 3GPP TSG-RAN WG2 Meeting #101bis, Apr. 20, 2018.
Nokia et al., Impact of Beam Failure Recovery on RLF Related Actions, R2-1804924, 3GPP TSG-RAN WG2 Meeting #101bis, Apr. 20, 2018.
European Office Action dated Mar. 18, 2025, issued in European Patent Application No. 21805096.1.
Chinese Office Action dated May 15, 2025, issued in Chinese Patent Application No. 202180034102.3.

* cited by examiner

FIG. 7

```
RACH-ConfigDedicated ::=        SEQUENCE {
    cfra-TwoStep-r16            CFRA-2STEP
}

CFRA-2STEP ::=                  SEQUENCE {
occasions                       SEQUENCE {
        rach-ConfigGeneric2step             RACH-ConfigGeneric,
        ssb-perRACH-Occasion    ENUMERATED  {oneEighth, oneFourth, oneHalf, one, two, four, eight, sixteen}
                                OPTIONAL    -- Cond SSB-CFRA
    }
msgA-PUSCH-Resource-CFRA        MsgA-PUSCH-Resource-r16 msgA-SSB-sharedRO-MaskIndex-r16             INTEGER  (1..15)

resources                       CHOICE {
    ssb                         SEQUENCE {
        ssb-ResourceList            SEQUENCE (SIZE(1..maxRA-SSB-Resources)) OF CFRA-SSB-Resource,
        ra-ssb-OccasionMaskIndex    INTEGER  (0..15)
    },
    csirs                       SEQUENCE {
        csirs-ResourceList          SEQUENCE (SIZE(1..maxRA-CSIRS-Resources)) OF CFRA-CSIRS-Resource,
        rsrp-ThresholdCSI-RS        RSRP-Range
    }
},
}

CFRA-SSB-Resource ::=           SEQUENCE {
    ssb                         SSB-Index,
    ra-PreambleIndex            INTEGER (0..63),
    msgA-PUSCH-Occasion-Index   PUSCH-Occasion-Index    OPTIONAL
    msgA-DMRS-Occasion-Index-r16    INTEGER (0..Y)      OPTIONAL
    ...
}
CFRA-CSIRS-Resource ::=         SEQUENCE {
    csi-RS                      CSI-RS-Index,
    ra-OccasionList             SEQUENCE (SIZE(1..maxRA-OccasionsPerCSIRS)) OF INTEGER (0..maxRA-Occasions-1),
    ra-PreambleIndex            INTEGER (0..63),
    msgA-PUSCH-Occasion-Index   PUSCH-Occasion-Index    OPTIONAL
    msgA-DMRS-Occasion-Index-r16    INTEGER (0..Y)      OPTIONAL
    ...
}

PUSCH-Occasion-Index ::=                    INTEGER (0..X),

-- TAG-RACH-CONFIGDEDICATED-STOP
-- ASN1STO
```

FIG. 9

```
RACH-ConfigDedicated ::=           SEQUENCE {
    cfra-TwoStep-r16                   CFRA-2STEP
}
CFRA-2STEP ::=                     SEQUENCE { occasions                          SEQUENCE {
    rach-ConfigGeneric2step            RACH-ConfigGeneric,
    ssb-perRACH-Occasion               ENUMERATED {oneEighth, oneFourth, oneHalf, one, two, four, eight, sixteen}
                                       OPTIONAL    -- Cond SSB-CFRA
} msgA-PUSCH-Resource-CFRA           MsgA-PUSCH-Resource-r16 msgA-SSB-sharedRO-MaskIndex-r16            INTEGER (1..15)

resources                          CHOICE {
    ssb                                SEQUENCE {
        ssb-ResourceList                   SEQUENCE (SIZE(1..maxRA-SSB-Resources)) OF CFRA-SSB-Resource,
        ra-ssb-OccasionMaskIndex           INTEGER (0..15)
    },
    csirs                              SEQUENCE {
        csirs-ResourceList                 SEQUENCE (SIZE(1..maxRA-CSIRS-Resources)) OF CFRA-CSIRS-Resource,
        rsrp-ThresholdCSI-RS               RSRP-Range
    }
},
}

CFRA-SSB-Resource ::=              SEQUENCE {
    ssb                                SSB-Index,
    ra-PreambleIndex                   INTEGER (0..63),
    msgA-PUSCH-Resource-Index          PUSCH-Occasion-Index    OPTIONAL
    ...
}

CFRA-CSIRS-Resource ::=            SEQUENCE {
    csi-RS                             CSI-RS-Index,
    ra-OccasionList                    SEQUENCE (SIZE(1..maxRA-OccasionsPerCSIRS)) OF INTEGER (0..maxRA-Occasions-1),
    ra-PreambleIndex                   INTEGER (0..63),
    msgA-PUSCH-Resource-Index          PUSCH-Resource-Index OPTIONAL
    ...
}

PUSCH-Resource-Index ::=                   INTEGER (0..X),

-- TAG-RACH-CONFIGDEDICATED-STOP
-- ASN1STOP
```

METHOD AND APPARATUS FOR RADIO LINK FAILURE REPORTING IN WIRELESS COMMUNICATION SYSTEM

TECHNICAL FIELD

The disclosure relates to a wireless communication system. Specifically, the disclosure relates to an apparatus, a method and a system for radio link failure (RLF) reporting, beam failure recovery of secondary cell, contention free random access resource signaling, and system information block 1 (SIB1) processing in wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window super-position coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, there are needs to enhance RLF reporting, beam failure recovery of secondary cell, contention free random access resource signaling, and system information block 1 (SIB1) processing procedures for wireless communication system.

DISCLOSURE OF INVENTION

Technical Problem

There are needs to enhance RLF reporting, beam failure recovery of secondary cell, contention free random access resource signaling, and system information block 1 (SIB1) processing procedures for wireless communication system.

Solution to Problem

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method comprises: identifying that a radio link failure is detected based on a random access problem indication obtained from a lower layer for a random access procedure; identifying whether the random access procedure was initiated for beam failure recovery; generating radio link failure cause information based on the identification, for a report of the radio link failure; and transmitting, to a base station, the report of the radio link failure.

In accordance with another aspect of the disclosure, a method performed by a base station is provided. The method comprises: performing a random access procedure with a terminal; and receiving, from the terminal, a report of a radio link failure, wherein the radio link failure is detected based on a random access problem indication from a lower layer for the random access procedure, and wherein radio link failure cause information is generated for the report of the radio link failure, based on an identification on whether the random access procedure was initiated for beam failure recovery or not.

In accordance with another aspect of the disclosure, a terminal is provided. The terminal comprises a transceiver configured to transmit and receive a signal; and a controller coupled with the transceiver and configured to: a transceiver configured to transmit and receive a signal; and a controller configured to: identify that a radio link failure is detected based on a random access problem indication obtained from a lower layer for a random access procedure, identify whether the random access procedure was initiated for beam failure recovery, generate radio link failure cause information based on the identification, for a report of the radio link failure, and transmit, to a base station, the report of the radio link failure.

In accordance with another aspect of the disclosure, a base station is provided. The base station comprises a transceiver configured to transmit and receive a signal; and a controller coupled with the transceiver and configured to: a transceiver configured to transmit and receive a signal; and a controller configured to: perform a random access procedure with a terminal, and receive, from the terminal, a report of a radio link failure, wherein the radio link failure is detected based on a random access problem indication from a lower layer for the random access procedure, and wherein radio link failure cause information is generated for the report of the radio link failure, based on an identification on whether the random access procedure was initiated for beam failure recovery or not.

Advantageous Effects of Invention

According to various embodiments of the disclosure, RLF reporting, beam failure recovery of secondary cell, contention free random access resource signaling, and system information block 1 (SIB1) processing procedures can be efficiently enhanced.

BRIEF DESCRIPTION OF DRAWINGS

The above and other aspects, features, and advantages of certain embodiments of the disclosure will be more apparent from the following description taken in conjunction with the accompanying drawings, in which:

FIG. 7 illustrates an example of random access channel (RACH) configuration in accordance with an embodiment of the disclosure.

FIG. 9 illustrates an example of random access channel configuration in accordance with an embodiment of the disclosure.

Throughout the drawings, like reference numerals will be understood to refer to like parts, components, and structures.

MODE FOR THE INVENTION

Figure 1:
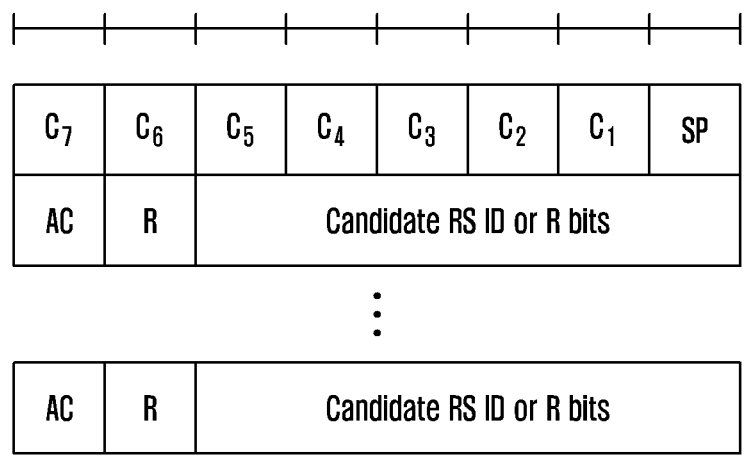
FIG. 1 illustrates a medium access control (MAC) control element (CE) structure in accordance with an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control (RRC) connected (RRC_CONNECTED) is configured to utilise radio resources provided by two distinct schedulers, located in two different nodes connected via a non-ideal backhaul and providing either Evolved Universal Mobile Telecommunications System (UMTS) Terrestrial Radio Access (E-UTRA (i.e. if the node is an ng-eNB)) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the primary cell (PCell) and optionally one or more secondary cells (SCells). In NR the term Secondary Cell Group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, node B (gNB) or base station in cell broadcast Synchronization Signal and Physical Broadcast Channel (PBCH) block (i.e., SSB) consists of primary synchronization signal (PSS) and secondary synchronization signal (SSS) and system information. System information includes common parameters needed to communicate in cell. In the fifth generation wireless communication system (also referred as next generation radio or NR), System Information (SI) is divided into the master information block (MIB) and a number of system information blocks (SIBs) where:

the MIB is always transmitted on the PBCH with a periodicity of 80 ms and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message.

In the fifth generation wireless communication system, Physical Downlink Control Channel (PDCCH) is used to schedule downlink (DL) transmissions on Physical Downlink Shared Channel (PDSCH) and uplink (UL) transmissions on PUSCH, where the Downlink Control Information (DCI) on PDCCH includes: Downlink assignments containing at least modulation and coding format, resource allocation, and hybrid-automatic repeat request (ARQ) information related to DL-SCH; Uplink scheduling grants containing at least modulation and coding format, resource allocation, and hybrid-ARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by GNB for each configured bandwidth part (BWP) wherein each search space configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation 1 below:

$$(y*(\text{number of slots in a radio frame})+x-\text{Monitoring-offset-PDCCH-slot}) \bmod (\text{Monitoring-periodicity-PDCCH-slot})=0;$$ [equation 1]

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on subcarrier spacing (SCS). The number of slots in a radio frame and duration of slots depends radio frame for each supported SCS is pre-defined in NR. Each coreset configuration is associated with a list of TCI (Transmission configuration indicator) states. One DL reference signal (RS) identity (ID) (SSB or CSI-RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is quasi-collocated (QCLed) with SSB/CSI-RS of TCI state) used by GNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the SCS can be ordered to change (e.g. to allow different services). A subset of the total cell bandwidth of a cell is referred to as a BWP. BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActive-DownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve UL time synchronization. RA is used during initial access, handover, RRC connection re-establishment procedure, scheduling request (SR) transmission, SCG addition/modification, beam failure recovery (BFR) and data or control information transmission in UL by non-synchronized UE in RRC CONNECTED state. Several types of random access procedure is supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion (i.e., RO)) in which RA preamble was detected by gNB. The RA-RNTI is calculated as follows: RA-RNTI=1+s_id+ 14*t_id+14*80*f_id+14*80*8*ul_carrier_id, where s_id is the index of the first OFDM symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier). Several RARs for various Random access preambles detected by gNB can be multiplexed in the same RAR MAC protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/ RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC CE including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/ RACH occasion) and transmits the RA preamble.

A backoff is applied before going back to first step if backoff index is received in RAR after transmitting the PRACH preamble. UE retransmits PRACH preamble after a time period which is randomly selected between 0 and SCALING_FACTOR_BI* backoff value, where SCALING_FACTOR_BI is set to 1 or scalingFactorBI. scalingFactorBI is optionally signaled by gNB. The backoff value corresponding to backoff index received in RAR, is obtained by UE from a pre-defined backoff table. During the PRACH preamble retransmission UE also ramps up the power by PowerRampingStep or powerRampingStepHighPriority. PowerRampingStep or powerRampingStepHighPriority is signaled by gNB. PowerRampingStep is configured in RACH configuration in SI and dedicated signaling and is cell specific. powerRampingStepHighPriority is dedicatedly configured to UE separately for RA initiated for beam failure recovery configuration and RA initiated for handover. If RA procedure is initiated for beam failure recovery and powerRampingStepHighPriority is not configured by gNB for beam failure recovery, UE uses PowerRampingStep. If RA procedure is initiated for handover and powerRampingStepHighPriority is not configured by gNB for handover, UE uses PowerRampingStep. scalingFactorBI is dedicatedly configured to UE separately for RA initiated for beam failure recovery configuration and RA initiated for handover. If RA procedure is initiated for beam failure recovery and scalingFactorBI is not configured by gNB for beam failure recovery, UE sets SCALING_FACTOR_BI to 1. Otherwise, SCALING_FACTOR_BI is set to scalingFactorBI. If RA procedure is initiated for handover and scalingFactorBI is not configured by gNB for handover, UE sets SCALING_FACTOR_BI to 1. Otherwise, SCALING_FACTOR_BI is set to scalingFactorBI.

Contention free random access (CFRA): This is also referred as legacy CFRA or 4 step CFRA. CFRA procedure is used for scenarios such as handover where low latency is required, timing advance establishment for SCell, etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI-RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So during the RA procedure, one random access attempt can be CFRA while other random access attempt can be CBRA.

If a random access attempt is not successful, before the next random access attempt based on contention based random access, UE performs backoff if backoff index is received in RAR after transmitting the PRACH preamble during the random access attempt. The backoff procedure above mentioned before can be applied similarly.

If a random access attempt is not successful, during the next random access attempt UE also ramps up the power by PowerRampingStep or powerRampingStepHighPriority. PowerRampingStep or powerRampingStepHighPriority is signaled by gNB. PowerRampingStep is configured in RACH configuration in SI and dedicated signaling and is cell specific. The applying of powerRampingStep or powerRampingStepHighPriority described before can be applied similarly.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

Note that backoff and power ramping is applied for MsgA retransmission as in legacy random access procedure.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signalled by gNB, UE select the signalled carrier for performing Random Access procedure. If the carrier to use for the Random Access procedure is not explicitly signalled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.
    else if 2 step contention free random access resources are signaled by gNB for this random access procedure, UE selects 2 step RACH.
    else if 4 step contention free random access resources are signaled by gNB for this random access procedure, UE selects 4 step RACH.
    else if the UL BWP selected for this random access procedure is configured with only 2 step RACH resources, UE selects 2 step RACH.
    else if the UL BWP selected for this random access procedure is configured with only 4 step RACH resources, UE selects 4 step RACH.
    else if the UL BWP selected for this random access procedure is configured with both 2 step and 4 step RACH resources,
        if RSRP of the downlink pathloss reference is below a configured threshold, UE selects 4 step RACH. Otherwise UE selects 2 step RACH.

Note that backoff and power ramping is applied for MsgA retransmission as in legacy random access procedure.

The fifth generation wireless communication system supports a beam failure recovery (BFR) mechanism at UE for PCell or PSCell. This comprises of beam failure detection, new candidate beam identification, beam failure recovery request transmission and monitoring response for beam failure recovery request. UE monitors synchronization signals (SSs) or CSI-RSs transmitted periodically by the serving cell (PCell or PSCell) to assess if a beam failure trigger condition has been met and also to identify a new candidate beam. A beam failure is detected on a serving cell if number of consecutive detected beam failure instance exceeds a configured maximum number. A Beam Failure Instance means that all serving beam fails (i.e. hypothetical PDCCH block error rate (BLER) determined based on measurement of SS or CSI-RS is above a threshold). A new candidate beam is the CSI-RS or SSB of serving cell whose measured quality (e.g. RSRP) is above a configured threshold.

The MAC entity of a cell group shall for each Serving Cell of that cell group configured for beam failure detection perform the following operation:

if beam failure instance indication has been received from lower layers (i.e. PHY layer):
        start or restart the beamFailureDetectionTimer;
        increment BFI_COUNTER by 1;
        if BFI_COUNTER>=beamFailureInstanceMaxCount:
            if the Serving Cell is SCell: trigger a BFR for this Serving Cell;
            else: initiate a Random Access procedure on the SpCell. Note that BFR MAC CE or truncated BFR MAC CE is included in MsgA or Msg3 transmitted during the random access procedure.
    if the beamFailureDetectionTimer expires; or if beamFailureDetectionTimer, beamFailureInstanceMaxCount, or any of the reference signals used for beam failure detection is reconfigured by upper layers associated with this Serving Cell:
        set BFI_COUNTER to 0.
    if the Serving Cell is SpCell and the Random Access procedure initiated for SpCell BFR is successfully completed
        set BFI_COUNTER to 0;
        stop the beamFailureRecoveryTimer, if configured;
        consider the Beam Failure Recovery procedure successfully completed.
    else if the Serving Cell is SCell, and a PDCCH addressed to C-RNTI indicating uplink grant for a new transmission is received for the HARQ process used for the transmission of the SCell BFR MAC CE or truncated SCell BFR MAC CE which contains beam failure recovery information of this Serving Cell; or if the SCell is deactivated:
        set BFI_COUNTER to 0;
        consider the Beam Failure Recovery procedure successfully completed and cancel all the triggered BFRs for this Serving Cell.

The MAC entity shall, if the Beam Failure Recovery procedure determines that at least one BFR has been triggered and not cancelled:

if UL-SCH resources are available for a new transmission and if the UL-SCH resources can accommodate the BFR MAC CE plus its subheader as a result of LCP:
        instruct the Multiplexing and Assembly procedure to generate the BFR MAC CE.
    else if UL-SCH resources are available for a new transmission and if the UL-SCH resources can accommodate the Truncated BFR MAC CE plus its subheader as a result of LCP:
        instruct the Multiplexing and Assembly procedure to generate the Truncated BFR MAC CE.
    else:
        trigger the SR for SCell beam failure recovery for each SCell for which BFR has been triggered and not cancelled.
        Note that if SR resources for SCell BFR are not configured, pending SR for Scell BFR will trigger a random access procedure on SpCell All BFRs triggered prior to MAC PDU assembly for beam failure recovery for a SCell shall be cancelled when a MAC PDU is transmitted and this PDU includes a BFR MAC CE or Truncated BFR MAC CE which contains beam failure information of that SCell.

The MAC CEs for BFR consists of either:
BFR MAC CE; or
Truncated BFR MAC CE.

The BFR MAC CE and Truncated BFR MAC CE are identified by a MAC subheader with LCID/eLCID.

The BFR MAC CE and Truncated BFR MAC CE have a variable size. They includes a bitmap and in ascending order based on the ServCellIndex, beam failure recovery information i.e. octets containing candidate beam availability indication (AC) for SCells indicated in the bitmap. For BFR MAC CE, a single octet bitmap is used when the highest ServCellIndex of this MAC entity's SCell for which beam failure is detected is less than 8, otherwise four octets are used.

For Truncated BFR MAC CE, a single octet bitmap is used for the following cases, otherwise four octets are used:
    the highest ServCellIndex of this MAC entity's SCell for which beam failure is detected is less than 8; or beam failure is detected for SpCell (as specified in Clause 5.17) and the SpCell is to be indicated in a Truncated BFR MAC CE and the UL-SCH resources available for transmission cannot accommodate the Truncated BFR MAC CE with the four octets bitmap plus its subheader as a result of LCP.

The fields in the BFR MAC CEs are defined as follows:

SP: This field indicates beam failure detection (for the SpCell of this MAC entity. The SP field is set to 1 to indicate that beam failure is detected for SpCell only when BFR MAC CE or Truncated BFR MAC CE is to be included into a MAC PDU as part of Random Access Procedure, otherwise, it is set to 0.

Ci (BFR MAC CE): This field indicates beam failure detection and the presence of an octet containing the AC field for the SCell with ServCellIndex i. The Ci field set to 1 indicates that beam failure is detected and the octet containing the AC field is present for the SCell with ServCellIndex i. The Ci field set to 0 indicates that the beam failure is not detected and octet containing the AC field is not present for the SCell with ServCellIndex i. The octets containing the AC field are present in ascending order based on the ServCellIndex;

Ci (Truncated BFR MAC CE): This field indicates beam failure detection for the SCell with ServCellIndex i. The Ci field set to 1 indicates that beam failure is detected and the octet containing the AC field for the SCell with ServCellIndex i may be present. The Ci field set to 0 indicates that the beam failure is not detected and the octet containing the AC field is not present for the SCell with ServCellIndex i. The octets containing the AC field, if present, are included in ascending order based on the ServCellIndex. The number of octets containing the AC field included is maximised, while not exceeding the available grant size;

NOTE: The number of the octets containing the AC field in the Truncated BFR MAC CE can be zero.

AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead.

Candidate RS ID: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.

R: Reserved bit, set to 0.

Figure 2:
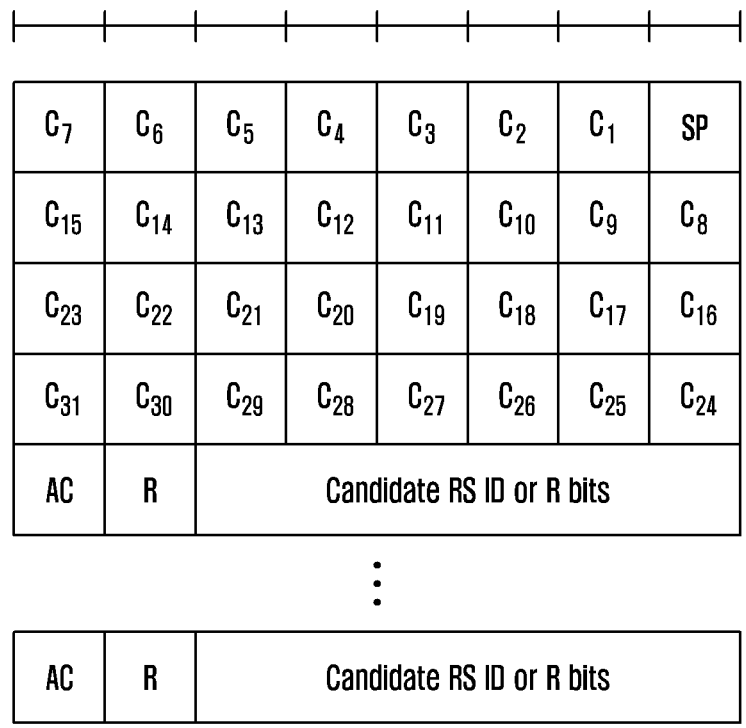
FIG. 2 illustrates another MAC CE structure in accordance with an embodiment of the disclosure.

Embodiment 1—Handling Reconfiguration of Beam Failure Recovery Configuration of Secondary Cell FIG. 1 and FIG. 2 illustrate MAC CE structures in accordance with an embodiment of the disclosure. Specifically, FIG. 1 illustrates BFR and truncated BFR MAC CE with single octet bitmap, and FIG. 2 illustrates BFR and truncated BFR MAC CE with four octets bitmap.

BeamFailureRecoverySCellConfig information element (IE) in RRC Reconfiguration message provides the list of candidate beam RSs (candidateBeamRSSCellList) for SCell BFR. SR resource for SCell BFR are not configured in RRC reconfiguration message. Here, if BFR is triggered for SCell upon beam failure detection (BFD), RA is initiated as SR resources are not configured for Scell BFR and BFR MAC CE is included in MsgA/Msg3 MAC PDU. While RA is ongoing RRC Reconfiguration including updated BeamFailureRecoverySCellConfig is received, MsgA/Msg3 MAC PDU is received by gNB after this reconfiguration.

So, the candidate beam determined by gNB based on candidate RS ID in received MAC CE might be incorrect (e.g., UE reports candidate RS ID X in MAC CE; entry X in the candidateBeamRSSCellList before and after the reconfiguration is different, i.e., entry X corresponds to different candidate beam in candidateBeamRSScellList before and after the reconfiguration). As a result, beam failure recovery gets delayed.

Figure 3:
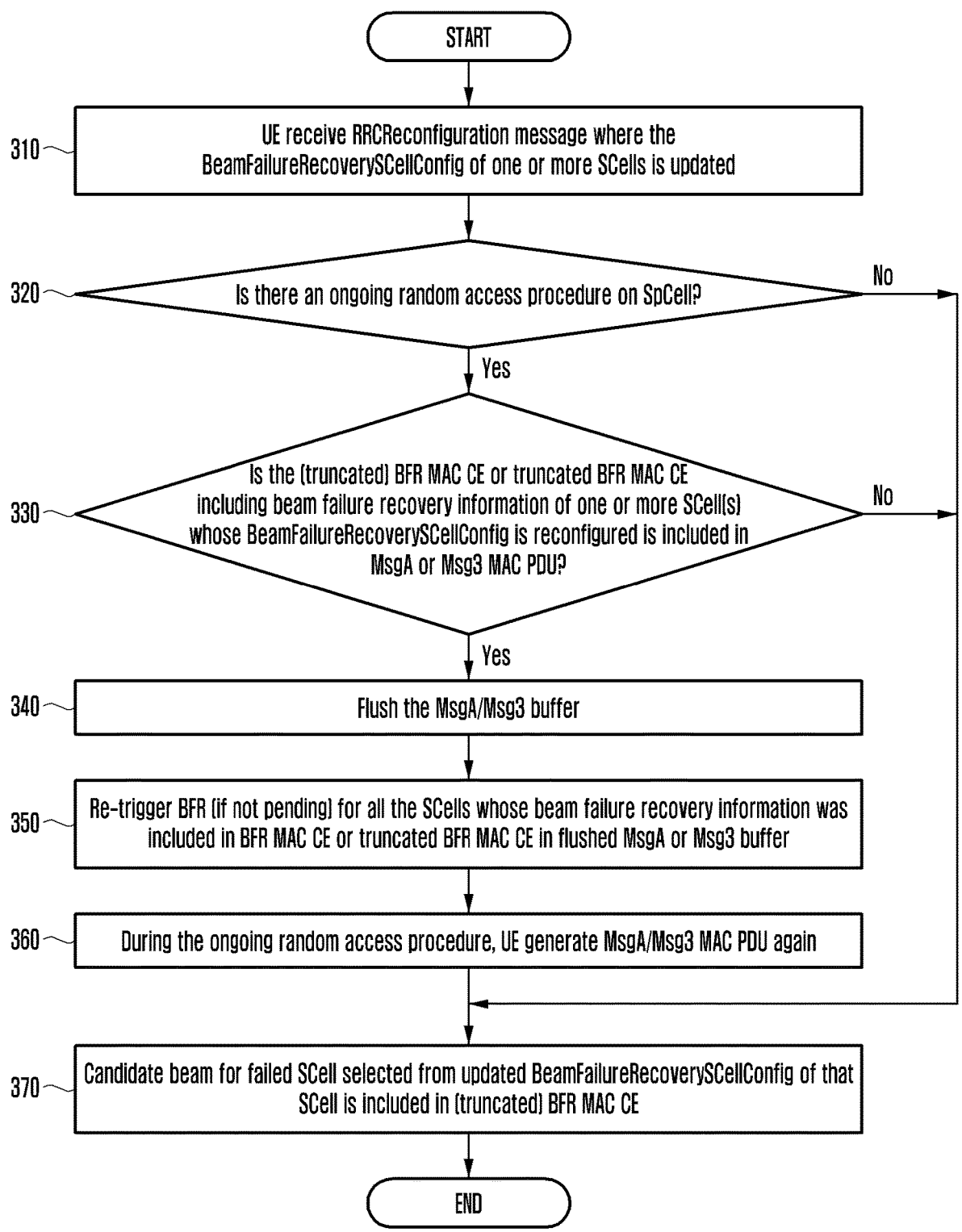
FIG. 3 illustrates a flow chart in accordance with an embodiment of the disclosure.

FIG. 3 illustrates a flow chart in accordance with an embodiment of the disclosure.

Embodiment 1-1

UE is configured with beam failure detection configuration for one or more serving cells. The beam failure detection configuration is signaled by gNB in RRC Reconfiguration message. The beam failure detection configuration is separately configured for different serving cells.

UE is also configured with BFR configuration for one or more serving cells. The beam failure recovery configuration is signaled by gNB in RRC Reconfiguration message. BeamFailureRecoverySCellConfig IE is signaled in BWP configuration of SCell for beam failure recovery of that SCell. BeamFailureRecoveryConfig IE is signaled in BWP configuration of SpCell for beam failure recovery of that SpCell.

UE is not configured with SR configuration (PUCCH resources, prohibit timer, sr-TransMax) for SCell BFR.

For each SCell configured with beam failure detection, if beam failure detection criterion is met for SCell, UE triggers BFR for that SCell and:

SR is triggered (as either UL-SCH resources are not available for new transmission or UL-SCH resources available for new transmission cannot accommodate neither the BFR MAC CE or truncated BFR MAC CE plus its subheader as a result of logical channel prioritization (LCP))

Random access procedure is initiated as SR resources are not configured for SCell BFR.

During the random access procedure, UE generate MsgA or Msg3 and include the BFR MAC CE or truncated BFR MAC CE for BFR. Beam failure recovery information of one or more serving cell(s) is included in BFR MAC CE/truncated BFR MAC CE.

While the random access procedure is ongoing (320), UE receives RRC Reconfiguration message including the updated BeamFailureRecoverySCellConfig for one or more SCell(s) (310).

In this embodiment, if the BeamFailureRecoverySCellConfig is reconfigured for a SCell (or one or more SCells) and if the BFR MAC CE or truncated BFR MAC CE including beam failure recovery information of that SCell (or including beam failure recovery information of one or more SCell(s) whose BeamFailureRecoverySCellConfig is reconfigured) is included in MAC PDU in MsgA or Msg3 buffer of an ongoing random access procedure (330), UE performs the following operations:

Flush the MsgA/Msg3 buffer (if MsgA buffer is not empty, flush MsgA buffer; if Msg3 buffer is not empty, flush Msg3 buffer) (340). In an embodiment, if contention resolution timer is running at the time of flushing, UE stops contention resolution timer and UE can consider the contention resolution timer as expired.

Re-trigger BFR (if not pending) for all the SCells whose beam failure recovery information was included in BFR MAC CE or truncated BFR MAC CE in flushed MsgA or Msg3 buffer (350).

During the ongoing random access procedure, UE generate MsgA/Msg3 MAC PDU again (360). And, candidate beam for failed SCell selected from updated BeamFailureRecoveryScellConfig of that SCell is included in (truncated) BFR MAC CE (370).

In an alternate embodiment, if the BeamFailureRecoverySCellConfig is reconfigured for a SCell (or one or more SCells), and if the BFR MAC CE or truncated BFR MAC CE including beam failure recovery information of that SCell (or including beam failure recovery information of one or more SCell(s) whose BeamFailureRecoverySCellConfig is reconfigured) is included in MAC PDU in MsgA or Msg3 buffer of an ongoing random access procedure, and if candidate beam of an SCell included in (truncated) BFR MAC CE is not there in updated BeamFailureRecoverySCellConfig of that SCell or is included in the entry X of the candidateBeamRSSCellList where X is different before and after the reconfiguration of BeamFailureRecoverySCellConfig, UE perform the following operations:

Flush the MsgA/Msg3 buffer (if MsgA buffer is not empty, flush MsgA buffer; if Msg3 buffer is not empty, flush Msg3 buffer). In an embodiment, if contention resolution timer is running at the time of flushing, UE stops contention resolution timer and UE can consider the contention resolution timer as expired.

Re-trigger BFR (if not pending) for all the SCells whose beam failure recovery information was included in BFR MAC CE or truncated BFR MAC CE in flushed MsgA or Msg3 buffer.

During the ongoing random access procedure, UE generate MsgA/Msg3 MAC PDU again. And, candidate beam for failed SCell selected from updated BeamFailureRecoveryScellConfig of that SCell is included in (truncated) BFR MAC CE.

In an embodiment reconfiguration of BeamFailureRecoverySCellConfig of SCell refers to reconfiguration of BeamFailureRecoverySCellConfig of active BWP of that SCell. The ongoing random access procedure refers to ongoing random access procedure on SpCell or the ongoing random access procedure refers to ongoing random access procedure on SpCell for BFR.

Figure 4:
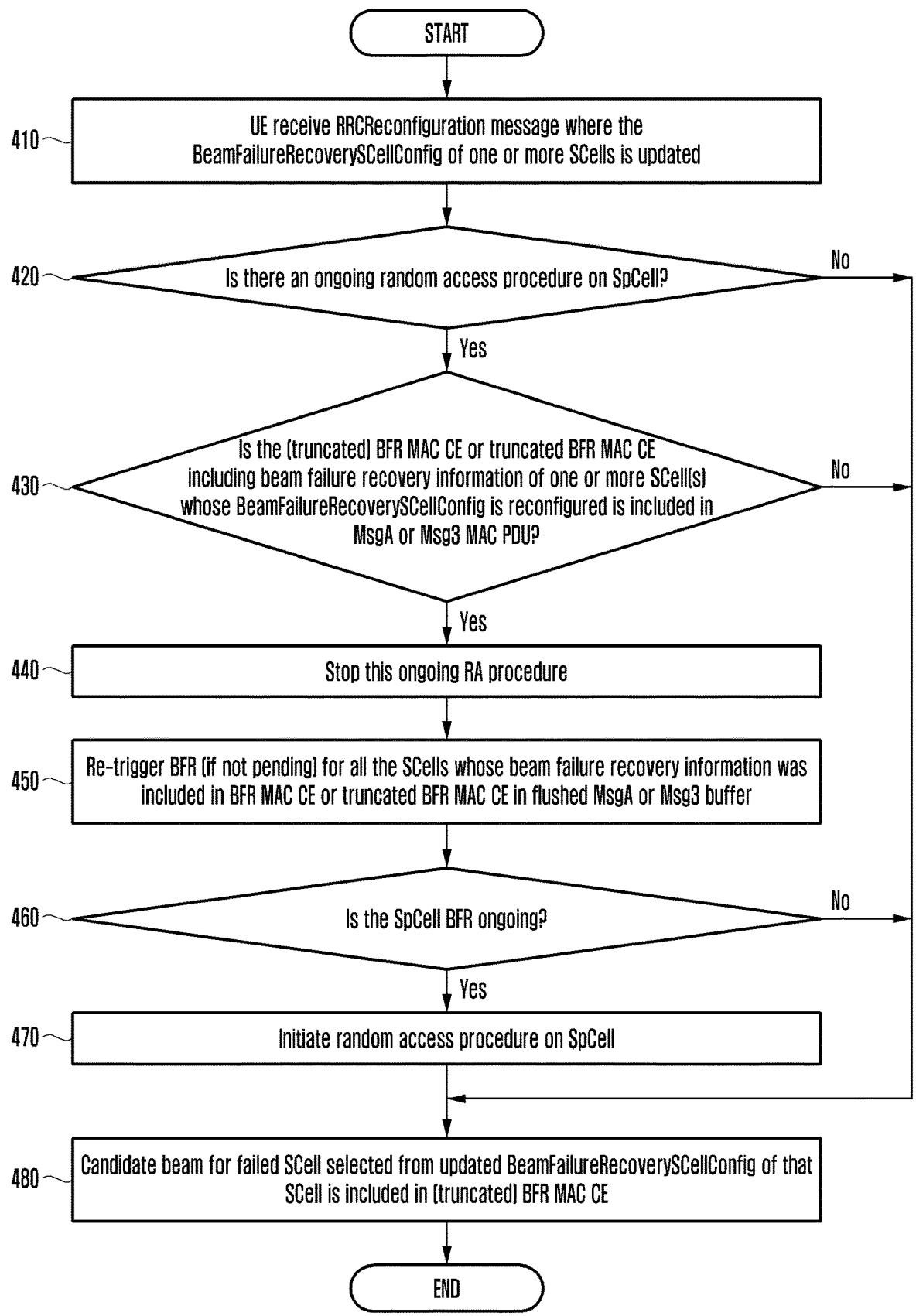
FIG. 4 illustrates a flow chart in accordance with an embodiment of the disclosure.

FIG. 4 illustrates a flow chart in accordance with an embodiment of the disclosure.

Embodiment 1-2

UE is configured with beam failure detection configuration for one or more serving cells. The beam failure detection configuration is signaled by gNB in RRC Reconfiguration message. The beam failure detection configuration is separately configured for different serving cells.

UE is also configured with BFR configuration for one or more serving cells. The beam failure recovery configuration is signaled by gNB in RRC Reconfiguration message. BeamFailureRecoverySCellConfig IE is signaled in BWP configuration of SCell for beam failure recovery of that SCell. BeamFailureRecoveryConfig IE is signaled in BWP configuration of SpCell for beam failure recovery of that SpCell.

UE is not configured with SR configuration (PUCCH resources, prohibit timer, sr-TransMax) for SCell BFR.

For each SCell configured with beam failure detection, if beam failure detection criterion is met for SCell, UE triggers BFR for that SCell and:

SR is triggered (as either UL SCH resources are not available for new transmission or UL-SCH resources available for new transmission cannot accommodate neither the BFR MAC CE or truncated BFR MAC CE plus its subheader as a result of LCP)

RA is initiated as SR resources are not configured for SCell BFR.

During the random access procedure, UE generate MsgA or Msg3 and include the BFR MAC CE or truncated BFR MAC CE for BFR. Beam failure recovery information of one or more serving cell(s) is included in BFR MAC CE/truncated BFR MAC CE.

While the random access is ongoing (420), UE receives RRC Reconfiguration message including the updated BeamFailureRecoverySCellConfig for one or more SCell(s) (410).

In this embodiment, if the BeamFailureRecoverySCellConfig is reconfigured for a SCell (or one or more SCells) and if the BFR MAC CE or truncated BFR MAC CE including beam failure recovery information of that SCell (or including beam failure recovery information of one or more SCell(s) whose BeamFailureRecoverySCellConfig is reconfigured) is included in MAC PDU in MsgA or Msg3 buffer of an ongoing random access procedure (430), UE perform the following operations:

Stop the ongoing RA procedure (440);

re-trigger BFR (if not pending) for all the SCells whose beam failure recovery information was included in BFR MAC CE or truncated BFR MAC CE in flushed MsgA or Msg3 buffer (450);

initiate a random access procedure if SpCell BFR is ongoing (460, 470). And, candidate beam for failed SCell selected from updated BeamFailureRecoveryScellConfig of that SCell is included in (truncated) BFR MAC CE (480).

In an alternate embodiment, if the BeamFailureRecoverySCellConfig is reconfigured for a SCell (or one or more SCells) and if the BFR MAC CE or truncated BFR MAC CE including beam failure recovery information of that SCell (or including beam failure recovery information of one or more SCell(s) whose BeamFailureRecoverySCellConfig is reconfigured) is included in MAC PDU in MsgA or Msg3 buffer of an ongoing random access procedure and if candidate beam of an SCell included in (truncated) BFR MAC CE is not there in updated BeamFailureRecoverySCellConfig of that SCell or is included in the entry X of the candidateBeamRSSCellList where X is different before and after the reconfiguration of BeamFailureRecoverySCellConfig, UE perform the following operations:

Stop the ongoing RA procedure;

re-trigger BFR (if not pending) for all the SCells whose beam failure recovery information was included in BFR MAC CE or truncated BFR MAC CE in flushed MsgA or Msg3 buffer;

initiate a random access procedure if SpCell BFR is ongoing. And, candidate beam for failed SCell selected from updated BeamFailureRecoveryScellConfig of that SCell is included in (truncated) BFR MAC CE.

In an embodiment reconfiguration of BeamFailureRecoverySCellConfig of SCell refers to reconfiguration of BeamFailureRecoverySCellConfig of active BWP of that SCell. The ongoing random access procedure refers to ongoing random access procedure on SpCell or the ongoing random access procedure refers to ongoing random access procedure on SpCell for BFR.

Figure 5:
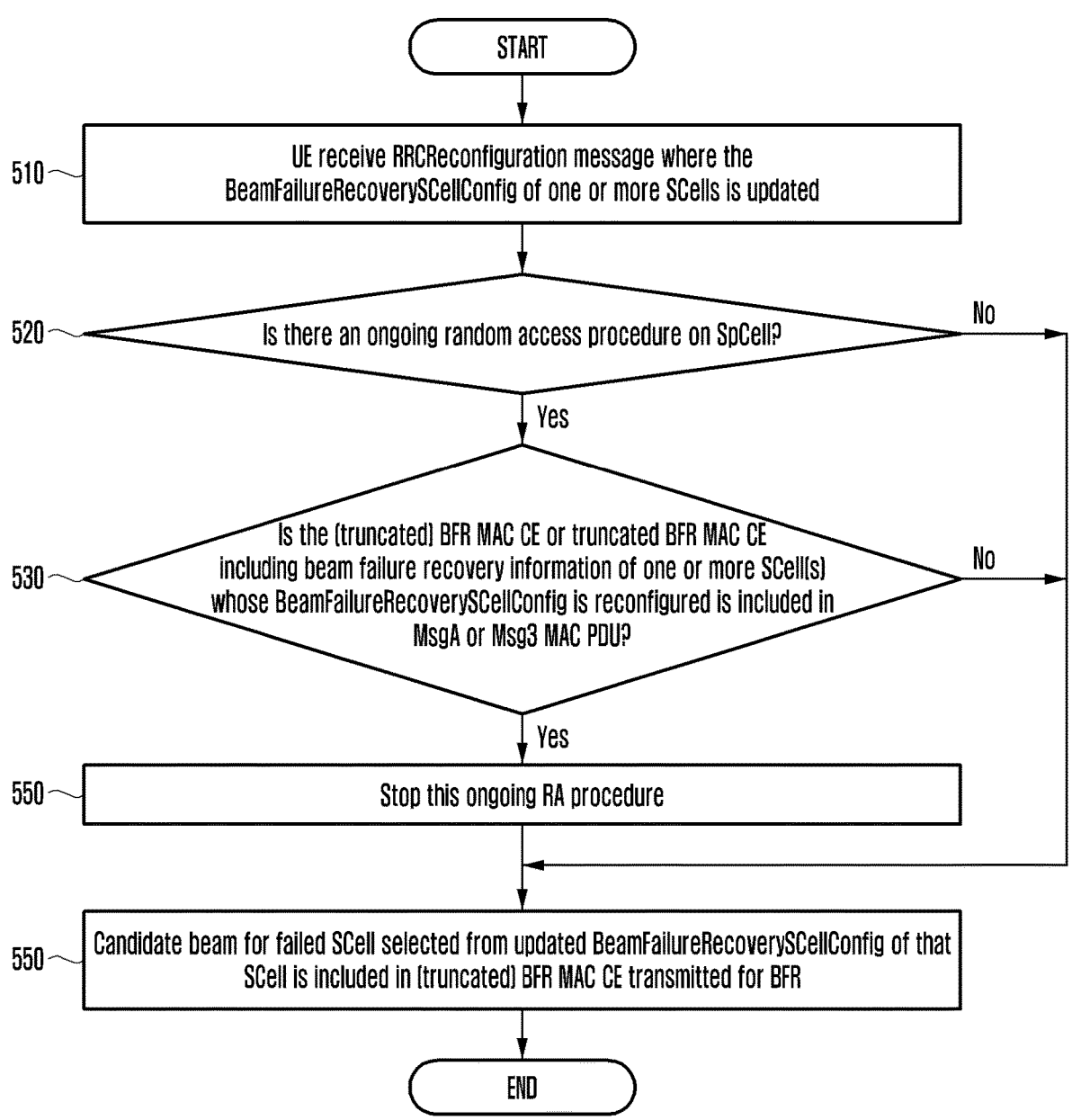
FIG. 5 illustrates a flow chart in accordance with an embodiment of the disclosure.

FIG. 5 illustrates a flow chart in accordance with an embodiment of the disclosure.

Embodiment 1-3

UE is configured with beam failure detection configuration for one or more serving cells. The beam failure detection configuration is signaled by gNB in RRC Reconfiguration message. The beam failure detection configuration is separately configured for different serving cells.

UE is also configured with BFR configuration for one or more serving cells. The beam failure recovery configuration is signaled by gNB in RRC Reconfiguration message. BeamFailureRecoverySCellConfig IE is signaled in BWP configuration of SCell for beam failure recovery of that SCell. BeamFailureRecoveryConfig IE is signaled in BWP configuration of SpCell for beam failure recovery of that SpCell.

UE is not configured with SR configuration (PUCCH resources, prohibit timer, sr-TransMax) for SCell BFR.

For each SCell configured with beam failure detection, if beam failure detection criterion is met for SCell, UE triggers BFR for that SCell:
  SR is triggered (as either UL SCH resources are not available for new transmission or UL-SCH resources available for new transmission cannot accommodate neither the BFR MAC CE or truncated BFR MAC CE plus its subheader as a result of LCP)
  RA is initiated as SR resources are not configured for SCell BFR.

During the random access procedure, UE generate MsgA or Msg3 and include the BFR MAC CE or truncated BFR MAC CE for BFR. Beam failure recovery information of one or more serving cell(s) is included in BFR MAC CE/truncated BFR MAC CE.

While the random access is ongoing (520), UE receives RRC Reconfiguration message including the updated BeamFailureRecoverySCellConfig for one or more SCell(s) (510).

In this embodiment, if the BeamFailureRecoverySCellConfig is reconfigured for a SCell (or one or more SCells) and if the BFR MAC CE or truncated BFR MAC CE including beam failure recovery information of that SCell (or including beam failure recovery information of one or more SCell(s) whose BeamFailureRecoverySCellConfig is reconfigured) is included in MAC PDU in MsgA or Msg3 buffer of an ongoing random access procedure (530), UE perform the following operations:
  Stop the ongoing RA procedure (540). And, candidate beam for failed SCell selected from updated BeamFailureRecoveryScellConfig of that SCell is included in (truncated) BFR MAC CE transmitted for BFR (550).

In an alternate embodiment, if the BeamFailureRecoverySCellConfig is reconfigured for a SCell (or one or more SCells) and if the BFR MAC CE or truncated BFR MAC CE including beam failure recovery information of that SCell (or including beam failure recovery information of one or more SCell(s) whose BeamFailureRecoverySCellConfig is reconfigured) is included in MAC PDU in MsgA or Msg3 buffer of an ongoing random access procedure and if candidate beam of an SCell included in (truncated) BFR MAC CE is not there in updated BeamFailureRecoverySCellConfig of that SCell or is included in the entry X of the candidateBeamRSSCellList where X is different before and after the reconfiguration of BeamFailureRecoverySCellConfig, UE perform the following operations:
  Stop the ongoing RA procedure. And, candidate beam for failed SCell selected from updated BeamFailureRecoveryScellConfig of that SCell is included in (truncated) BFR MAC CE transmitted for BFR.

In an embodiment reconfiguration of BeamFailureRecoverySCellConfig of SCell refers to reconfiguration of BeamFailureRecoverySCellConfig of active BWP of that SCell. The ongoing random access procedure refers to ongoing random access procedure on SpCell or the ongoing random access procedure refers to ongoing random access procedure on SpCell for BFR.

In an embodiment, random access procedure is initiated for BFR of a serving cell. While the random access procedure is ongoing, updated beam failure recovery configuration of one or more serving cells is received from gNB in RRC reconfiguration message (or in any other signaling message). If the serving cell for which random access procedure is initiated for BFR is SpCell and beam failure recovery configuration of that serving cell is updated and Msg3/MsgA MAC PDU generated during random access procedure does not include BFR MAC CE indicating beam failure recovery information of SCell(s), stop the ongoing random access procedure and initiate a random access procedure using new configuration. Otherwise, UE does not stop the ongoing random access procedure.

In an embodiment, random access procedure is initiated for BFR of a serving cell. While the random access procedure is ongoing, updated beam failure recovery configuration of one or more serving cells is received from gNB in RRC reconfiguration message (or in any other signaling message). If the serving cell for which random access procedure is initiated for BFR is SpCell and beam failure recovery configuration of that serving cell is updated: stop the ongoing random access procedure; if Msg3/MsgA MAC PDU was generated during the ongoing random access procedure (i.e random access procedure which is stopped) and it included (truncated) BFR MAC CE indicating beam failure recovery information of SCell(s), UE triggers BFR for those SCell(s). If the serving cell for which random access procedure is initiated for BFR is SCell, UE does not stop the ongoing random access procedure.

Embodiment 2-2 Step CFRA Signaling

In an embodiment, it is proposed that PUSCH Resource configuration for 2 step CFRA is separately configured from PUSCH Resource configuration for 2 step CBRA.

For the PUSCH resource configuration for 2 step CBRA, msgA-PUSCH-ResourceList is included in common configuration of BWP and is a list of MsgA-PUSCH-Resource. MsgA-PUSCH-Resource IE includes PUSCH parameters to determine PUSCH occasions. If 2 step RA is supported in a BWP and msgA-PUSCH-ResourceList is not included in common configuration of that BWP, msgA-PUSCH-ResourceList from initial BWP is used.

For the 2 step CFRA configuration, msgA-PUSCH-Resource-CFRA is included in RACH-ConfigDedicated IE of RRC Reconfiguration message. MsgA-PUSCH-Resource-CFRA applies to BWP indicated by parameter first active uplink BWP. MsgA-PUSCH-Resource-CFRA includes PUSCH parameters to determine PUSCH occasions. MCS (modulation and coding scheme)/number of PRBs for each PUSCH occasion is part of msgA-PUSCH-Resource-CFRA.

Here, MsgA-PUSCH-Resource/msgA-PUSCH-Resource-CFRA parameters may include at least one of the followings:

frequencyStartMsgAPUSCH: UE determines first RB for a first PUSCH occasion in an UL BWP from frequencyStartMsgAPUSCH that provides an offset, in number of RBs in the UL BWP, from a first RB of the UL BWP.

nrofPRBsperMsgAPO: A PUSCH occasion includes a number of RBs provided by nrofPRBsperMsgAPO.

guardBandMsgAPUSCH: Consecutive PUSCH occasions in the frequency domain of an UL BWP are separated by a number of RBs provided by guardBandMsgAPUSCH.

nrMsgAPO-FDM: A number $N_t$ of PUSCH occasions in the frequency domain of an UL BWP is provided by nrMsgAPO-FDM.

msgAPUSCH-timeDomainOffset: UE determines a first slot for a first PUSCH occasion in an UL BWP from msgAPUSCH-timeDomainOffset that provides an offset, in number of slots in the UL BWP, relative to the start of each PRACH slot.

guardPeriodMsgAPUSCH: Consecutive PUSCH occasions within each slot are separated by guardPeriodMsgAPUSCH symbols and have same duration.

nrofMsgAPOperSlot: A number $N_t$ of time domain PUSCH occasions in each slot is provided by nrofMsgAPOperSlot, nrofSlotsMsgAPUSCH: A number of consecutive slots that include PUSCH occasions is provided by nrofSlotsMsgAPUSCH.

startSymbolAndLengthMsgAPO: Starting symbol and length of PUSCH occasion in a PUSCH slot is given by startSymbolAndLengthMsgAPO msgA-DMRS-Configuration: A UE is provided a DMRS configuration for a PUSCH transmission in a PUSCH occasion in an active UL BWP by msgA-DMRS-Configuration.

msgA-MCS: A UE is provided an MCS for data information in a PUSCH transmission for a PUSCH occasion by msgA-MCS.

Figure 6:
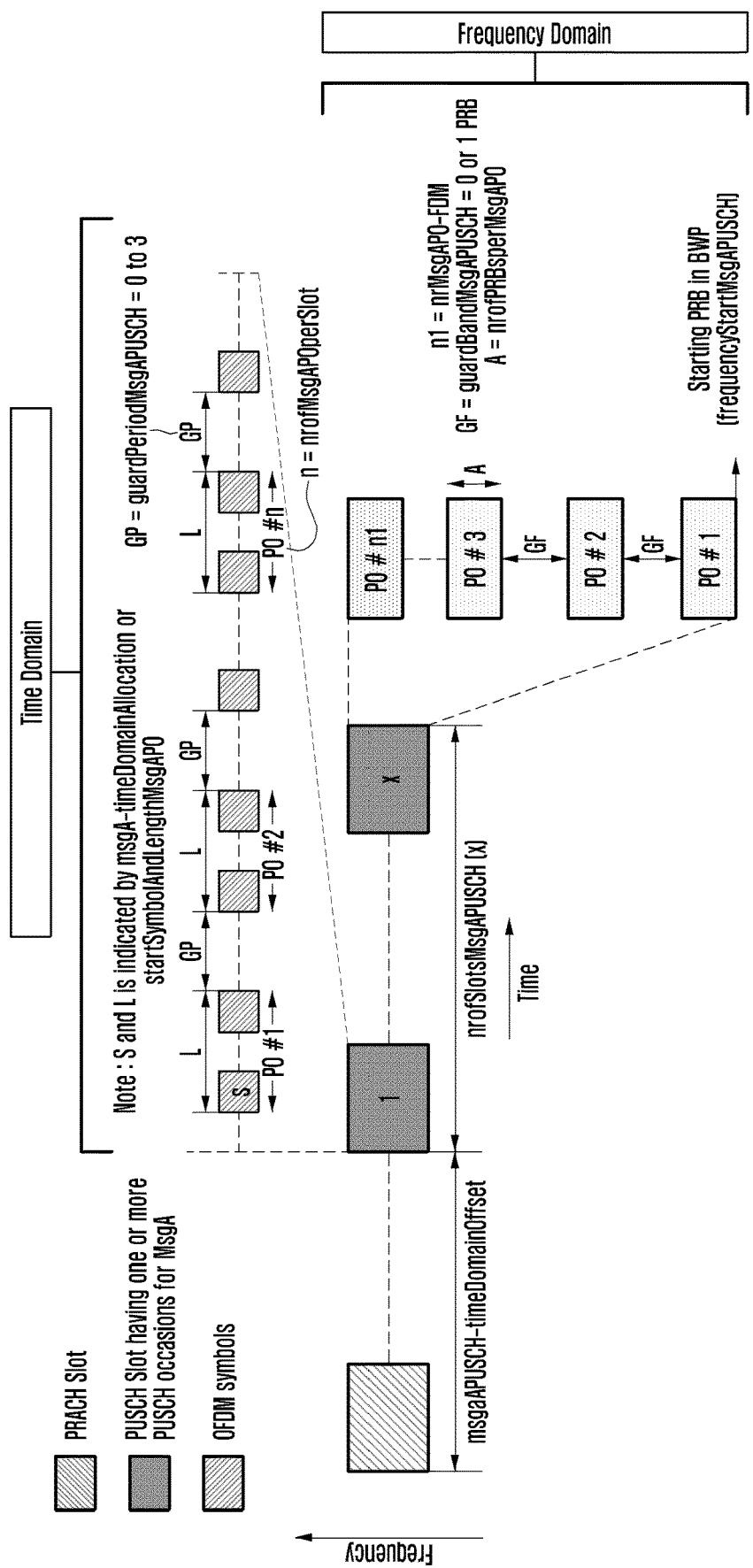
FIG. 6 illustrates a physical uplink shared channel (PUSCH) resource parameters with respect to physical random access channel (PRACH) slot in accordance with an embodiment of the disclosure.

FIG. 6 illustrates physical uplink shared channel (PUSCH) resource parameters with respect to physical random access channel (PRACH) slot in accordance with the disclosure.

In an embodiment, UE first determines whether the number of PUSCH occasion (or number of valid PUSCH occasions) in PRACH slot is >1 or not according to configuration signaled in msgA-PUSCH-Resource-CFRA.

Here, if the number of PUSCH occasion in PRACH slot is >1 according to configuration signaled in msgA-PUSCH-Resource-CFRA:

in RACH-ConfigDedicated, RA preamble index, and PUSCH occasion index and DMRS-Occasion-Index is signaled for one or more SSBs/CSI RSs. FIG. 7 illustrates an example of random access channel (RACH) configuration in accordance with an embodiment of the disclosure. pusch-OccasionIndexList indicates PUSCH occasion index for each RO in ra-OccasionList. I-th entry in pusch-OccasionIndexList corresponds to i-th entry in ra-OccasionList. In an embodiment, instead of pusch-OccasionIndexList for CSI-RS, one PUSCH occasion index can be there.

msgA-PUSCH-Occasion-Index: In an embodiment, each valid PUSCH occasion corresponding to a PRACH slot is sequentially numbered (e.g. from zero), first, in increasing order of frequency resource indexes for frequency multiplexed PUSCH occasions; second, in increasing order of time resource indexes for time multiplexed PUSCH occasions within a PUSCH slot. Third, in increasing order of indexes for PUSCH slots corresponding to a PRACH slot. The msgA-PUSCH-Occasion-Index identifies the PUSCH Occasion within this ordered list.

msgA-DMRS-Occasion-Index: Identifies the index of the DMRS resource used for the PUSH Occasion for CFRA. The DMRS resource index in each PUSCH occasion are sequentially numbered, where a DMRS resource index is determined first in an ascending order of a DMRS port index and second in an ascending order of a DMRS sequence index. The msgA-DMRS-Occasion-Index identifies the DMRS resource to be used within this ordered list.

Meanwhile, PUSCH Occasion Selection for 2 step CFRA based on SSB can be performed as follows:

UE first selects SSB where selected SSB is the one for which SS-RSRP is above a configured threshold (threshold is signaled by gNB).

UE selects preamble (indicated by ra-PreambleIndex) corresponding to selected SSB.

UE then selects RO corresponding to selected SSB (note that ROs are mapped to SSBs as defined earlier and UE select one of ROs mapped to selected SSB).

Figure 8:
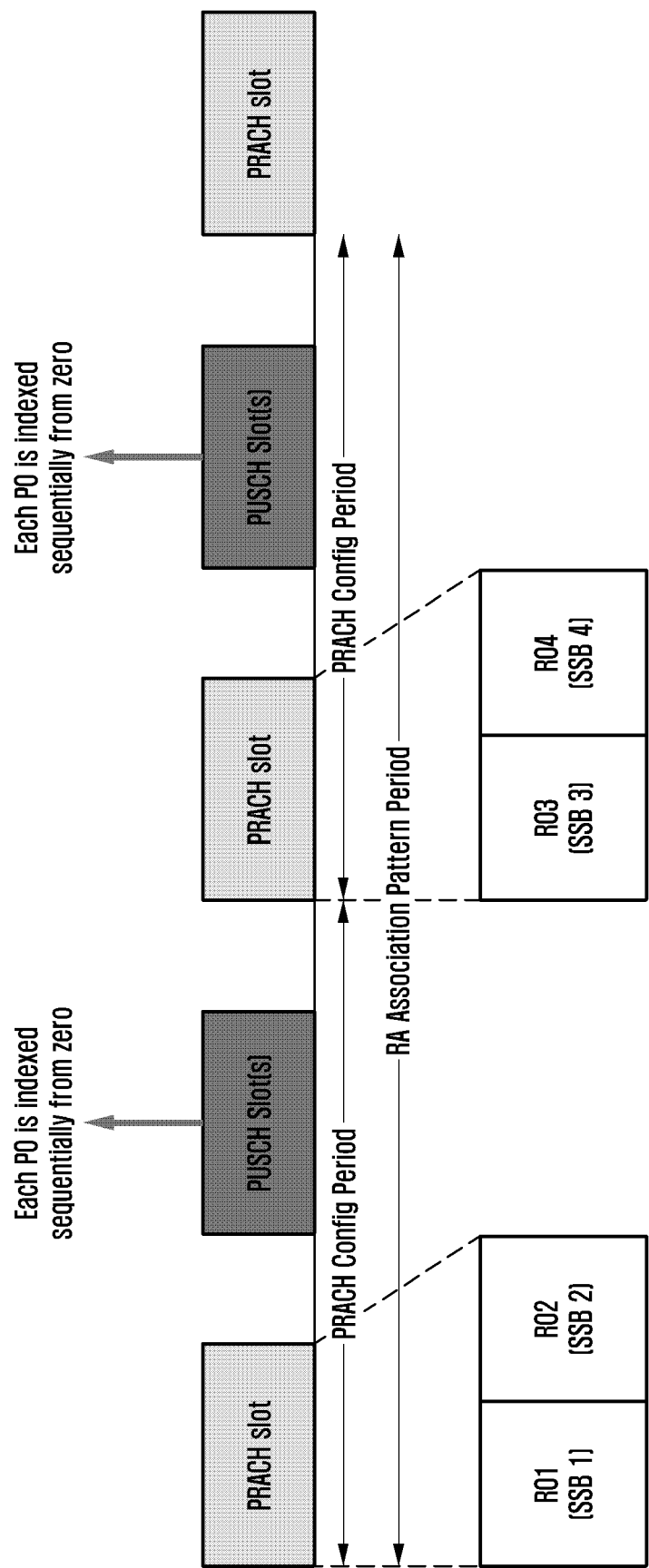
FIG. 8 illustrates PUSCH occasion selection procedure in accordance with an embodiment of the disclosure.

UE then selects PUSCH occasion indicated by msgA-PUSCH-Occasion-Index from PUSCH occasions corresponding to PRACH slot of selected RO FIG. 8 illustrates PUSCH occasion selection procedure in accordance with an embodiment of the disclosure. As illustrated in the FIG. 8, if UE select RO1 for SSB1, PUSCH occasion indicated in rach-config dedicated corresponding to SSB1 is selected from the PUSCH occasions corresponding to PRACH slot of RO1.

UE then transmit selected preamble and MsgA MAC PDU in selected PRACH occasion and PUSCH occasion respectively.

Else, if the number of PUSCH occasions (or number of valid PUSCH occasions) in PRACH slot is 1 according to configuration signaled in msgA-PUSCH-Resource-CFRA (in an embodiment nrMsgAPO-FDM, nrofMsgA-POPerSlot, nrofSlotsMsgA-PUSCH are set to 1, in msgA-PUSCH-Resource-CFRA), UE uses this PUSCH occasion for transmitting MsgA. PUSCH occasion index and DMRS-Occasion-Index are not signaled in RACH-ConfigDedicated in this case. The advantage is that when network configures only one valid PUSCH resource in msgA-PUSCH-Resource-CFRA, signaling overhead of PUSCH occasion index and DMRS-Occasion-Index is saved.

In an alternate embodiment: UE first determines whether the number of PUSCH occasion in PRACH slot is >1 or not according to configuration signaled in msgA-PUSCH-Resource-CFRA or UE determines whether PUSCH resource index is signaled for 2 step CFRA in RACH-ConfigDedicated.

If the number of PUSCH occasion in PRACH slot is >1 according to configuration signaled in msgA-PUSCH-Resource-CFRA or PUSCH resource index is signaled in 2 step CFRA in RACH-ConfigDedicated:

in RACH-ConfigDedicated, RA preamble index, and PUSCH resource index is signaled for one or more SSBs/CSI RSs. FIG. 9 illustrates an example of random access channel configuration in accordance with an embodiment of the disclosure. pusch-ResourceIndexList indicates PUSCH occasion index for each RO in ra-OccasionList. Ith entry in pusch-ResourceIndexList corresponds to ith entry in ra-OccasionList. In an embodiment, instead of pusch-ResourceIdexList for CSI-RS, one PUSCH Resource index can be there.

msgA-PUSCH-Resource-Index: Identifies the index of the PUSCH resource used for MsgA CFRA. The PUSCH resource index indicates a valid PUSCH occasion and the associated DMRS resources corresponding to a PRACH slot. The PUSCH resource indexes are sequentially numbered, first, in increasing order of frequency resource indexes for frequency multiplexed PUSCH occasions; second, in increasing order of DMRS resource indexes within a PUSCH occasion, where a DMRS resource index $DMRS_{id}$ is determined first in an ascending order of a DMRS port index and then in an ascending order of a DMRS sequence index, third in increasing order of time resource indexes for time multiplexed PUSCH occasions within a PUSCH slot and fourth, in increasing order of indexes for PUSCH slots corresponding to a PRACH slot.

Else, if the number of PUSCH occasions (or number of valid PUSCH occasions) in PRACH slot is 1 according to configuration signaled in msgA-PUSCH-Resource-CFRA or PUSCH resource index is not signaled for 2 step CFRA in RACH-ConfigDedicated (in an embodiment nrMsgAPO-FDM, nrofMsgA-PO-PerSlot, nrofSlotsMsgA-PUSCH are set to 1, in msgA-PUSCH-Resource-CFRA), UE uses this PUSCH occasion for transmitting MsgA i.e. UE uses the PUSCH resource identified by PUSCH Resource index 0. PUSCH Resource index is not signaled in RACH-ConfigDedicated. The advantage is that when network configures only one valid PUSCH resource in msgA-PUSCH-Resource-CFRA, signaling overhead of PUSCH occasion index is saved.

PUSCH occasions validity is as follows: A PUSCH occasion is valid if it does not overlap in time and frequency with any PRACH occasion associated with either a 4 step RA or a 2 step RA. Additionally, if a UE is provided tdd-UL-DL-ConfigurationCommon, a PUSCH occasion is valid if
  it is within UL symbols, or
  it does not precede a SS/PBCH block in the PUSCH slot and starts at least $N_{gap}$ symbols after a last downlink symbol and at least $N_{gap}$ symbols after a last SS/PBCH block symbol, where $N_{gap}$ is zero for preamble SCS of 1.25/5 kilohertz (KHz), is 2 for preamble SCS of 15/30/60/120 KHz.

Embodiment 3—DRX Active Timer Determination

Figure 10:
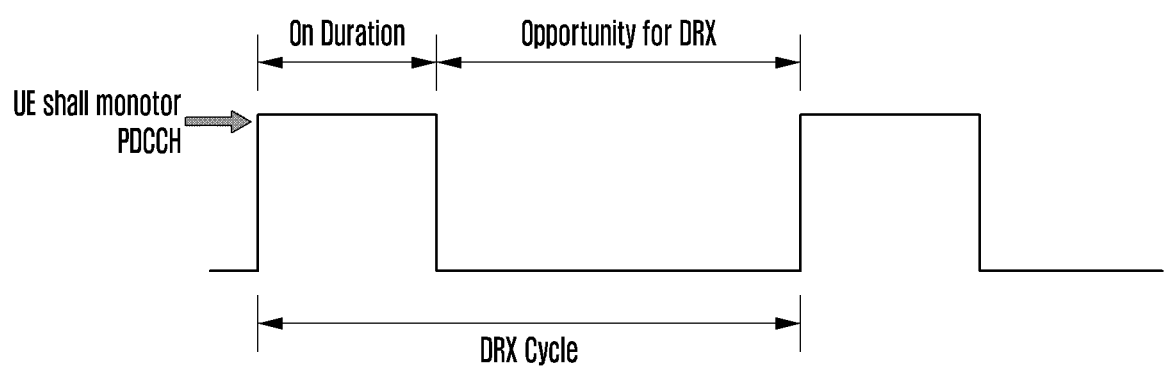
FIG. 10 illustrates an example of discontinuous reception (DRX) cycle in accordance with an embodiment of the disclosure.

The fifth generation wireless communication system supports DRX (Discontinuous reception) to save UE power. When DRX is configured, the UE does not have to continuously monitor PDCCH. DRX is characterized by the following parameters in accordance with FIG. 10:
  on-duration: duration that the UE waits for, after waking up, to receive PDCCHs. If the UE successfully decodes a PDCCH, the UE stays awake and starts the inactivity timer;
  inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);
  retransmission-timer: duration until a retransmission can be expected;
  cycle: specifies the periodic repetition of the on-duration followed by a possible period of inactivity;
  active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT(round trip time)-TimerDL, and drx-HARQ-RTT-TimerUL.

When a DRX cycle is configured, the Active Time for Serving Cells in a DRX group includes the time while:
  drx-onDurationTimer or drx-InactivityTimer configured for the DRX group is running; or
  drx-RetransmissionTimerDL or drx-RetransmissionTimerUL is running on any Serving Cell in the DRX group; or
  ra-ContentionResolutionTimer or msgB-ResponseWindow is running; or
  a Scheduling Request is sent on PUCCH and is pending; or
  a PDCCH indicating a new transmission addressed to the C-RNTI of the MAC entity has not been received after successful reception of a Random Access Response for the Random Access Preamble not selected by the MAC entity among the contention-based Random Access Preamble.

1> if a DRX group is in Active Time:
  2> monitor the PDCCH on the Serving Cells in this DRX group;
  2> if the PDCCH indicates a DL transmission:
    3> start the drx-HARQ-RTT-TimerDL for the corresponding HARQ process in the first symbol after the end of the corresponding transmission carrying the DL HARQ feedback;
    3> stop the drx-RetransmissionTimerDL for the corresponding HARQ process.
    3> if the PDSCH-to-HARQ_feedback timing indicate a non-numerical k1 value:
      4> start the drx-RetransmissionTimerDL in the first symbol after the PDSCH transmission for the corresponding HARQ process.
  2> if the PDCCH indicates a UL transmission:
    3> start the drx-HARQ-RTT-TimerUL for the corresponding HARQ process in the first symbol after the end of the first repetition of the corresponding PUSCH transmission;
    3> stop the drx-RetransmissionTimerUL for the corresponding HARQ process.
  2> if the PDCCH indicates a new transmission (DL or UL) on a Serving Cell in this DRX group:
    3> start or restart drx-InactivityTimer for this DRX group in the first symbol after the end of the PDCCH reception.

2> if a HARQ process receives downlink feedback information and acknowledgement is indicated:
3> stop the drx-RetransmissionTimerUL for the corresponding HARQ process.

Meanwhile, active time of each serving cell includes the time when ra-ContentionResolutionTimer or msgB-ResponseWindow is running. When contention resolution timer or MsgB response window is running, UE is expecting PDCCH from SpCell only. So considering contention resolution timer and MsgB response window in determining active time for serving cells of secondary DRX group will lead to unnecessary power consumption. Note that secondary DRX group only includes SCells and not SpCell.

Embodiment 3-1

Figure 11:
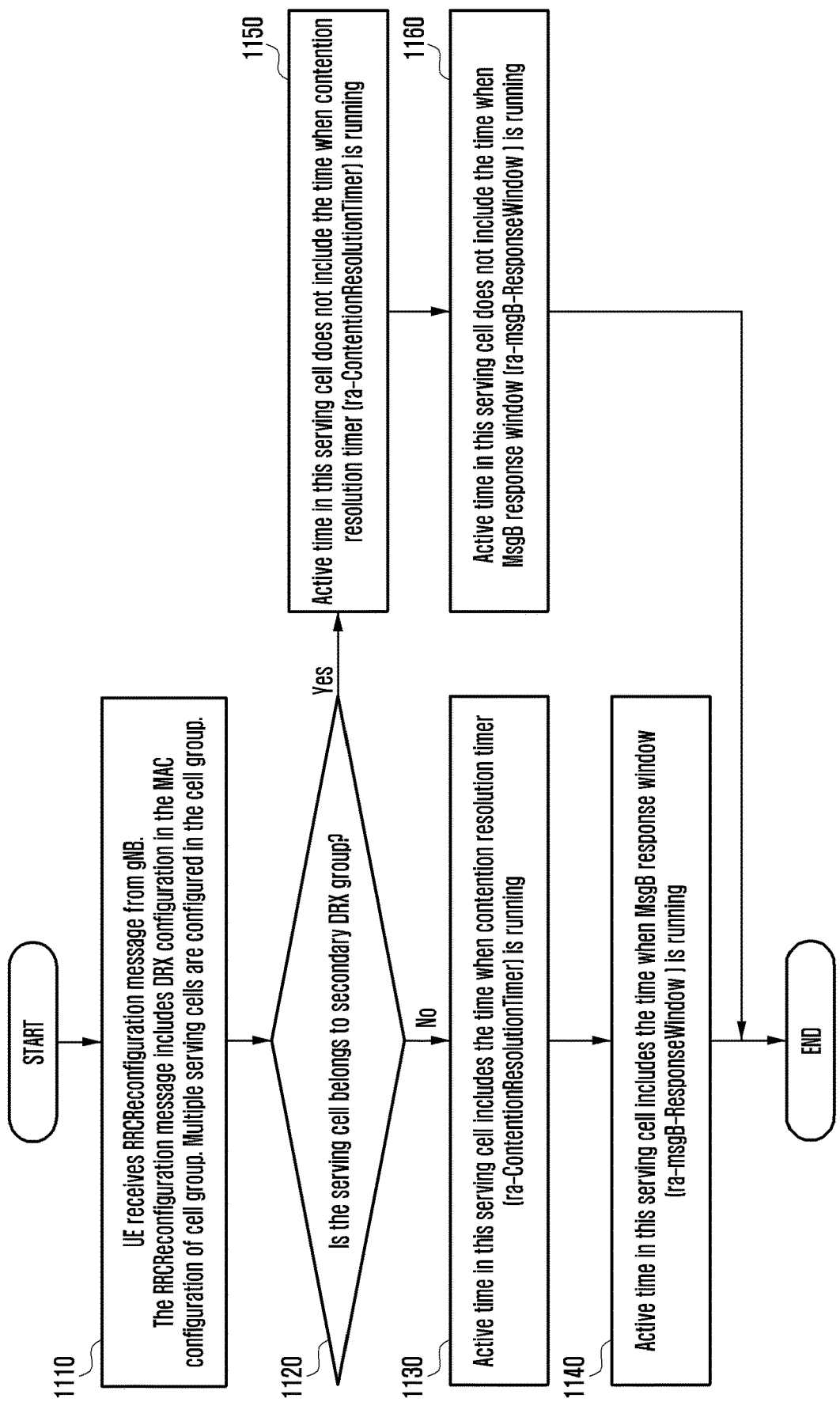
FIG. 11 illustrates a flow chart in accordance with an embodiment of the disclosure.

FIG. 11 illustrates a flow chart for determining the active DRX time in accordance with an embodiment of the disclosure.
1. UE receives RRCReconfiguration message from gNB. The received RRCReconfiguration message includes DRX configuration in the MAC configuration of cell group. Multiple serving cells are configured in the cell group (1110). The cell group can be MCG or SCG.
2. For each serving cell of the cell group for which DRX is configured:
A. UE checks whether serving cell belongs to secondary DRX group or not (1120). The serving cell(s) belonging to secondary DRX group are signaled in RRCReconfiguration message.
B. If the serving cell belongs to secondary DRX group:
  i. Active time in this serving cell does not include the time when contention resolution timer is running (1150);
  ii. Active time in this serving cell does not include the time when MsgB response window is running (1160);
C. If the serving cell does not belong to secondary DRX group:
  i. Active time in this serving cell includes the time when contention resolution timer is running (1130);
  ii. Active time in this serving cell includes the time when MsgB response window is running (1140);

Embodiment 3-2

Figure 12:
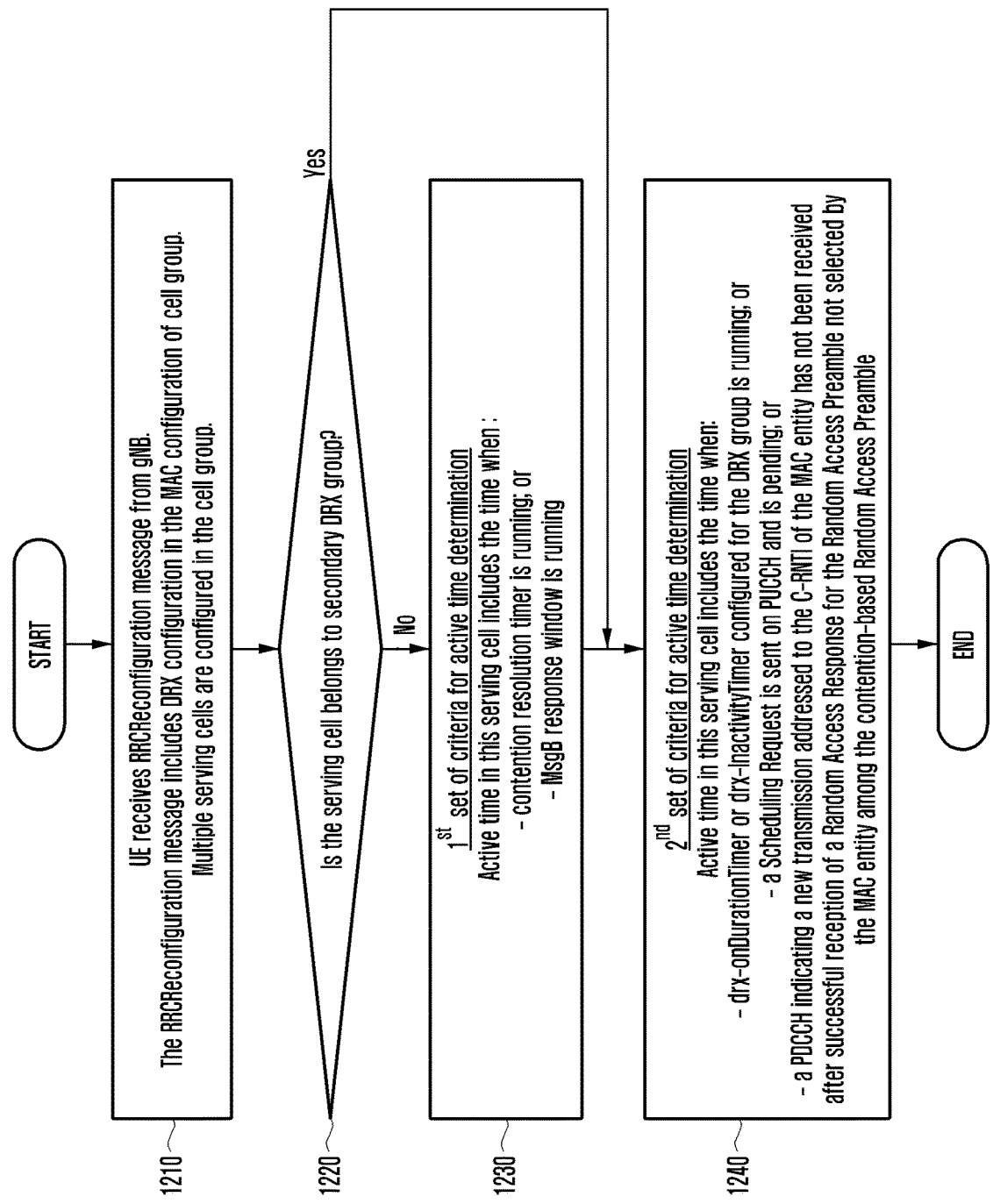
FIG. 12 illustrates a flow chart in accordance with an embodiment of the disclosure.

FIG. 12 illustrates a flow chart for determining the active DRX time in accordance with another embodiment of the disclosure.
1. UE receives RRCReconfiguration message from gNB. The received RRCReconfiguration message includes DRX configuration in the MAC configuration of cell group. Multiple serving cells are configured in the cell group (1210). The cell group can be MCG or SCG.
2. For each serving cell of the cell group for which DRX is configured:
A. UE checks whether serving cell belongs to secondary DRX group or not (1220). The serving cell(s) belonging to secondary DRX group are signaled in RRCReconfiguration message.
B. If the serving cell does not belong to secondary DRX group, UE applies the first criteria for active time determination (1230), wherein according to the first criteria the Active Time of serving cell includes the time while:
  i. drx-onDurationTimer or drx-InactivityTimer configured for the DRX group of this serving cell is running; or
  ii. drx-RetransmissionTimerDL or drx-RetransmissionTimerUL is running on any Serving Cell in the DRX group of this serving cell; or
  iii. ra-ContentionResolutionTimer or msgB-ResponseWindow is running; or
  iv. a Scheduling Request is sent on PUCCH and is pending; or
  v. a PDCCH indicating a new transmission addressed to the C-RNTI of the MAC entity has not been received after successful reception of a Random Access Response for the Random Access Preamble not selected by the MAC entity among the contention-based Random Access Preamble.
C. If the serving cell belongs to secondary DRX group, UE applies the second criteria for active time determination (1240), wherein according to the second criteria the Active Time of serving cell includes the time while:
  i. drx-onDurationTimer or drx-InactivityTimer configured for the DRX group of this serving cell is running; or
  ii. drx-RetransmissionTimerDL or drx-RetransmissionTimerUL is running on any Serving Cell in the DRX group of this serving cell; or
  iii. a Scheduling Request is sent on PUCCH and is pending; or
  iv. a PDCCH indicating a new transmission addressed to the C-RNTI of the MAC entity has not been received after successful reception of a Random Access Response for the Random Access Preamble not selected by the MAC entity among the contention-based Random Access Preamble.

In other words, when a DRX cycle is configured, the Active Time for Serving Cells in a DRX group includes the time while:
drx-onDurationTimer or drx-InactivityTimer configured for the DRX group is running; or
drx-RetransmissionTimerDL or drx-RetransmissionTimerUL is running on any Serving Cell in the DRX group; or
the DRX group is not the secondary DRX group and ra-ContentionResolutionTimer or msgB-ResponseWindow is running; or
a Scheduling Request is sent on PUCCH and is pending; or
a PDCCH indicating a new transmission addressed to the C-RNTI of the MAC entity has not been received after successful reception of a Random Access Response for the Random Access Preamble not selected by the MAC entity among the contention-based Random Access Preamble.

Embodiment 3-3

1. UE receives RRCReconfiguration message from gNB. The received RRCReconfiguration message includes DRX configuration in the MAC configuration of cell group. Multiple serving cells are configured in the cell group. The cell group can be MCG or SCG.
2. For each serving cell of the cell group for which DRX is configured:
A. UE checks whether serving cell belongs to a DRX group which includes serving cell(s) where UE monitors PDCCH addressed to RA-RNTI, MsgB-RNTI or temporary C-RNTI (TC-RNTI).

B. If the serving cell belongs to a DRX group which includes serving cell(s) where UE monitors PDCCH addressed to RA-RNTI, MsgB-RNTI or TC-RNTI, UE applies the first criteria for active time determination, wherein according to the first criteria the Active Time of serving cell includes the time while:
  i. drx-onDurationTimer or drx-InactivityTimer configured for the DRX group of this serving cell is running; or
  ii. drx-RetransmissionTimerDL or drx-RetransmissionTimerUL is running on any Serving Cell in the DRX group of this serving cell; or
  iii. ra-ContentionResolutionTimer or msgB-ResponseWindow is running; or
  iv. a Scheduling Request is sent on PUCCH and is pending; or
  v. a PDCCH indicating a new transmission addressed to the C-RNTI of the MAC entity has not been received after successful reception of a Random Access Response for the Random Access Preamble not selected by the MAC entity among the contention-based Random Access Preamble.
C. If the serving cell does not belong to a DRX group which includes serving cell(s) where UE monitors PDCCH addressed to RA-RNTI, MsgB-RNTI or TC-RNTI, UE applies the second criteria for active time determination, wherein according to the second criteria the Active Time of serving cell includes the time while:
  i. drx-onDurationTimer or drx-InactivityTimer configured for the DRX group of this serving cell is running; or
  ii. drx-RetransmissionTimerDL or drx-RetransmissionTimerUL is running on any Serving Cell in the DRX group of this serving cell; or
  iii. a Scheduling Request is sent on PUCCH and is pending; or
  iv. a PDCCH indicating a new transmission addressed to the C-RNTI of the MAC entity has not been received after successful reception of a Random Access Response for the Random Access Preamble not selected by the MAC entity among the contention-based Random Access Preamble.

In other words, when a DRX cycle is configured, the Active Time for Serving Cells in a DRX group includes the time while:
  drx-onDurationTimer or drx-InactivityTimer configured for the DRX group is running; or
  drx-RetransmissionTimerDL or drx-RetransmissionTimerUL is running on any Serving Cell in the DRX group; or
  the DRX group include the serving cell where UE monitor PDCCH for RAR/MsgB/Contention resolution (i.e. UE monitors PDCCH addressed to RA-RNTI or MsgB-RNTI or TC-RNTI) and ra-ContentionResolutionTimer or msgB-ResponseWindow is running; or
  a Scheduling Request is sent on PUCCH and is pending; or
  a PDCCH indicating a new transmission addressed to the C-RNTI of the MAC entity has not been received after successful reception of a Random Access Response for the Random Access Preamble not selected by the MAC entity among the contention-based Random Access Preamble.

Embodiment 3-4

Figure 13:
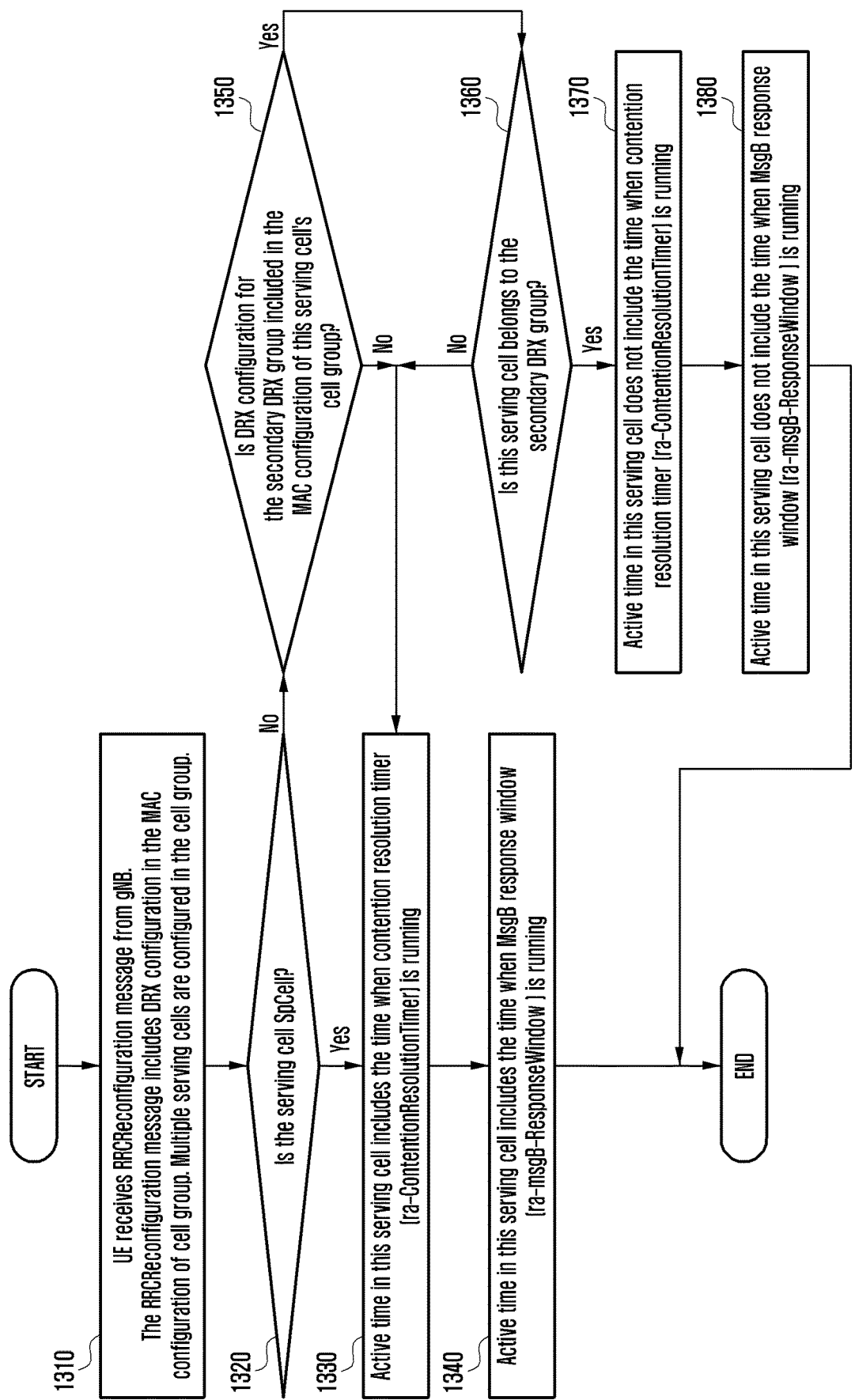
FIG. 13 illustrates a flow chart in accordance with an embodiment of the disclosure.

FIG. 13 illustrates a flow chart for determining the active DRX time in accordance with another embodiment of the disclosure.

1. UE receives RRCReconfiguration message from gNB. The received RRCReconfiguration message includes DRX configuration in the MAC configuration of cell group (1310). Multiple serving cells are configured in the cell group. The cell group can be MCG or SCG.
2. For each serving cell of the cell group for which DRX is configured:
  A. UE checks whether serving cell is SpCell or not (1320).
  B. If the serving cell is the SpCell, active time include the time while:
    i. drx-onDurationTimer or drx-InactivityTimer configured for the DRX group of this serving cell is running; or
    ii. drx-RetransmissionTimerDL or drx-RetransmissionTimerUL is running on any Serving Cell in the DRX group of this serving cell; or
    iii. ra-ContentionResolutionTimer or msgB-ResponseWindow is running (1330, 1340); or
    iv. a Scheduling Request is sent on PUCCH and is pending; or
    v. a PDCCH indicating a new transmission addressed to the C-RNTI of the MAC entity has not been received after successful reception of a Random Access Response for the Random Access Preamble not selected by the MAC entity among the contention-based Random Access Preamble.
  C. If the serving cell is not the SpCell, UE determine whether DRX configuration for the secondary DRX group is included in the MAC configuration of this serving cell's cell group (1350):
    i. If DRX configuration for the secondary DRX group is included in the MAC configuration of this serving cell's cell group (1350) and this serving cell belongs to the secondary DRX group (1360), active time includes the time while (1370, 1380):
      drx-onDurationTimer or drx-InactivityTimer configured for the DRX group of this serving cell is running; or
      drx-RetransmissionTimerDL or drx-RetransmissionTimerUL is running on any Serving Cell in the DRX group of this serving cell; or
      a Scheduling Request is sent on PUCCH and is pending; or
      a PDCCH indicating a new transmission addressed to the C-RNTI of the MAC entity has not been received after successful reception of a Random Access Response for the Random Access Preamble not selected by the MAC entity among the contention-based Random Access Preamble.
    That is, active time in this serving cell does not include the time when contention resolution timer (ra-ContentionResolutionTimer) is running, and the time when MsgB response window (ra-msgB-ResponseWindow) is running (1370, 1380).
    ii. If DRX configuration for the secondary DRX group is not included in the MAC configuration of this serving cell's cell group (1350) or this serving cell does not belong to the secondary DRX group (1360), active time includes the time while:
      drx-onDurationTimer or drx-InactivityTimer configured for the DRX group of this serving cell is running; or
      drx-RetransmissionTimerDL or drx-RetransmissionTimerUL is running on any Serving Cell in the DRX group of this serving cell; or
      ra-ContentionResolutionTimer or msgB-ResponseWindow is running (1330, 1340); or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

Embodiment 3-5

1. UE receives RRCReconfiguration message from gNB. The received RRCReconfiguration message includes DRX configuration in the MAC configuration of cell group. Multiple serving cells are configured in the cell group. The cell group can be MCG or SCG.
2. Active time criteria that affects all serving cells of a CG:
If a Scheduling Request is sent on PUCCH and is pending; or
a PDCCH indicating a new transmission addressed to the C-RNTI of the MAC entity has not been received after successful reception of a Random Access Response for the Random Access Preamble not selected by the MAC entity among the contention-based Random Access Preamble:
UE is considered to be in active time in all serving cells of all the DRX groups in a MAC entity.
3. Active time criteria that affects all serving cells of only primary DRX group:
If ra-ContentionResolutionTimer or msgB-ResponseWindow is running
UE is considered to be in active time in all serving cells of the non secondary DRX group.
4. Active time criteria that affects serving cells of both DRX group(s):
If drx-onDurationTimer or drx-InactivityTimer configured for the DRX group is running; or
drx-RetransmissionTimerDL or drx-RetransmissionTimerUL is running on any Serving Cell in the DRX group:
UE is considered to be in active time in all serving cells that DRX group.

Embodiment 4—Handling RA-RNTI/MsgB-RNTI Ambiguity Handling

In case of 4 step RA, after transmitting RA preamble UE monitors PDCCH addressed to RA-RNTI for network response in RAR response window wherein $$\text{RA-RNTI}=1+s\_id+14*t\_id+14*80*f\_id+14*80*8*ul\_carrier\_id+14*80*8*2*0,$$

where s_id is the index of the first OFDM symbol of the PRACH occasion ($0 \leq s\_id < 14$), t_id is the index of the first slot of the PRACH occasion in a system frame ($0 \leq t\_id < 80$), where the subcarrier spacing to determine t_id is based on the value of $\mu$, f_id is the index of the PRACH occasion in the frequency domain ($0 \leq f\_id < 8$), and ul_carrier_id is the UL carrier used for Random Access Preamble transmission (0 for NUL carrier, and 1 for SUL carrier).

If a valid downlink assignment has been received on the PDCCH for the RA-RNTI and the received TB is successfully decoded:
if the Random Access Response contains a MAC subPDU with Random Access Preamble identifier corresponding to the transmitted PREAMBLE_INDEX:
Random Access Response reception is considered successful.

In case of 2 step RA, after transmitting MsgA, UE monitors PDCCH addressed to MsgB-RNTI for network response in MsgB response window wherein, $$\text{MsgB-RNTI}=1+s\_id+14*t\_id+14*80*f\_id+14*80*8*ul\_carrier\_id+14*80*8*2*1,$$

where s_id is the index of the first OFDM symbol of the PRACH occasion ($0 \leq s\_id < 14$), t_id is the index of the first slot of the PRACH occasion in a system frame ($0 \leq t\_id < 80$), where the subcarrier spacing to determine t_id is based on the value of $\mu$, f_id is the index of the PRACH occasion in the frequency domain ($0 \leq f\_id < 8$), and ul_carrier_id is the UL carrier used for Random Access Preamble transmission (0 for NUL carrier, and 1 for SUL carrier).

If a valid downlink assignment has been received on the PDCCH for the MSGB-RNTI and the received TB is successfully decoded:
if the MSGB contains a fallbackRAR MAC subPDU; and
if the Random Access Preamble identifier in the MAC subPDU matches the transmitted PREAMBLE_INDEX:
Random Access Response reception is considered successful;
else if the MSGB contains a successRAR MAC subPDU; and
if the CCCH SDU was included in the MSGA and the UE Contention Resolution Identity in the MAC subPDU matches the CCCH SDU:
Random Access Response reception is considered successful;

2 step RA and 4 step RA configurations are signaled per BWP. RA configurations indicate the ROs, preambles and other RACH parameters. It is being studied to enhance RACH configuration to support multiple RAN slices wherein UE is configured with multiple RACH configurations. Each configuration is mapped to one or more RAN slices. For mapping RACH configuration to RAN slice(s), slice identity or slice group information or access category associated with slice(s) can be indicated in RACH configuration. For example, RACH config 1: slice a, b
RACH config 2: slice c
RACH config m: slice d, e With several RACH configurations, it is not always possible to provide configurations such that ROs of each configuration have distinct s_id, t_id, f_id. This will result in ambiguity in receiving network response as RA-RNTI/MsgB-RNTI for Msg1/MsgA transmission using different RACH configuration can be same. Preamble partitioning can be done across the RACH configurations for various slices, however this would reduce number of preamble in each configuration. In case we decide to partition preambles amongst different RACH configurations, we may need to include a new field "preambleStartIndex" to indicate the starting preamble in rach configuration.

Each RACH configuration can include following parameters: preambleStartIndex (S), ssb-perRACH-Occasion (Y) and CB-PreamblesPerSSB (X). If preambleStartIndex is not configured, UE assumes preambleStartIndex is zero. In an embodiment, UE can select the RACH configuration corresponding to the slice in which UE is interested. For the selected RACH configuration, UE determines preambles for each SSB as follows:

If Y<1: Preambles starting from S to 'S+X−1' are used. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y', where $N_{preamble}^{total}$ is provided by totalNumberOfRA-Preambles.

During the random access procedure, UE will select SSB and then preamble and RO corresponding to selected SSB wherein preamble is selected from set of preambles and set of ROs determined above. UE then transmit selected PRACH preamble and selected RO.

Embodiment 4-1

In one method of invention it is proposed to modify the RA-RNTI/MsgB-RNTI.

In case of 4 step RA, after transmitting RA preamble UE monitors PDCCH addressed to RA-RNTI for network response (i.e., RAR) in RAR response window wherein RA-RNTI=1+$s$_id+14*$t$_id+14*80*$f$_id+14*80*8*ul_carrier_id+14*80*8*2*RACH type+14*80*8*2*2*rach_config_id, where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ (i.e. SCS index), f_id is the index of the PRACH occasion in the frequency domain (0≤f_id<8), and ul_carrier_id is the UL carrier used for Random Access Preamble transmission (0 for NUL carrier, and 1 for SUL carrier), RACH type is equal to 0 for 4 step RA and rach_config_id is the index of RACH configuration selected by UE for random access. In an embodiment, UE can select the RACH configuration corresponding to the slice in which UE is interested. rach_config_id can be signaled in each RACH configuration. rach_config_id of legacy RACH configuration can be set to 0. If rach_config_id is not signaled, UE assume the value of rach_config_id to be zero. Alternately, rach_config_id can be implicit i.e. there can be a list of RACH configurations, and each configuration is sequentially indexed (e.g. indexing can start from 1 or indexing can start from 0). For example, if there are 8 RACH configurations in the list, $1^{st}$ configuration in the list has index 1, $2^{nd}$ configuration in the list has index 2 and so on. Alternately, if there are 8 RACH configurations in the list, $1^{st}$ configuration in the list has index 0, $2^{nd}$ configuration in the list has index 1 and so on.

In case of 2 step RA, after transmitting MsgA, UE monitors PDCCH addressed to MsgB-RNTI for network response in MsgB response window wherein, MsgB-RNTI1+$s$_id+14*$t$_id+14*80*$f$_id+14*80*8*ul_carrier_id+14*80*8*2*RACH type+14*80*8*2*2*rach_config_id, where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ (i.e. SCS index), f_id is the index of the PRACH occasion in the frequency domain (0≤f_id<8), and ul_carrier_id is the UL carrier used for Random Access Preamble transmission (0 for NUL carrier, and 1 for SUL carrier), RACH type is equal to 1 for 2 step RA and rach_config_id is the index of RACH configuration selected by UE for random access. In an embodiment, UE can select the RACH configuration corresponding to the slice in which UE is interested. rach_config_id can be signaled in each RACH configuration. Rach_config_id of legacy RACH configuration can be set to 0. If rach_config_id is not signaled, UE assume the value of rach_config_id to be zero. Alternately, rach_config_id can be implicit i.e. there can be a list of RACH configurations, and each configuration is sequentially indexed (e.g. indexing can start from 1 or indexing can start from 0). For example, if there are 8 RACH configurations in the list, $1^{st}$ configuration in the list has index 1, $2^{nd}$ configuration in the list has index 2 and so on. Alternately, if there are 8 RACH configurations in the list, $1^{st}$ configuration in the list has index 0, $2^{nd}$ configuration in the list has index 1 and so on.

Note that in above operation UE monitors PDCCH in search space configured by parameter rar-searchSpace in BWP selected for RA.

Embodiment 4-2

In this method of the disclosure, GNB signals RAR search space id of search space to be used for a particular RA configuration. RAR search space id can be signaled in each RACH configuration. If not signaled, UE uses the RAR search space id signaled in common configuration of BWP selected for RA. In an embodiment, UE can select the RACH configuration corresponding to the slice in which UE is interested. For network response UE monitors PDCCH in search space indicated by RAR search space id corresponding to selected RACH configuration.

In case of 4 step RA, after transmitting RA preamble UE monitors PDCCH addressed to RA-RNTI for network response in RAR response window wherein RA-RNTI1+$s$_id+14*$t$_id+14*80*$f$_id+14*80*8*ul_carrier_id+14*80*8*2*0, where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ, f_id is the index of the PRACH occasion in the frequency domain (0≤f_id<8), and ul_carrier_id is the UL carrier used for Random Access Preamble transmission (0 for NUL carrier, and 1 for SUL carrier). In the RAR response window, UE monitor PDCCH monitoring occasions of search indicated by RAR search space id corresponding to selected RACH configuration In case of 2 step RA, after transmitting MsgA, UE monitors PDCCH addressed to MsgB-RNTI for network response in MsgB response window wherein, MsgB-RNTI1+$s$_id+14*$t$_id+14*80*$f$_id+14*80*8*ul_carrier_id+14*80*8*2*1, where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ, f_id is the index of the PRACH occasion in the frequency domain (0≤f_id<8), and ul_carrier_id is the UL carrier used for Random Access Preamble transmission (0 for NUL carrier, and 1 for SUL carrier). In the MsgB response window, UE monitor PDCCH monitoring occasions of search indicated by RAR search space id corresponding to selected RACH configuration Embodiment 4-3

UE is configured with multiple RACH configurations. Each configuration is mapped to one or more RAN slices. rach_config_id can be signaled in each RACH configuration. rach_config_id of legacy RACH configuration can be set to 0. If rach_config_id is not signaled, UE assume the value of rach_config_id to be zero. Alternately, rach_config_id can be implicit i.e. there can be a list of RACH configurations, and each configuration is sequentially indexed (e.g. indexing can start from 1 or indexing can start from 0). For example, if there are 8 RACH configurations in the list, $1^{st}$ configuration in the list has index 1, $2^{nd}$ configuration in the list has index 2 and so on. Alternately, if there are 8 RACH configurations in the list, $1^{st}$ configuration in the list has index 0, $2^{nd}$ configuration in the list has index 1 and so on. UE can select the RACH configuration corresponding to the slice in which UE is interested.

In case of 4 step RA, after transmitting RA preamble UE monitors PDCCH addressed to RA-RNTI for network response in RAR response window wherein, RA-RNTI1+$s\_id$+14*$t\_id$+14*80*$f\_id$+14*80* 8*ul_carrier_id+14*80*8*2*0, where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ, f_id is the index of the PRACH occasion in the frequency domain (0≤f_id<8), and ul_carrier_id is the UL carrier used for Random Access Preamble transmission (0 for NUL carrier, and 1 for SUL carrier). In the RAR response window, UE monitor PDCCH monitoring occasions of search indicated by parameter rar-searchSpace in BWP selected for RA.

In case of 2 step RA, after transmitting MsgA, UE monitors PDCCH addressed to MsgB-RNTI for network response in MsgB response window wherein, MsgB-RNTI1+$s\_id$+14*$t\_id$+14*80*$f\_id$+ 14*80*8*ul_carrier_id+14*80*8*2*1, where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ, f_id is the index of the PRACH occasion in the frequency domain (0≤f_id<8), and ul_carrier_id is the UL carrier used for Random Access Preamble transmission (0 for NUL carrier, and 1 for SUL carrier). In the MsgB response window, UE monitor PDCCH monitoring occasions of search indicated by parameter rar-searchSpace in BWP selected for RA.

In this method, rach_config_id is included in DCI of PDCCH addressed to RA-RNTI and MsgB-RNTI.

If RACH configuration selected by UE for RA is associated with rach_config_id
  if rach_config_id in DCI matches the rach_config_id of RACH configuration selected by UE for RA; and
  if LSBs of SFN are included in DCI and matches the LSBs of SFN in which UE has transmitted RA preamble (note that this step is not there in an embodiment in which LSBs of SFN is not included in DCI):

UE receives and decodes the TB scheduled by DCI.
Else
  UE does not receive and decodes the TB scheduled by DCI.

New DCI format can be used to avoid impact to legacy UEs or gNB can configure two RAR search spaces, one for legacy RACH config and another for new RACH configurations. The UE selecting legacy RACH configurations monitor in first RAR search space and the UE selecting other RACH configurations specific to slice monitor PDCCH for network response in second RAR search space. First and second RAR search space is signaled by gNB in BWP configuration.

Embodiment 4-4

UE is configured with multiple RACH configurations. Each configuration is mapped to one or more RAN slices. rach_config_id can be signaled in each RACH configuration. rach_config_id of legacy RACH configuration can be set to 0. If rach_config_id is not signaled, UE assume the value of rach_config_id to be zero. Alternately, rach_config_id can be implicit i.e. there can be a list of RACH configurations, and each configuration is sequentially indexed (e.g. indexing can start from 1 or indexing can start from 0). For example, if there are 8 RACH configurations in the list, $1^{st}$ configuration in the list has index 1, $2^{nd}$ configuration in the list has index 2 and so on. Alternately, if there are 8 RACH configurations in the list, $1^{st}$ configuration in the list has index 0, $2^{nd}$ configuration in the list has index 1 and so on. UE can select the RACH configuration corresponding to the slice in which UE is interested.

In case of 4 step RA, after transmitting RA preamble UE monitors PDCCH addressed to RA-RNTI for network response in RAR response window wherein, RA-RNTI1+$s\_id$+14*$t\_id$+14*80*$f\_id$+14* 80*8*ul_carrier_id+14*80*8*2*0, where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ, f_id is the index of the PRACH occasion in the frequency domain (0≤f_id<8), and ul_carrier_id is the UL carrier used for Random Access Preamble transmission (0 for NUL carrier, and 1 for SUL carrier). In the RAR response window, UE monitor PDCCH monitoring occasions of search indicated by parameter rar-searchSpace in BWP selected for RA.

If a valid downlink assignment has been received on the PDCCH for the RA-RNTI and the received TB is successfully decoded:
  if the Random Access Response contains a MAC subPDU with Random Access Preamble identifier corresponding to the transmitted PREAMBLE_INDEX and contains rach_config_id which matches the rach_config_id of RACH configuration selected by UE for RA:
    Random Access Response reception is considered successful.

In case of 2 step RA, after transmitting MsgA, UE monitors PDCCH addressed to MsgB-RNTI for network response in MsgB response window wherein, MsgB-RNTI1+$s\_id$+14*$t\_id$+14*80*$f\_id$+ 14*80*8*ul_carrier_id+14*80*8*2*1, where s_id is the index of the first OFDM symbol of the PRACH occasion (0≤s_id<14), t_id is the index of the first slot of the PRACH occasion in a system frame ($0 \leq t\_id < 80$), where the subcarrier spacing to determine t_id is based on the value of µ, f_id is the index of the PRACH occasion in the frequency domain ($0 \leq f\_id < 8$), and ul_carrier_id is the UL carrier used for Random Access Preamble transmission (0 for NUL carrier, and 1 for SUL carrier). In the MsgB response window, UE monitor PDCCH monitoring occasions of search indicated by parameter rar-searchSpace in BWP selected for RA.

If a valid downlink assignment has been received on the PDCCH for the MSGB-RNTI and the received TB is successfully decoded:
  if the MSGB contains a fallbackRAR MAC subPDU; and
  if the Random Access Preamble identifier in the MAC subPDU matches the transmitted PREAMBLE_INDEX and contains rach_config_id which matches the rach_config_id of RACH configuration selected by UE for RA:
    Random Access Response reception is considered successful;
  else if the MSGB contains a successRAR MAC subPDU; and
  if the CCCH SDU was included in the MSGA and the UE Contention Resolution Identity in the MAC subPDU matches the CCCH SDU:
    Random Access Response reception is considered successful;

In an embodiment, new DCI format can be used to avoid impact to legacy UEs or gNB can configure two RAR search spaces, one for legacy RACH-config and another for new RACH configurations. The UE selecting legacy RACH configurations monitor in first RAR search space and the UE selecting other RACH configurations specific to slice monitor PDCCH for network response in second RAR search space. First and second RAR search space is signaled by gNB in BWP configuration.

In an embodiment, gNB can locate the RAR subPDU corresponding to preamble transmitted using new configuration in the rear part of RAR MAC PDU. In this case, UE shall ignore the legacy RAR subPDU having matching RAPID and looking to the new RAR subPDU having matching RAPID. If there are multiple RAR subPDUs for a RAPID corresponding to preamble transmitted by UE, if UE has selected RACH config specific to slice, it ignores the first RAR subPDU having matching RAPID.

Embodiment 4-5

In an embodiment gNB can configure non overlapped ROs such that when s_id, t_id is same for ROs in different RACH config, the ROs of one RACH config and ROs of another RACH config are frequency division multiplexed (FDMed).

In this case fid numbering is done across ROs (starting from lowest PRB in BWP) of all RACH configurations. Note that currently F_id numbering is within ROs of a RACH configuration. RA-RNTI and MSGB-RNTI is determined as in embodiment 4-4 for monitoring PDCCH for network response.

Embodiment 4-6

UE is configured with multiple RACH configurations. Each configuration is mapped to one or more RAN slices. Rach_config_id can be signaled in each RACH configuration. Rach_config_id of legacy RACH configuration can be set to 0. If rach_config_id is not signaled, UE assume the value of rach_config_id to be zero. Alternately, rach_config_id can be implicit i.e. there can be a list of RACH configurations, and each configuration is sequentially indexed (e.g. indexing can start from 1 or indexing can start from 0). For example, if there are 8 RACH configurations in the list, $1^{st}$ configuration in the list has index 1, $2^{nd}$ configuration in the list has index 2 and so on. Alternately, if there are 8 RACH configurations in the list, $1^{st}$ configuration in the list has index 0, $2^{nd}$ configuration in the list has index 1 and so on.

UE receives PDCCH order. In an embodiment, rach_config_id can be included in PDCCH order. UE select the RACH configuration corresponding to rach_config_id for RA initiated by PDCCH order. If rach_config_id is not included, UE select the legacy RACH configuration. In an embodiment, UE select always select the legacy RACH configuration for performing RA initiated by PDCCH order.

Embodiment 5—Handling RA Cancellation for SCell BFR

As beam failure recovery is triggered for SCell upon beam failure detection, scheduling request is triggered (as either UL SCH resources are not available for new transmission or UL-SCH resources available for new transmission cannot accommodate neither the BFR MAC CE nor the truncated BFR MAC CE plus its subheader as a result of logical channel prioritization). Random access procedure is initiated on SpCell as SR resources are not configured for SCell BFR. While the random access procedure initiated for pending SR for SCell BFR for which PUCCH resources are not configured is ongoing, SCell is deactivated. An SCell is deactivated if timer sCellDeactivationTimer expires or if UE receives deactivation command from gNB. Upon deactivation of SCell,
  All pending SRs for BFR for deactivated SCell are cancelled
  All pending BFRs for deactivated SCell are cancelled
  Ongoing random access procedure initiated for pending SR for SCell BFR for which PUCCH resources are not configured is cancelled if there is no pending BFR for any SCell.

The issue with the above operation is that during the ongoing RA procedure initiated for pending SR for SCell BFR for which PUCCH resources are not configured), UE may have already received UL grant in RAR (in case of 4 step RA) or fallback RAR (in case of 2 step RA) and initiated Msg3 transmission. If random access procedure is stopped, gNB will not receive Msg3 and will schedule UL grant for Msg3 retransmission. The gNB will keep re-scheduling the Msg3 retransmissions, which may cause lots of resource waste.

Embodiment 5-1

UE is configured with beam failure detection configuration for one or more SCells. The beam failure detection configuration is signaled by gNB in RRC Reconfiguration message. The beam failure detection configuration is separately configured for different serving cells.

UE is also configured with BFR configuration for one or more SCells. The beam failure recovery configuration is signaled by gNB in RRC Reconfiguration message. BeamFailureRecoverySCellConfig information element (IE) is signaled in BWP configuration of SCell for beam failure recovery of that SCell. The BeamFailureRecovery-SCellConfig includes list of candidate beams (candidate-BeamRSSCellList).

UE is not configured with SR configuration (PUCCH resources, prohibit timer, sr-TransMax) for SCell BFR.

For an SCell configured with beam failure detection, if beam failure detection criterion (as explained earlier) is met, UE triggers BFR for that SCell.

For a pending BFR (triggered but not cancelled), SR is triggered as either UL-SCH resources are not available for new transmission or UL-SCH resources available for new transmission cannot accommodate neither the BFR MAC CE nor truncated BFR MAC CE plus its subheader as a result of LCP.

For pending SR for BFR, random access procedure is initiated as SR resources are not configured for SCell BFR.

While the random access procedure initiated for pending SR for SCell BFR for which PUCCH resources are not configured, an SCell for which beam failure detection is configured is deactivated. An SCell is deactivated if timer sCellDeactivationTimer expires or if UE receives deactivation command from gNB.

Figure 14:
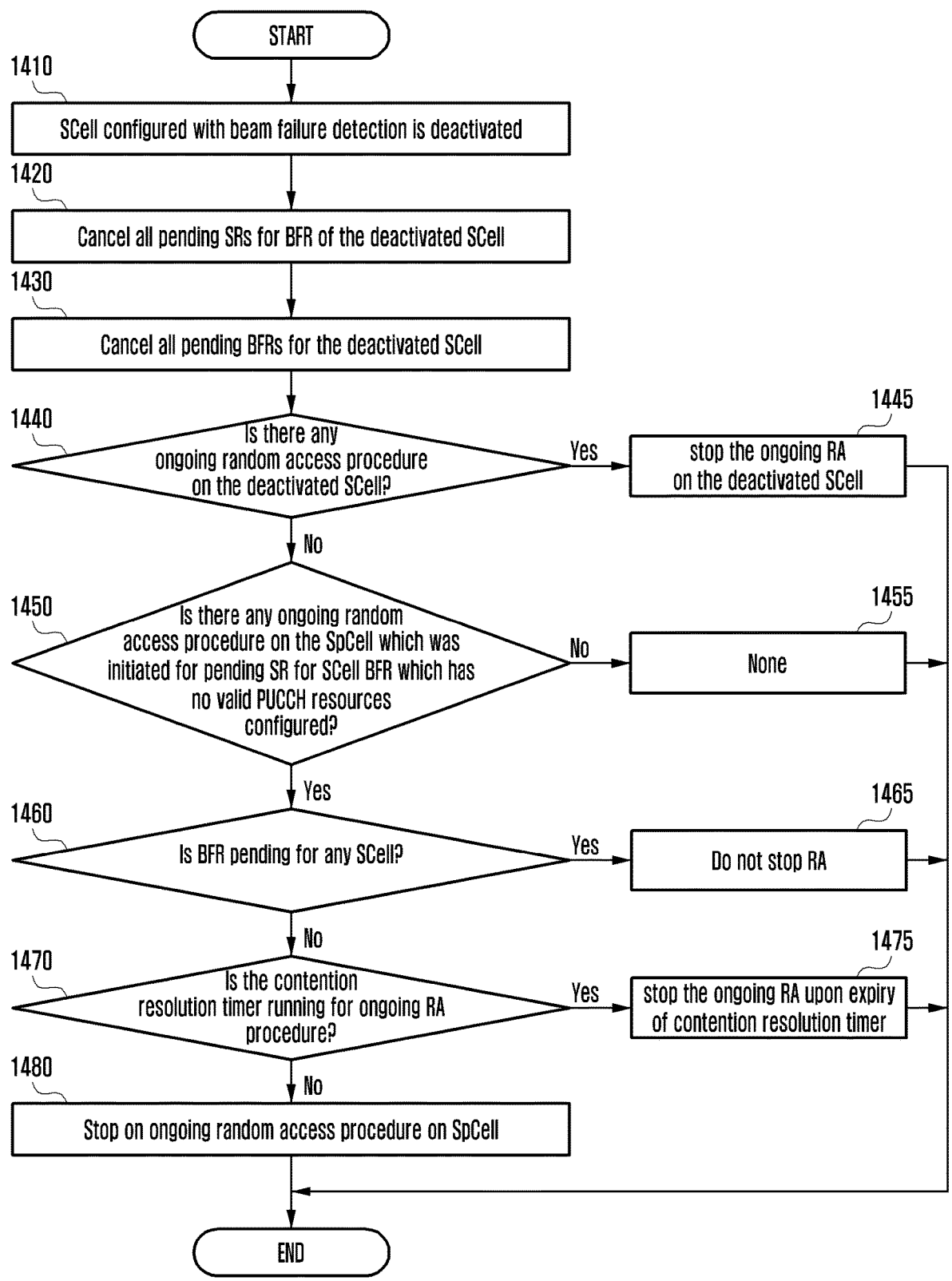
FIG. 14 illustrates a flow chart in accordance with an embodiment of the disclosure.

FIG. 14 illustrates a flow chart in accordance with an embodiment of the disclosure.

Upon deactivation of SCell configured with beam failure detection (1410), MAC entity (in UE) of the CG associated with that SCell performs the following operation with respect to BFR as shown in FIG. 14:

- cancels all pending SRs for BFR for the deactivated SCell (1420)
- cancels all pending BFRs for the deactivated SCell (1430)
- if there is an ongoing random access procedure on the deactivated SCell (1440), stop the ongoing random access procedure (1445)
- if there is an ongoing random access procedure on SpCell which was initiated for pending SR for SCell BFR (1450):
  - if BFR is not pending for any SCell (i.e. all pending BFRs if any are cancelled) (1460):
    - if the contention resolution timer is not running (1470): stop the ongoing random access procedure (1480)
    - if the contention resolution timer is running (1470): upon expiry of contention resolution timer, stop the ongoing random access procedure (1475)
  - if BFR is pending for any SCell (1460):
    - the ongoing random access procedure is not stopped (1465).

The advantage of this operation is that during the ongoing RA procedure initiated for pending SR for SCell BFR for which PUCCH resources are not configured), if UE has already received UL grant in RAR (in case of 4 step RA) or fallback RAR (in case of 2 step RA) and initiated Msg3 transmission, random access procedure is not stopped. So gNB can receive Msg3 and will not schedule UL grant for Msg3 retransmission.

In an embodiment, upon stopping the ongoing random access procedure on SpCell:

- If UE has switched the active UL BWP from UL BWP X to UL BWP Y upon initiation of this random access procedure, UE switches the active UL BWP from UL BWP Y to UL BWP X
- If UE has switched the active DL BWP from DL BWP A to DL BWP B upon initiation of this random access procedure, UE switches the active DL BWP from DL BWP B to UL BWP A
- If the UE has switched UL carrier from NUL to SUL upon initiation of this random access procedure, UE switches carrier from SUL to NUL
- If the UE has switched UL carrier from SUL to NUL upon initiation of this random access procedure, UE switches carrier from NUL to SUL Embodiment 5-2

UE is configured with beam failure detection configuration for one or more SCells. The beam failure detection configuration is signaled by gNB in RRC Reconfiguration message. The beam failure detection configuration is separately configured for different serving cells.

UE is also configured with BFR configuration for one or more SCells. The beam failure recovery configuration is signaled by gNB in RRC Reconfiguration message. BeamFailureRecoverySCellConfig IE is signaled in BWP configuration of SCell for beam failure recovery of that SCell. The BeamFailureRecoverySCellConfig includes list of candidate beams (candidateBeamRSSCellList).

UE is not configured with SR configuration (PUCCH resources, prohibit timer, sr-TransMax) for SCell BFR.

For an SCell configured with beam failure detection, if beam failure detection criterion (as explained earlier) is met, UE triggers BFR for that SCell.

For a pending BFR (triggered but not cancelled), SR is triggered as either UL SCH resources are not available for new transmission or UL-SCH resources available for new transmission cannot accommodate neither the BFR MAC CE nor truncated BFR MAC CE plus its subheader as a result of LCP.

For pending SR for BFR, random access procedure is initiated as SR resources are not configured for SCell BFR.

While the random access procedure initiated for pending SR for SCell BFR for which PUCCH resources are not configured, an SCell for which beam failure detection is configured is deactivated. An SCell is deactivated if timer sCellDeactivationTimer expires or if UE receives deactivation command from gNB.

Figure 15:
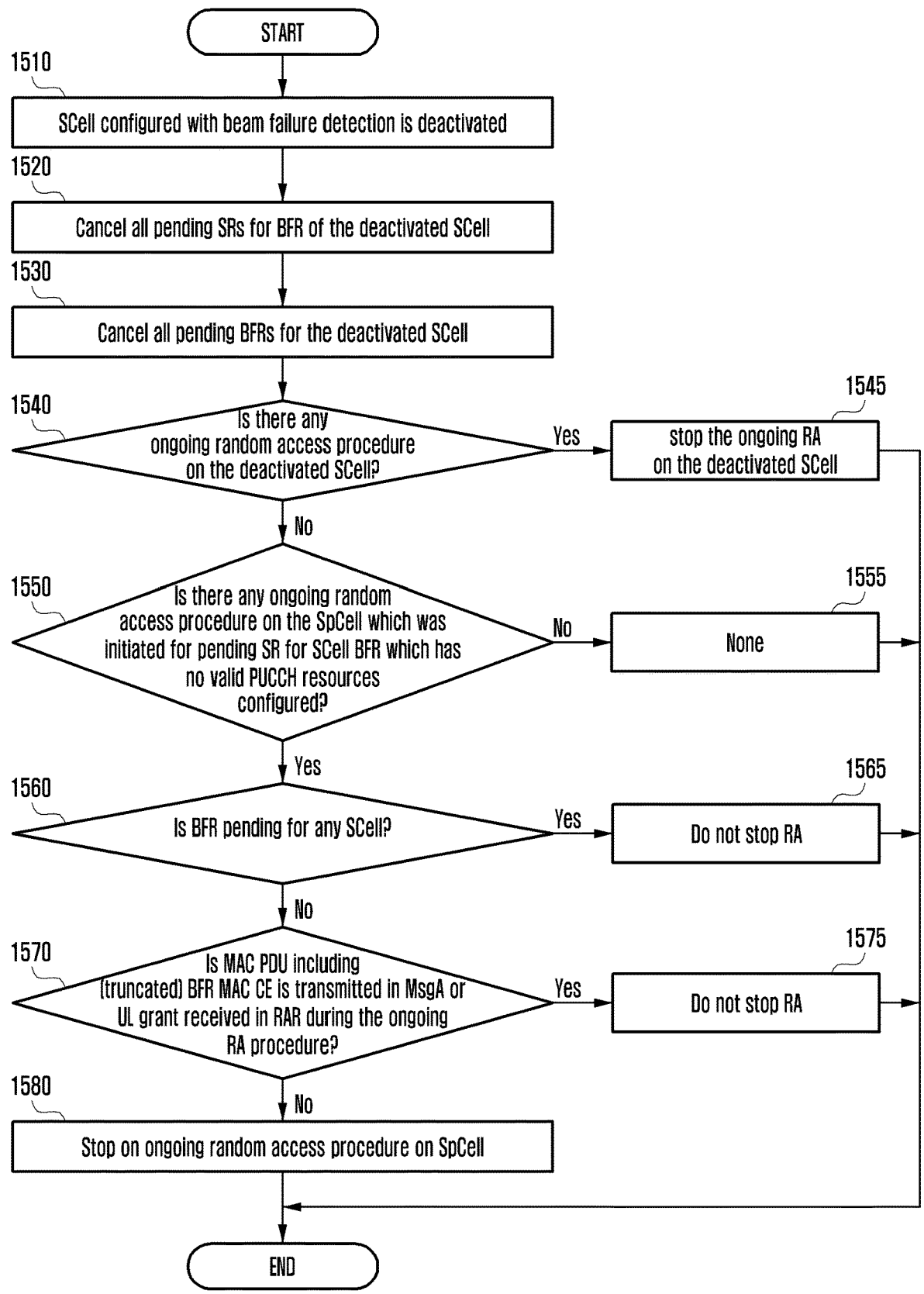
FIG. 15 illustrates a flow chart in accordance with an embodiment of the disclosure.

FIG. 15 illustrates a flow chart in accordance with an embodiment of the disclosure.

Upon deactivation of SCell configured with beam failure detection (1510), MAC entity (in UE) of the CG associated with that SCell performs the following operation with respect to BFR as shown in FIG. 15:

- cancels all pending SRs for BFR for the deactivated SCell (1520)
- cancels all pending BFRs for the deactivated SCell (1530)
- if there is an ongoing random access procedure on the deactivated SCell (1540), stop the ongoing random access procedure (1545)
- if there is an ongoing random access procedure on SpCell which was initiated for pending SR for SCell BFR (1550):
  - if BFR is not pending for any SCell (i.e. all pending BFRs if any are cancelled)
    - if the MAC PDU including (truncated) BFR MAC CE is not transmitted in MsgA or UL grant received in RAR during the ongoing RA procedure (1570): stop the ongoing random access procedure (1580)
    - if MAC PDU including (truncated) BFR MAC CE is transmitted in MsgA or UL grant received in RAR during the ongoing RA procedure (1570): the ongoing random access procedure is not stopped (1575).

if BFR is pending for any SCell (1560):
    the ongoing random access procedure is not stopped (1565).

Figure 16:
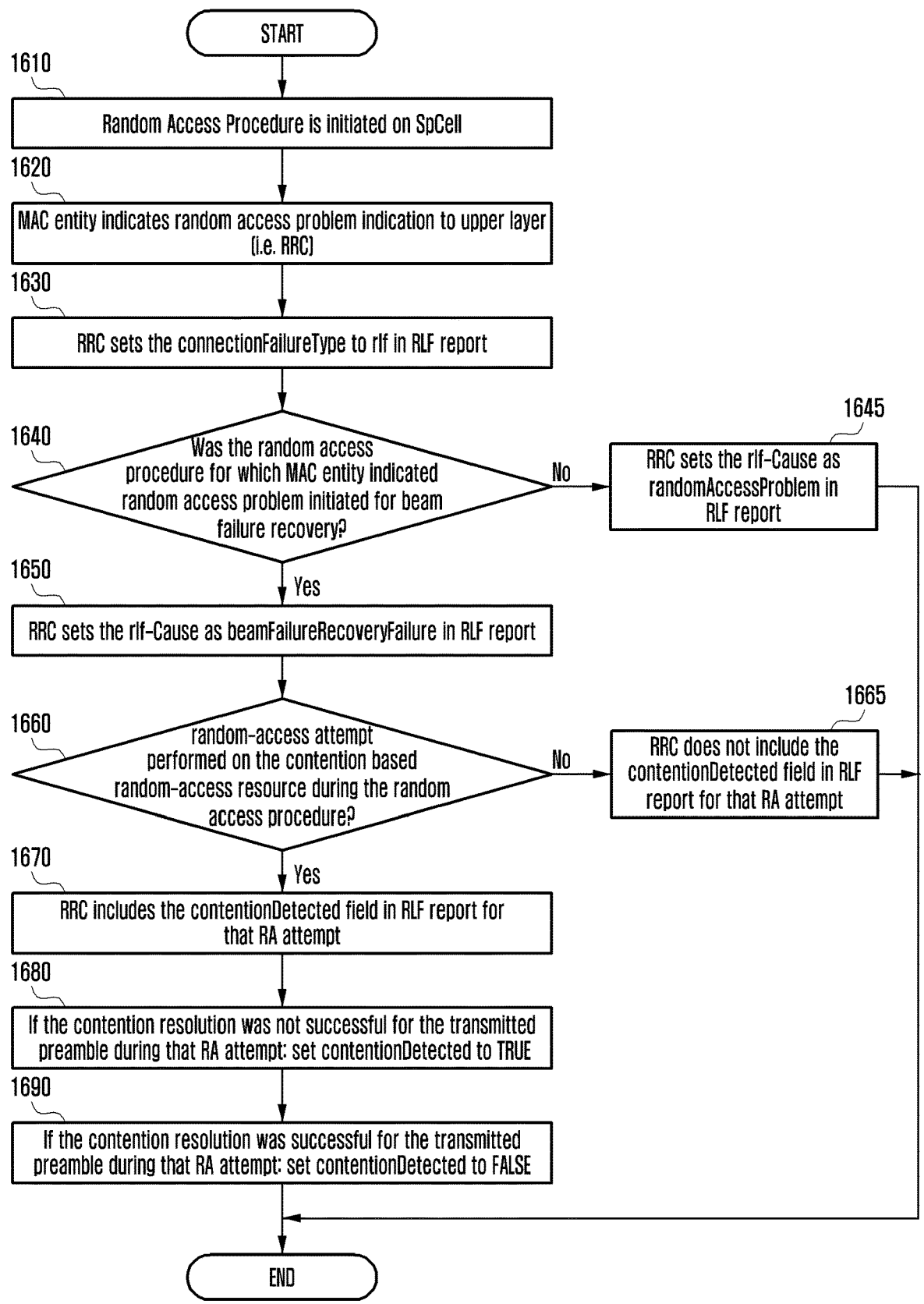
FIG. 16 illustrates a flow chart in accordance with an embodiment of the disclosure.

In an embodiment, upon stopping the ongoing random access procedure on SpCell:
    If UE has switched the active UL BWP from UL BWP X to UL BWP Y upon initiation of this random access procedure, UE switches the active UL BWP from UL BWP Y to UL BWP X
    If UE has switched the active DL BWP from DL BWP A to DL BWP B upon initiation of this random access procedure, UE switches the active DL BWP from DL BWP B to UL BWP A
    If the UE has switched UL carrier from NUL to SUL upon initiation of this random access procedure, UE switches carrier from SUL to NUL
    If the UE has switched UL carrier from SUL to NUL upon initiation of this random access procedure, UE switches carrier from NUL to SUL Embodiment 6—RLF Report Generation FIG. 16 illustrates a flow chart in accordance with an embodiment of the disclosure. In an embodiment of this disclosure, UE operation is as FIG. 16:
    Random Access Procedure is initiated on SpCell (1610)
    MAC entity indicates random access problem indication to upper layer (i.e. RRC) (1620), MAC entity indicates this when PREAMBLE_TRANSMISSION_COUNTER become equal to preambleTransMax+1. The preambleTransMax is signaled by gNB in RACH configuration.
    RRC sets the connectionFailureType to rlf in RLF report (1630)
    RRC checks if the random access procedure for which MAC entity indicated random access problem was initiated for beam failure recovery or not (1640)
    if the random access procedure for which MAC entity indicated random access problem was initiated for beam failure recovery (1640):
        RRC sets the rlf-Cause as beamFailureRecoveryFailure in RLF report (1650);
    Else (1640):
        RRC sets the rlf-Cause as randomAccessProblem in RLF report (1645);
    For each RA attempt during the random access procedure RRC performs the following
        RRC checks if the random-access attempt was performed on the contention based random-access resource or not (1660).
        if the random-access attempt was performed on the contention based random-access resource (1660):
            RRC includes the contentionDetected field in RLF report for that RA attempt (1670).
            If the contention resolution was not successful for the transmitted preamble during that RA attempt: set contentionDetected to TRUE (1680)
            If the contention resolution was successful for the transmitted preamble during that RA attempt: set contentionDetected to FALSE (1690)
        Else (1660)
            RRC does not include the contentionDetected field in RLF report for that RA attempt (1665)
    Note that other parameters may be included in RLF report.
    UE stores the RLF report and sends to gNB (e.g. in UE information response message) when requested by gNB (e.g. in UE information request message). The advantage of this procedure is that RRC can identify and report beam failure recovery failure or random access problem to gNB as part of RLF report upon receiving random access problem indication from MAC entity, unlike the existing procedure wherein RRC always indicates random access problem in RLF report upon receiving random access problem indication from MAC entity.

According to an embodiment, the following procedures can be performed:
    if RA attempt is based on SSB:
        If random access procedure was initiated by PDCCH order where PDCCH order indicates CFRA resource (i.e. ra-PreambleIndex received in PDCCH order is not 0b000000):
            RRC includes the dlRSRPAboveThreshold field in RLF report for that RA attempt
            if the SS/PBCH block RSRP of the SS/PBCH block corresponding to the random-access resource used in the random-access attempt is above rsrp-ThresholdSSB:
                set the dlRSRPAboveThreshold to true;
            else:
                set the dlRSRPAboveThreshold to false;
        else if the random-access attempt was performed based on the contention based random-access resource
            RRC includes the dlRSRPAboveThreshold field in RLF report for that RA attempt
            if the SS/PBCH block RSRP of the SS/PBCH block corresponding to the random-access resource used in the random-access attempt is above rsrp-ThresholdSSB:
                set the dlRSRPAboveThreshold to true;
            else:
                set the dlRSRPAboveThreshold to false;
    else if RA attempt is based on CSI RS:
        RRC does not include the dlRSRPAboveThreshold field in RLF report for that RA attempt.

Figure 17:
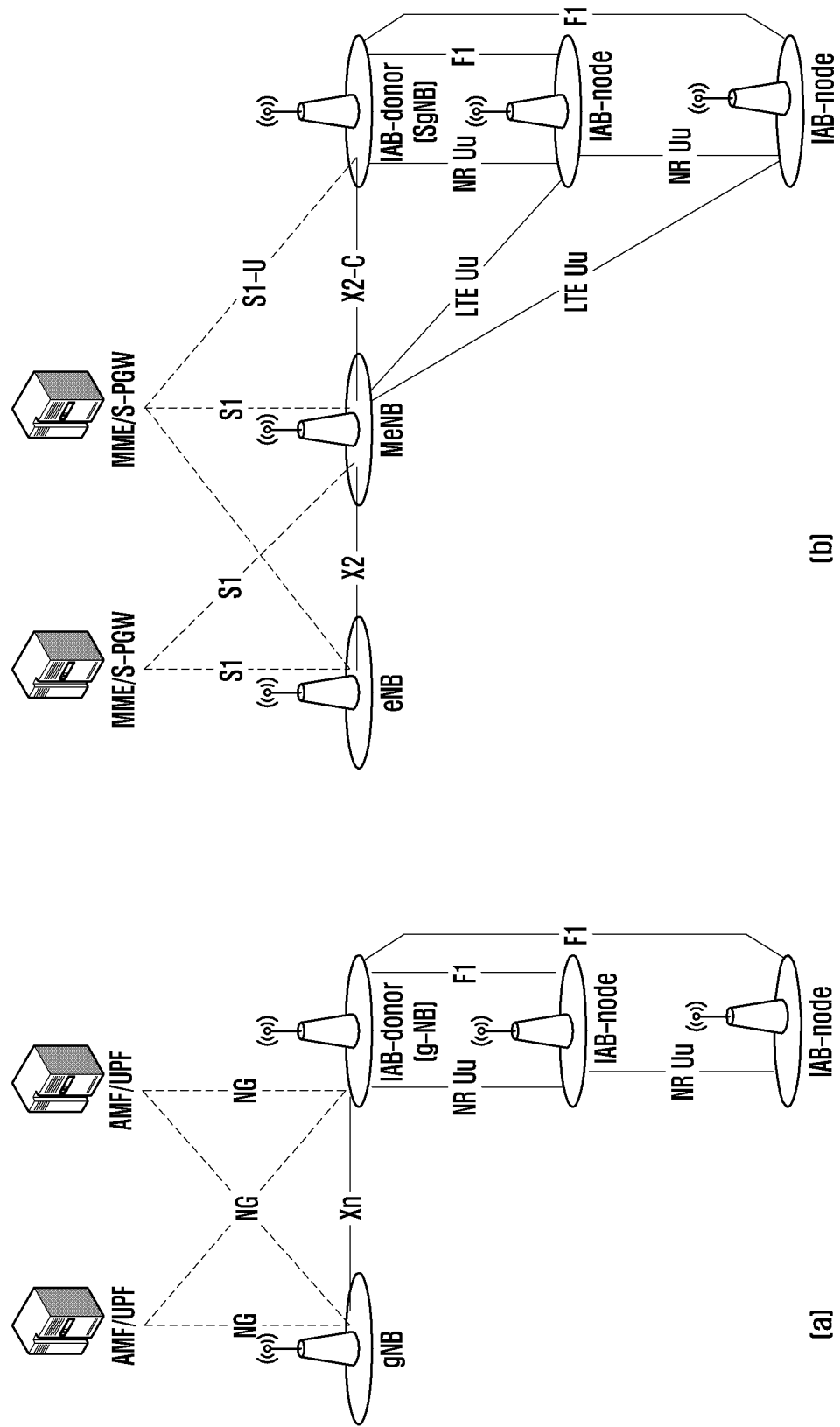
FIG. 17 illustrates an integrated access and backhaul (IAB) architecture in accordance with an embodiment of the disclosure.

FIG. 17 illustrates an integrated access and backhaul (IAB) architecture in accordance with an embodiment of the disclosure. IAB-node using SA (stand-alone) mode with NGC (new generation core) is disclosed in FIG. 17(*a*) and IAB-node using EUTRA-NR DC (EN-DC) is disclosed in FIG. 17(*b*)

In the fifth generation wireless communication system, IAB is supported. IAB enables wireless relaying in NG-RAN. The relaying node, referred to as IAB-node, supports access and backhauling via NR. The terminating node of NR backhauling on network side is referred to as the IAB-donor, which represents a gNB with additional functionality to support IAB. Backhauling can occur via a single or via multiple hops.

The IAB-node supports gNB-DU functionality to terminate the NR access interface to UEs and next-hop IAB-nodes, and to terminate the F1 protocol to the gNB-CU functionality on the IAB-donor. The IAB-node DU is also referred to as IAB distributed unit (IAB-DU).

In addition to the gNB-DU functionality, the IAB-node also supports a subset of the UE functionality referred to as IAB mobile termination (IAB-MT), which includes, e.g., physical layer, layer-2, RRC and NAS functionality to connect to the gNB-DU of another IAB-node or the IAB-donor, to connect to the gNB-CU on the IAB-donor, and to the core network.

The IAB-node can access the network using either SA-mode or EN-DC. In EN-DC, the IAB-node also connects via E-UTRA to a MeNB, and the IAB-donor terminates X2-C as SgNB.

As described above, in the fifth generation wireless communication system, node B (gNB) or base station in cell broadcast SSB consists of PSS, SSS and system information. System information includes common parameters needed to communicate in cell. In the fifth generation wireless communication system (also referred as next generation radio or NR), System Information (SI) is divided into the MIB and a number of SIBs where:

- the MIB is always transmitted on the PBCH with a periodicity of 80 ms and repetitions made within 80 ms and it includes parameters that are needed to acquire SIB1 from the cell.
- the SIB1 is transmitted on the DL-SCH with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;
- SIBs other than SIB1 and posSIBs are carried in SI messages, which are transmitted on the DL-SCH. Only SIBs or posSIBs having the same periodicity can be mapped to the same SI message. SIBs and posSIBs are mapped to the different SI messages. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID;

The mapping of SIBs to SI messages is configured in schedulingInfoList, while the mapping of posSIBs to SI messages is configured in posSI-SchedulingInfoList;

- For a UE in RRC_CONNECTED, the network can provide system information through dedicated signalling using the RRCReconfiguration message, e.g. if the UE has an active BWP with no common search space configured to monitor system information, paging, or upon request from the UE.
- For PSCell and SCells, the network provides the required SI by dedicated signalling, i.e. within an RRCReconfiguration message. Nevertheless, the UE shall acquire MIB of the PSCell to get SFN timing of the SCG (which may be different from MCG). Upon change of relevant SI for SCell, the network releases and adds the concerned SCell. For PSCell, the required SI can only be changed with Reconfiguration with Sync.

The UE perform SI acquisition procedure upon cell selection (e.g. upon power on), cell-reselection, return from out of coverage, after reconfiguration with sync completion, after entering the network from another RAT, upon receiving an indication that the system information has changed, upon receiving a PWS notification, upon receiving request (e.g., a positioning request) from upper layers; and whenever the UE does not have a valid version of a stored or required SIB.

Upon receiving the SIB1 the UE performs the following operation:
1> store the acquired SIB1;
1> if the cellAccessRelatedInfo contains an entry with the PLMN-Identity of the selected PLMN:
  2> in the remainder of the procedures use plmn-IdentityList, trackingAreaCode, and cellIdentity for the cell as received in the corresponding PLMN-IdentityInfo containing the selected PLMN;
1> if the cellAccessRelatedInfo contains an entry with the NPN-Identity of the selected NPN:
  2> in the remainder of the procedures use npn-IdentityList, trackingAreaCode, and cellIdentity for the cell as received in the corresponding NPN-IdentityInfo containing the selected NPN;
1> if in RRC_CONNECTED while T311 is not running:
  2> disregard the frequencyBandList, if received, while in RRC_CONNECTED;
  2> forward the cellIdentity to upper layers;
  2> forward the trackingAreaCode to upper layers;
  2> apply the configuration included in the servingCellConfigCommon;
  2> if the UE has a stored valid version of a SIB, that the UE requires to operate within the cell:
    3> use the stored version of the required SIB;
  2> else if the UE has an active BWP configured with common search space configured with the field searchSpaceOtherSystemInformation and the UE has not stored a valid version of a SIB or according to the request from upper layers:
    3> for the SI message(s) that, according to the si-SchedulingInfo, contain at least one required SIB and for which si-BroadcastStatus is set to broadcasting:
      4> acquire the SI message(s) corresponding to the requested SIB(s);
    3> if onDemandSIB-Request is set to true and timer T350 is not running:
      4> for the SI message(s) that, according to the si-SchedulingInfo, contain at least one required SIB and for which si-BroadcastStatus is set to notBroadcasting:
        5> start timer T350 with the timer value set to the onDemandSIB-RequestProhibitTimer;
        5> trigger a request to acquire the required SIB(s)
  2> else if the UE has an active BWP not configured with common search space configured with the field searchSpaceOtherSystemInformation and the UE has not stored a valid version of a SIB:
    3> if onDemandSIB-Request is set to true and timer T350 is not running:
      4> start timer T350 with the timer value set to the onDemandSIB-RequestProhibitTimer;
      4> trigger a request to acquire the required SIB(s)
1> else:
  2> if the UE supports one or more of the frequency bands indicated in the frequencyBandList for downlink for TDD, or one or more of the frequency bands indicated in the frequencyBandList for uplink for FDD, and they are not downlink only bands, and 2> if the UE supports at least one additionalSpectrumEmission in the NR-NS-PmaxList for a supported band in the downlink for TDD, or a supported band in uplink for FDD, and
2> if the UE supports an uplink channel bandwidth with a maximum transmission bandwidth configuration which
　is smaller than or equal to the carrierBandwidth (indicated in uplinkConfigCommon for the SCS of the initial uplink BWP), and which
　is wider than or equal to the bandwidth of the initial uplink BWP, and
2> if the UE supports a downlink channel bandwidth with a maximum transmission bandwidth configuration which
　is smaller than or equal to the carrierBandwidth (indicated in downlinkConfigCommon for the SCS of the initial downlink BWP), and which
　is wider than or equal to the bandwidth of the initial downlink BWP:
　3> apply a supported uplink channel bandwidth with a maximum transmission bandwidth which
　　is contained within the carrierBandwidth indicated in uplinkConfigCommon for the SCS of the initial uplink BWP, and which
　　is wider than or equal to the bandwidth of the initial BWP for the uplink;
　3> apply a supported downlink channel bandwidth with a maximum transmission bandwidth which
　　is contained within the carrierBandwidth indicated in downlinkConfigCommon for the SCS of the initial downlink BWP, and which
　　is wider than or equal to the bandwidth of the initial BWP for the downlink;
　3> select the first frequency band in the frequencyBandList, for FDD from frequencyBandList for uplink, or for TDD from frequencyBandList for downlink, which the UE supports and for which the UE supports at least one of the additionalSpectrumEmission values in nr-NS-PmaxList, if present;
　3> forward the cellIdentity to upper layers;
　3> if trackingAreaCode is not provided for the selected PLMN nor the registered PLMN nor PLMN of the equivalent PLMN list nor the selected NPN nor the registered NPN:
　　4> consider the cell as barred;
　　4> if intraFreqReselection is set to notAllowed:
　　　5> consider cell re-selection to other cells on the same frequency as the barred cell as not allowed;
　　4> else:
　　　5> consider cell re-selection to other cells on the same frequency as the barred cell as allowed;
　3> else:
　　4> forward the trackingAreaCode to upper layers;
　3> forward the PLMN identity or SNPN identity or PNI-NPN identity to upper layers;
　3> if in RRC_INACTIVE and the forwarded information does not trigger message transmission by upper layers:
　　4> if the serving cell does not belong to the configured ran-NotificationAreaInfo:
　　　5> initiate an RNA update;
　3> forward the ims-EmergencySupport to upper layers, if present;
　3> forward the eCallOverIMS-Support to upper layers, if present;
　3> forward the uac-AccessCategory1-SelectionAssistanceInfo to upper layers, if present;
　3> apply the configuration included in the servingCellConfigCommon;
　3> apply the specified PCCH configuration;
　3> if the UE has a stored valid version of a SIB, that the UE requires to operate within the cell:
　　4> use the stored version of the required SIB;
　3> if the UE has not stored a valid version of a SIB, of one or several required SIB(s):
　　4> for the SI message(s) that, according to the si-SchedulingInfo, contain at least one required SIB and for which si-BroadcastStatus is set to broadcasting:
　　　5> acquire the SI message(s)
　　4> for the SI message(s) that, according to the si-SchedulingInfo, contain at least one required SIB and for which si-BroadcastStatus is set to notBroadcasting:
　　　5> trigger a request to acquire the SI message(s)
　3> apply the first listed additionalSpectrumEmission which it supports among the values included in NR-NS-PmaxList within frequencyBandList in uplinkConfigCommon for FDD or in downlinkConfigCommon for TDD;
　3> if the additionalPmax is present in the same entry of the selected additionalSpectrumEmission within NR-NS-PmaxList:
　　4> apply the additionalPmax for UL;
　3> else:
　　4> apply the p-Max in uplinkConfigCommon for UL;
　3> if supplementaryUplink is present in servingCellConfigCommon; and
　3> if the UE supports one or more of the frequency bands indicated in the frequencyBandList of supplementary uplink; and
　3> if the UE supports at least one additionalSpectrumEmission in the NR-NS-PmaxList for a supported supplementary uplink band; and
　3> if the UE supports an uplink channel bandwidth with a maximum transmission bandwith configuration which
　　is smaller than or equal to the carrierBandwidth (indicated in supplementaryUplink for the SCS of the initial uplink BWP), and which
　　is wider than or equal to the bandwidth of the initial uplink BWP of the SUL:
　　4> consider supplementary uplink as configured in the serving cell;
　　4> select the first frequency band in the frequencyBandList of supplementary uplink which the UE supports and for which the UE supports at least one of the additionalSpectrumEmission values in nr-NS-PmaxList, if present;
　　4> apply a supported supplementary uplink channel bandwidth with a maximum transmission bandwidth which
　　　is contained withn the carrierBandwidth (indicated in supplementaryUplink for the SCS of the initial uplink BWP), and which
　　　is wider than or equal to the bandwidth of the initial BWP of the SUL;
　　4> apply the first listed additionalSpectrumEmission which it supports among the values included in NR-NS-PmaxList within frequencyBandList for the supplementaryUplink;
4> if the additionalPmax is present in the same entry of the selected additionalSpectrumEmission within NR-NS-PmaxList for the supplementaryUplink:
5> apply the additionalPmax in supplementaryUplink for SUL;
4> else:
5> apply the p-Max in supplementaryUplink for SUL;
3> if iab-Support is not provided for the selected PLMN nor the registered PLMN nor PLMN of the equivalent PLMN list:
4> consider the cell as barred for IAB-MT
2> else:
3> consider the cell as barred and
3> perform barring as if intraFreqReselection is set to notAllowed;

Embodiment 7—Method of SIB1 Processing

The issue with the above operation is that when one of the following conditions: "if trackingAreaCode is not provided for the selected PLMN nor the registered PLMN nor PLMN of the equivalent PLMN list or if UE is IAB-MT and if iab-Support is not provided for the selected PLMN nor the registered PLMN nor PLMN of the equivalent PLMN list" is met, UE perform operations such as forwarding parameters received in SIB1 to upper layers, applying configuration (servingCellConfigCommon, PCCH configuration, power parameters etc) received in SIB1, triggering RNA update, acquiring SIBs etc. As a result, NAS will have incorrect information about the camped cell and corresponding configuration which may affect subsequent connection setup/resume procedure. Additionally, UE applies serving cell configuration, acquire SIB and perform RAN update which leads to unnecessary signalling and delay the subsequent connection setup for obtaining service from network as after RAN update UE has to camp to another cell for obtaining service.

Figure 18A:
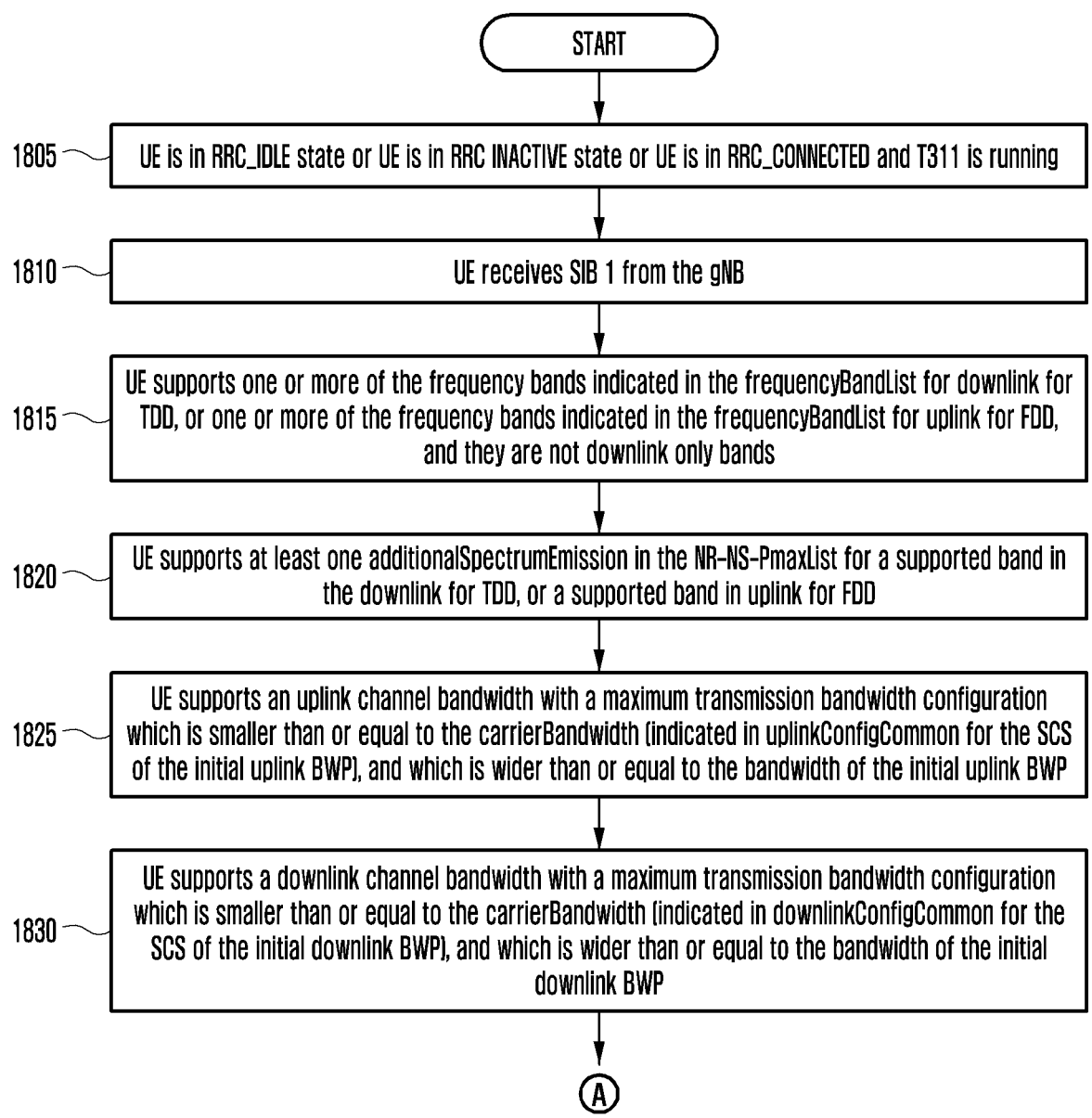
FIG. 18A, FIG. 18B and FIG. 18C illustrate flow chart in accordance with an embodiment of the disclosure.
Figure 18B:
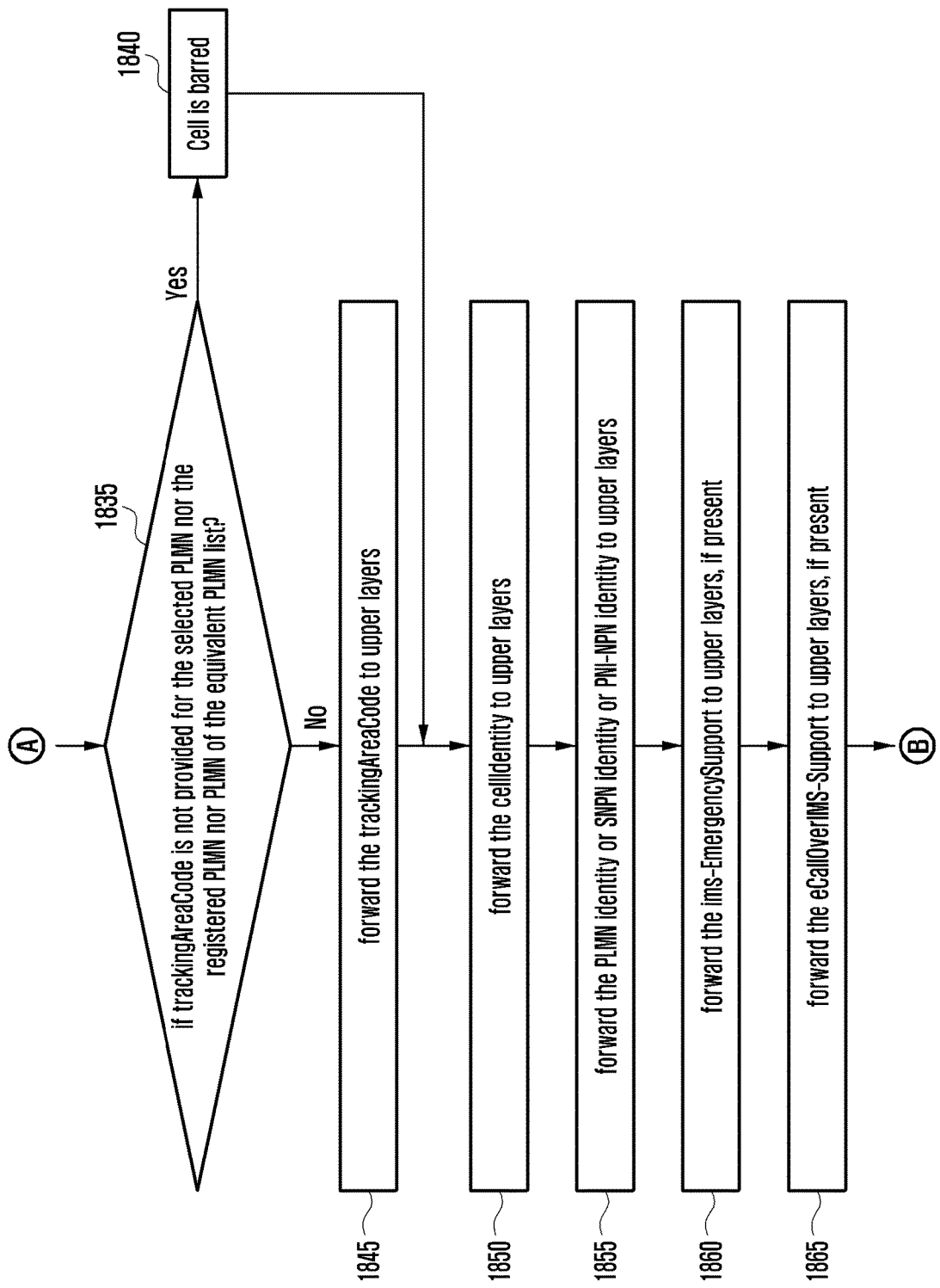
Figure 18C:
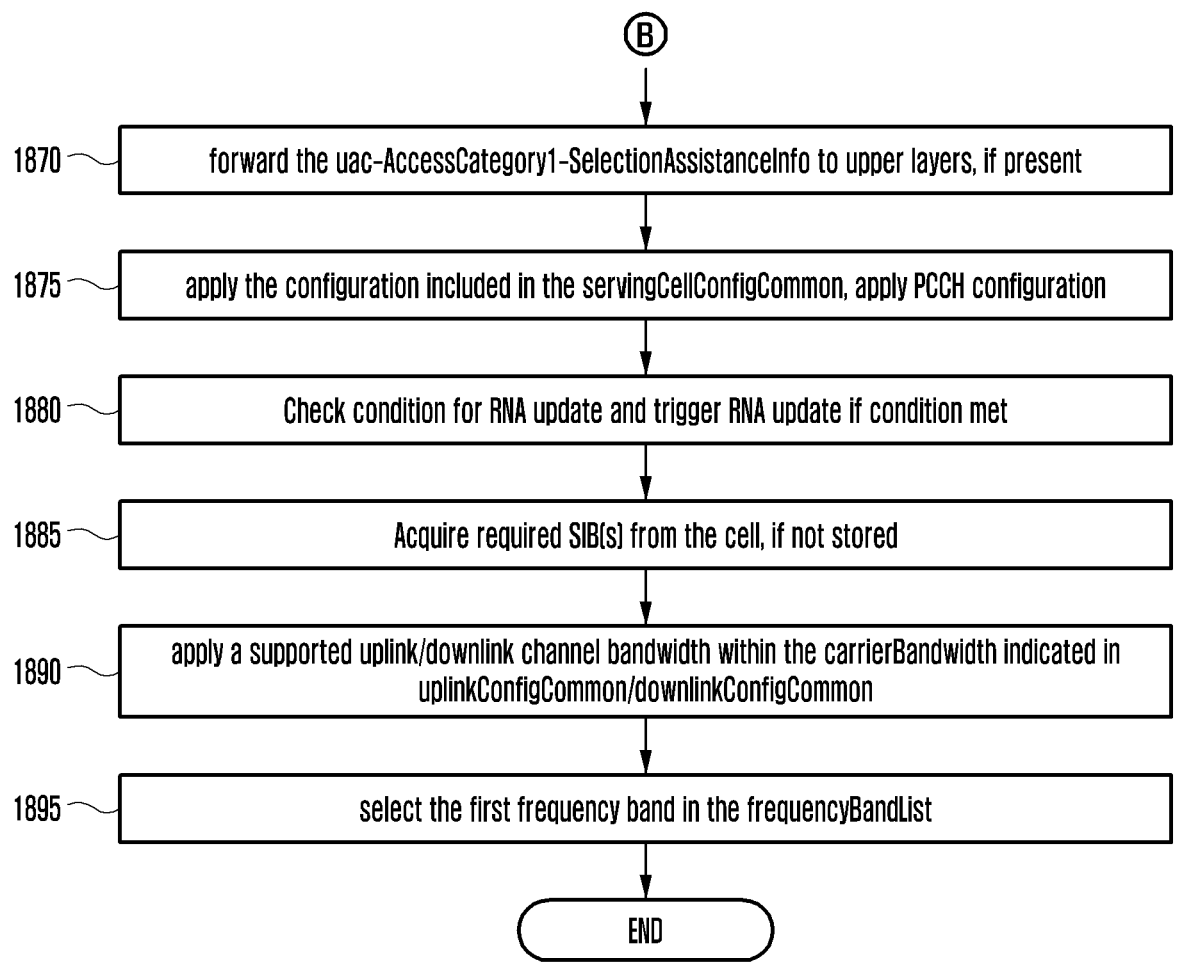

FIG. 18A, FIG. 18B and FIG. 18C illustrate flow chart in accordance with an embodiment of the disclosure. FIG. 18A, FIG. 18B and FIG. 18C illustrate the existing operation performed by UE upon reception of SIB1.

UE in RRC_IDLE state, UE in RRC_INACTIVE state, or UE in RRC_CONNECTED and T311 is running (1805), receives SIB1 from the gNB (1810).

UE supports one or more of the frequency bands indicated in the frequencyBandList for downlink for TDD, or one or more of the frequency bands indicated in the frequencyBandList for uplink for FDD, and they are not downlink only bands (1815).

UE supports at least one additionalSpectrumEmission in the NR-NS-PmaxList for a supported band in the downlink for TDD, or a supported band in uplink for FDD (1820).

UE supports an uplink channel bandwidth with a maximum transmission bandwidth configuration which is smaller than or equal to the carrierBandwidth (indicated in uplinkConfigCommon) for the SCS of the initial uplink BWP, and which is wider than or equal to the bandwidth of the initial uplink BWP (1825).

UE supports a downlink channel bandwidth with a maximum transmission bandwidth configuration which is smaller than or equal to the carrierBandwidth (indicated in downlinkConfigCommon) for the SCS of the initial downlink BWP, and which is wider than or equal to the bandwidth of the initial downlink BWP (1830).

UE determines whether trackingAreaCode is not provided for the selected PLMN nor the registered PLMN nor PLMN of the equivalent PLMN list (1835).
If yes, UE determines that the cell is barred (1840).
If no, UE forwards the trackingAreaCode to upper layers (1845).
Then, UE forwards the cellIdentity to upper layers (1850) and forwards the PLMN identity or SNPN identity or PNI-NPN identity to upper layers (1855). UE forwards the ims-EmergencySupport to upper layers if present (1860), forwards the eCallOverIMS-Support to upper layers if present (1865), and forwards the uac-AccessCategory1-SelectionAssistanceInfo to upper layers if present (1870).

UE applies the configuration included in the servingCellConfigCommon and applies PCCH configuration (1875). UE checks condition for RNA update and trigger RNA update if condition is met (1880). UE acquires required SIB(s) from the cell, if not stored (1885). UE applies a supported uplink/downlink channel bandwidth within the carrierBandwidth indicated in uplinkConfogCommon/downlinkConfigCommon (1890). UE selects the first frequency band in the frequencyBandlist (1895).

Figure 19A:
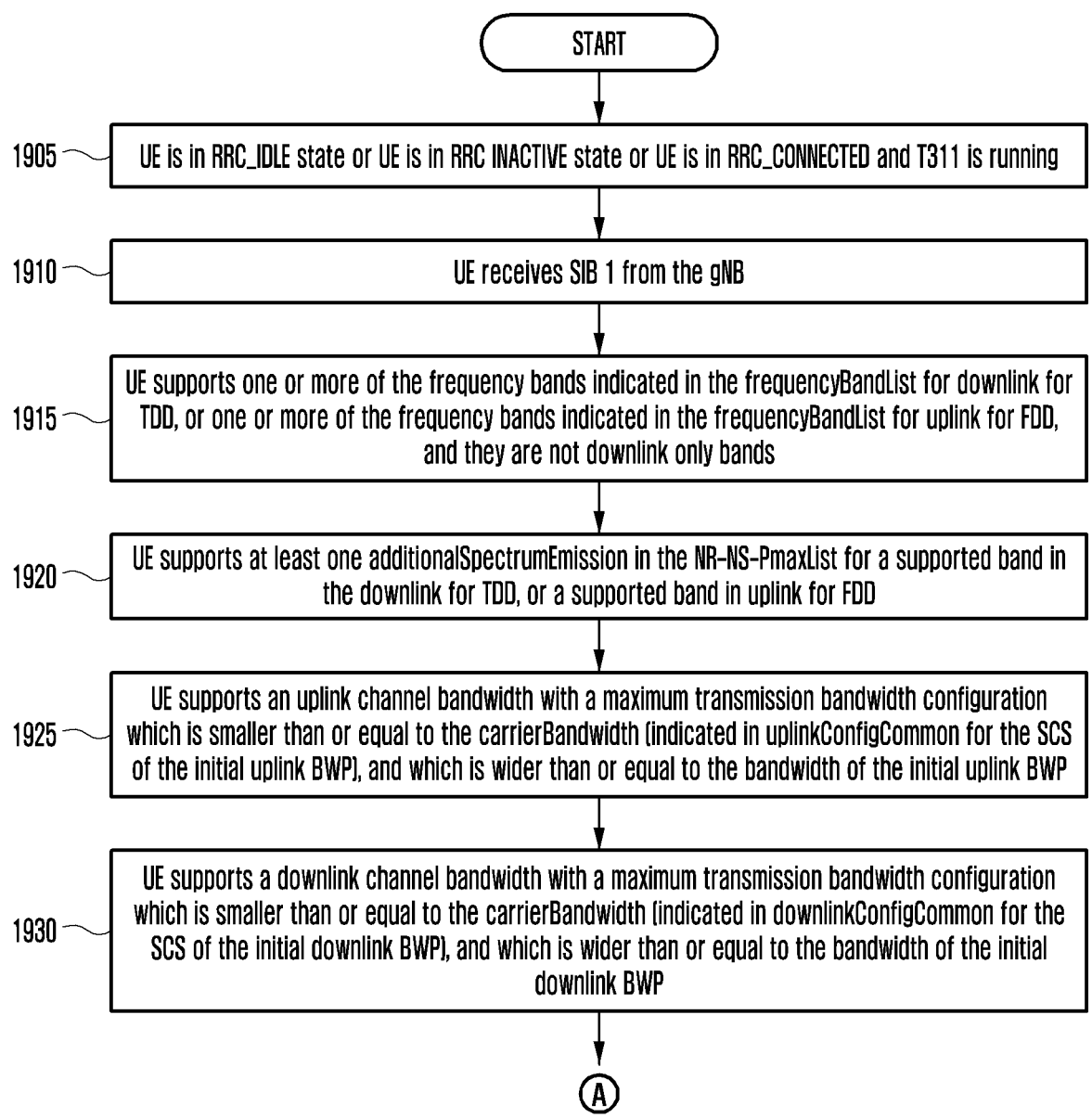
FIG. 19A, FIG. 19B and FIG. 19C illustrate flow chart in accordance with an embodiment of the disclosure.
Figure 19B:
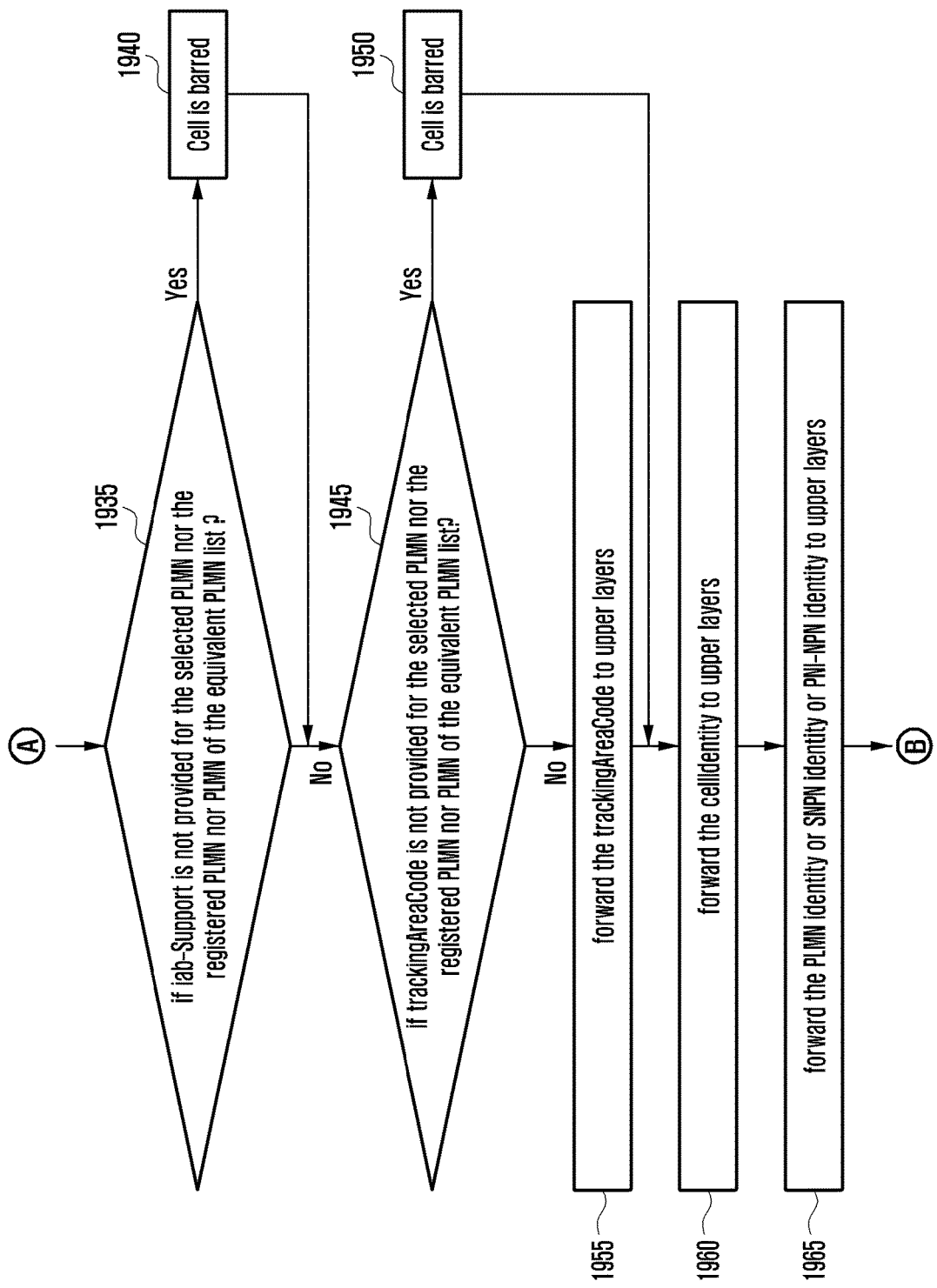
Figure 19C:
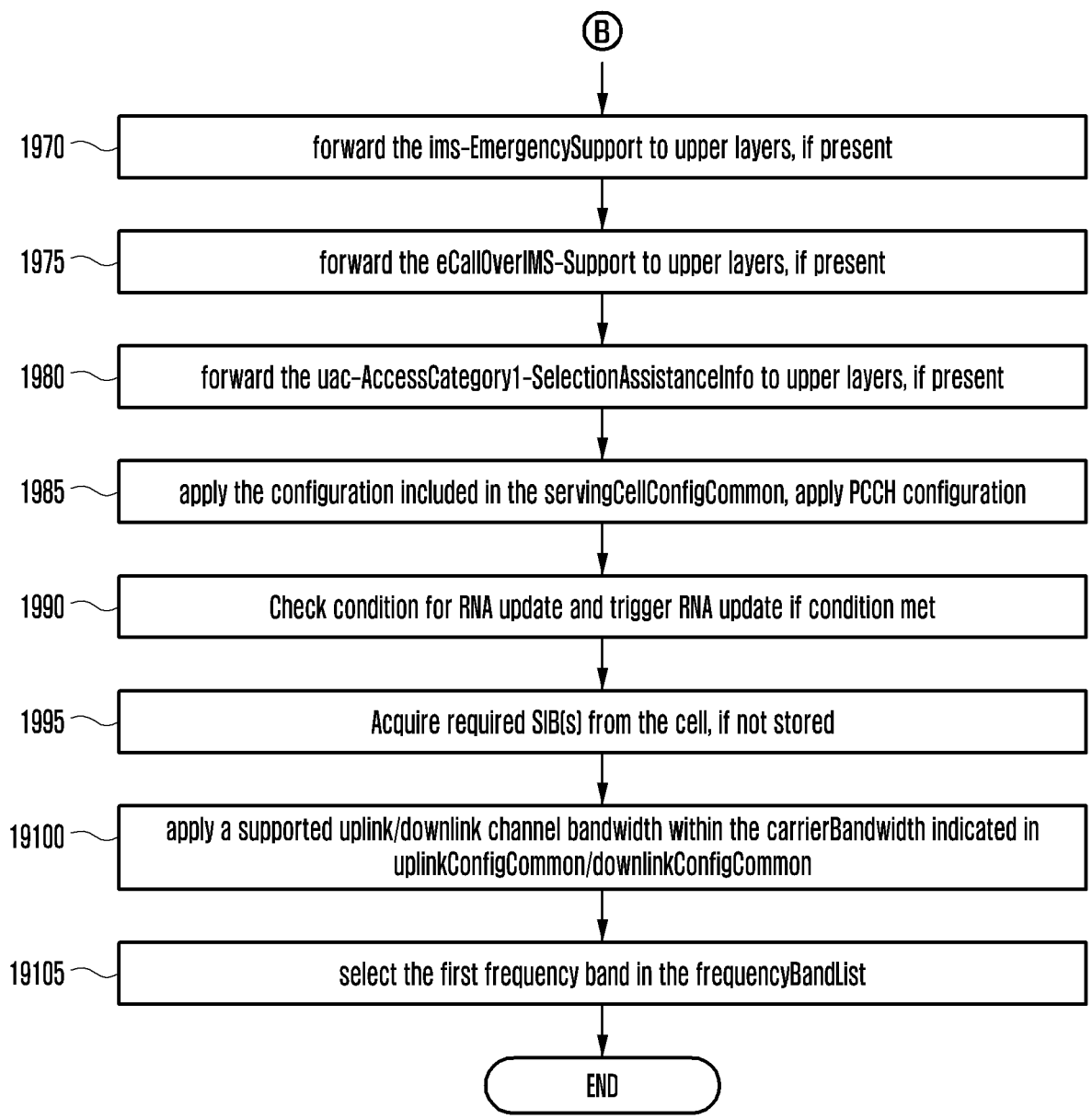

FIG. 19A, FIG. 19B and FIG. 19C illustrate flow chart in accordance with an embodiment of the disclosure. FIG. 19A, FIG. 19B and FIG. 19C illustrate the existing operation performed by IAB MT upon reception of SIB1.

UE in RRC_IDLE state, UE in RRC_INACTIVE state, or UE in RRC_CONNECTED and T311 is running (1905), receives SIB1 from the gNB (1910).

UE supports one or more of the frequency bands indicated in the frequencyBandList for downlink for TDD, or one or more of the frequency bands indicated in the frequencyBandList for uplink for FDD, and they are not downlink only bands (1915).

UE supports at least one additionalSpectrumEmission in the NR-NS-PmaxList for a supported band in the downlink for TDD, or a supported band in uplink for FDD (1920).

UE supports an uplink channel bandwidth with a maximum transmission bandwidth configuration which is smaller than or equal to the carrierBandwidth (indicated in uplinkConfigCommon) for the SCS of the initial uplink BWP, and which is wider than or equal to the bandwidth of the initial uplink BWP (1925).

UE supports a downlink channel bandwidth with a maximum transmission bandwidth configuration which is smaller than or equal to the carrierBandwidth (indicated in downlinkConfigCommon) for the SCS of the initial downlink BWP, and which is wider than or equal to the bandwidth of the initial downlink BWP (1930).

UE determines whether iab-Support is not provided for the selected PLMN nor the registered PLMN nor PLMN of the equivalent PLMN list (1935).
If yes, the UE determines that the cell is barred (1940).
If no, the UE determines whether trackingAreaCode is not provided for the selected PLMN nor the registered PLMN nor PLMN of the equivalent PLMN list (1945).
If yes, the UE determines that the cell is barred (1950).
If no, the UE forwards the trackingAreaCode to upper layers (1955).
Then, UE forwards the cellIdentity to upper layers (1960) and forwards the PLMN identity or SNPN identity or PNI-NPN identity to upper layers (1965). UE forwards the ims-EmergencySupport to upper layers if present (1970), forwards the eCallOverIMS-Support to upper layers if present (1975), and forwards the uac-AccessCategory1-SelectionAssistanceInfo to upper layers if present (1980).

UE applies the configuration included in the servingCellConfigCommon and applies PCCH configuration (1985). UE checks condition for RNA update and trigger RNA update if condition is met (1990). UE acquires required SIB(s) from the cell, if not stored (1995). UE applies a supported uplink/downlink channel bandwidth within the carrierBandwidth indicated in uplinkConfogCommon/ downlinkConfigCommon (19100). UE selects the first frequency band in the frequencyBandlist (19105).

Figure 20A:
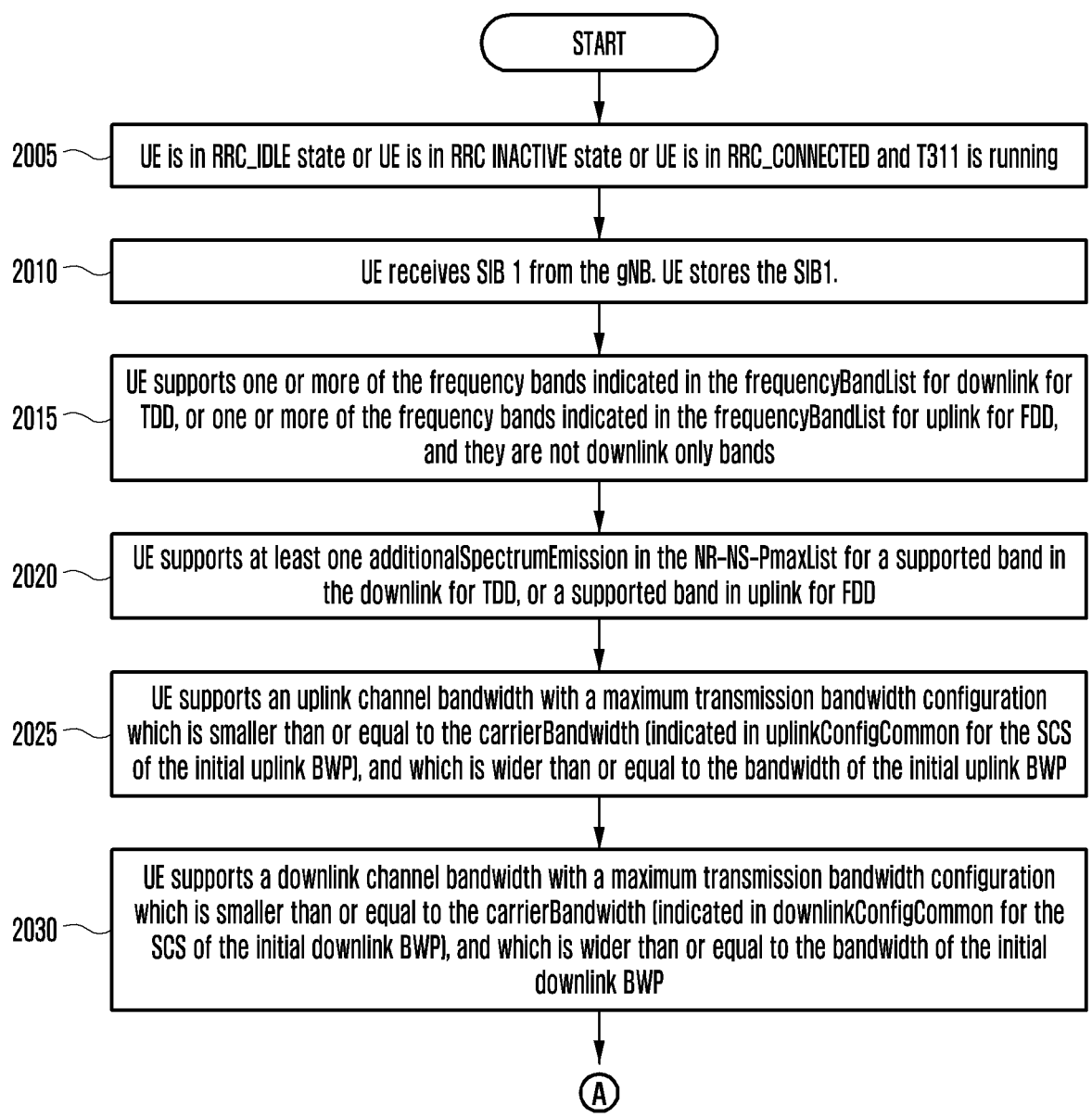
FIG. 20A, FIG. 20B and FIG. 20C illustrate flow chart in accordance with an embodiment of the disclosure.
Figure 20B:
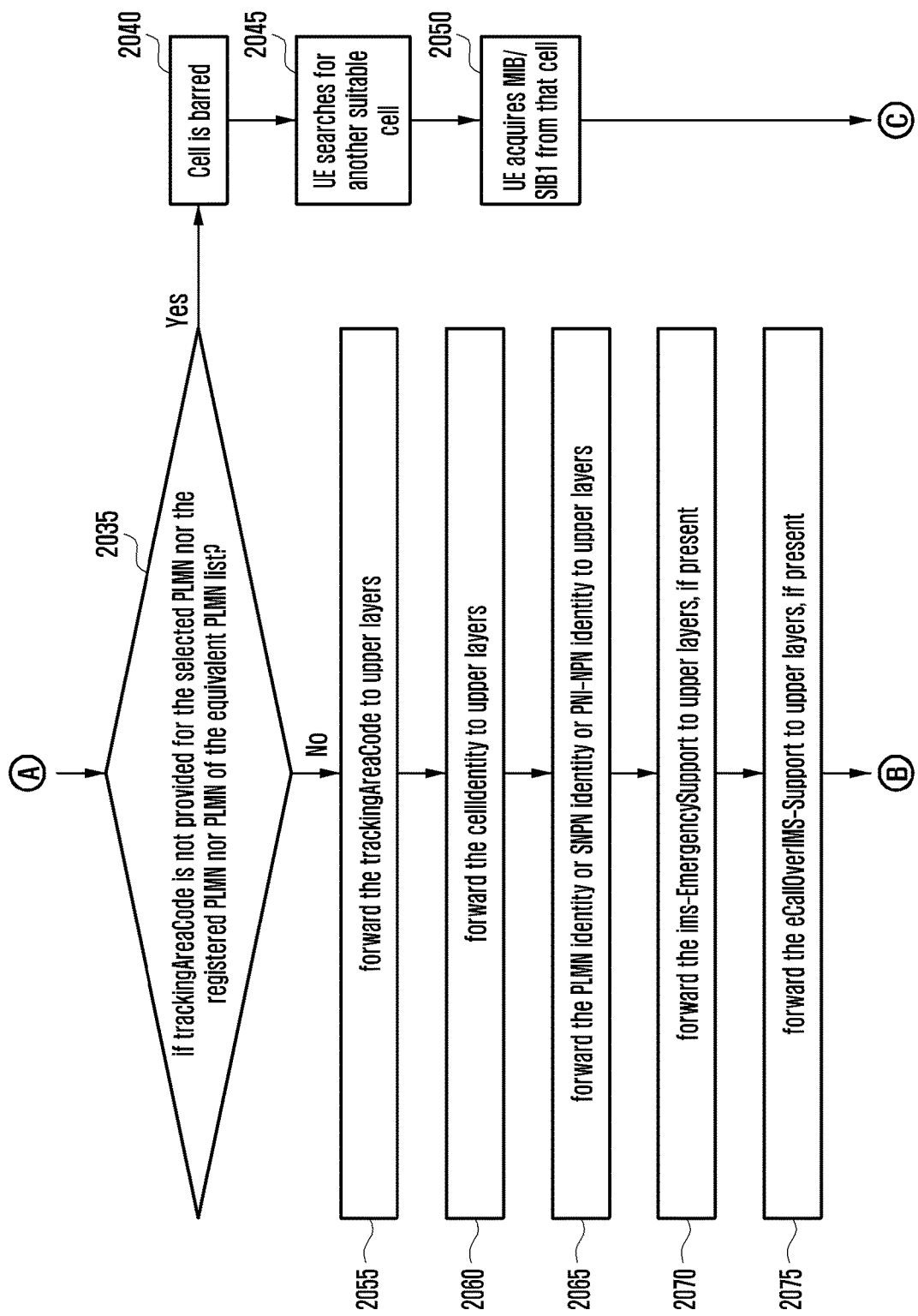
Figure 20C:
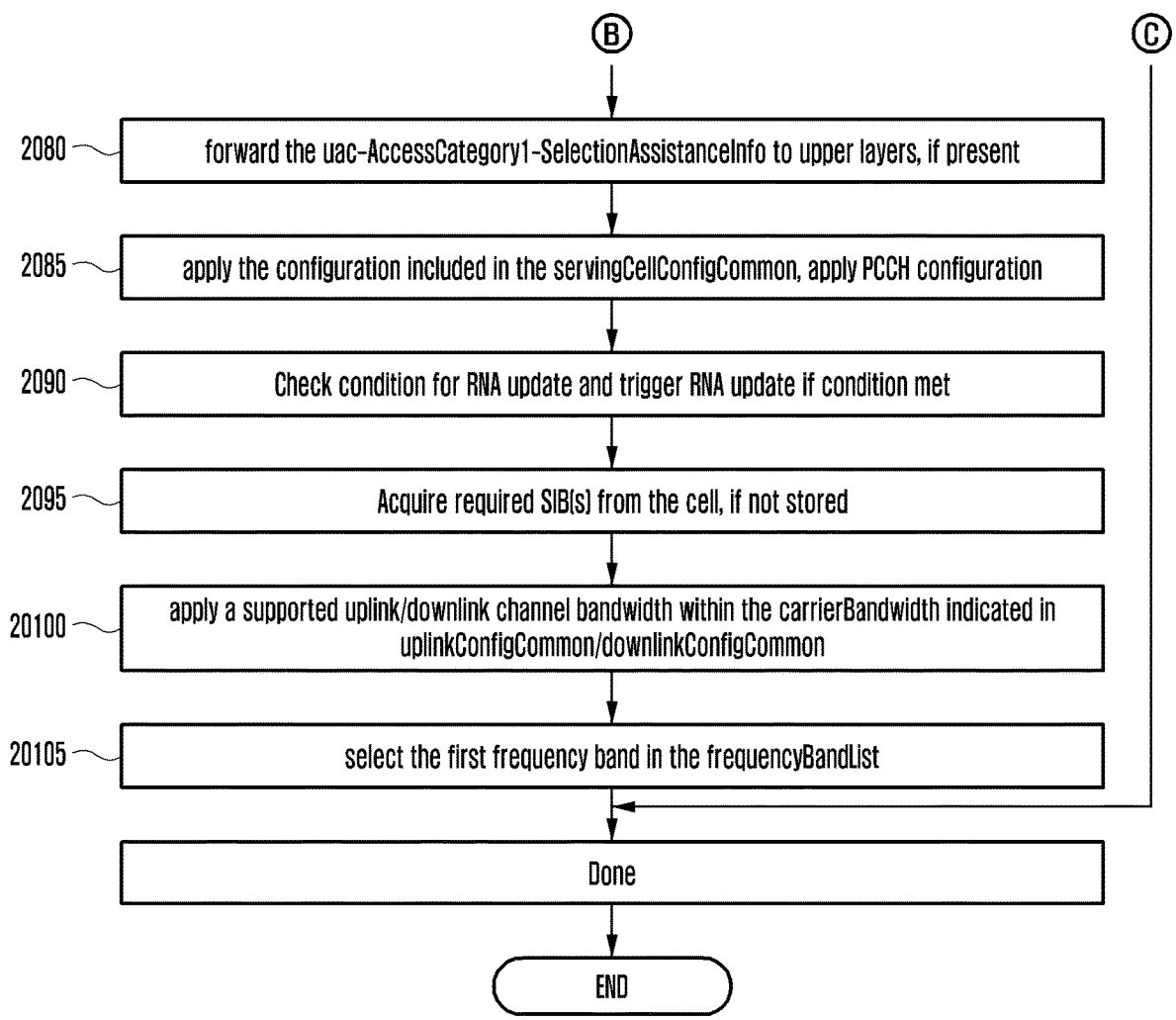

FIG. 20A, FIG. 20B and FIG. 20C illustrate flow chart in accordance with an embodiment of the disclosure. FIG. 20A, FIG. 20B and FIG. 20C illustrate the proposed operation performed by UE (other than IAB MT) upon reception of SIB1.

In another embodiment of this disclosure, the UE actions upon reception of SIB1 when UE is in RRC IDLE state or when UE is in RRC INACTIVE state or when UE in RRC connected while T311 is running is as follows (2005):

Upon receiving the SIB1 the UE shall:
1> store the acquired SIB1 (2010);
1> if the cellAccessRelatedInfo contains an entry with the PLMN-Identity of the selected PLMN:
  2> in the remainder of the procedures use plmn-IdentityList, trackingAreaCode, and cellIdentity for the cell as received in the corresponding PLMN-IdentityInfo containing the selected PLMN;
1> if the cellAccessRelatedInfo contains an entry with the NPN-Identity of the selected NPN:
  2> in the remainder of the procedures use npn-IdentityList, trackingAreaCode, and cellIdentity for the cell as received in the corresponding NPN-IdentityInfo containing the selected NPN;
1> if UE is in RRC_IDLE or RRC INACTIVE; or
  if UE is in RRC_CONNECTED and T311 is running:
  2> if the UE supports one or more of the frequency bands indicated in the frequencyBandList for downlink for TDD, or one or more of the frequency bands indicated in the frequencyBandList for uplink for FDD, and they are not downlink only bands (2015), and
  2> if the UE supports at least one additionalSpectrumEmission in the NR-NS-PmaxList for a supported band in the downlink for TDD, or a supported band in uplink for FDD (2020), and
  2> if the UE supports an uplink channel bandwidth with a maximum transmission bandwidth configuration which (2025)
    is smaller than or equal to the carrierBandwidth (indicated in uplinkConfigCommon for the SCS of the initial uplink BWP), and which
    is wider than or equal to the bandwidth of the initial uplink BWP, and
  2> if the UE supports a downlink channel bandwidth with a maximum transmission bandwidth configuration which (2030)
    is smaller than or equal to the carrierBandwidth (indicated in downlinkConfigCommon for the SCS of the initial downlink BWP), and which
    is wider than or equal to the bandwidth of the initial downlink BWP:
    3> if trackingAreaCode is not provided for the selected PLMN nor the registered PLMN nor PLMN of the equivalent PLMN list (2035):
      4> consider the cell as barred (2040);
      4> if intraFreqReselection is set to notAllowed:
        5> consider cell re-selection to other cells on the same frequency as the barred cell as not allowed (2045, 2050);
      4> else:
        5> consider cell re-selection to other cells on the same frequency as the barred cell as allowed (2045, 2050);
    3> else if UE is IAB-MT and if iab-Support is not provided for the selected PLMN nor the registered PLMN nor PLMN of the equivalent PLMN list:
      4> consider the cell as barred for IAB-MT;
    3> else (2035):
      4> apply a supported uplink channel bandwidth with a maximum transmission bandwidth which is contained within the carrierBandwidth indicated in uplinkConfigCommon for the SCS of the initial uplink BWP, and which
        is wider than or equal to the bandwidth of the initial BWP for the uplink;
      4> apply a supported downlink channel bandwidth with a maximum transmission bandwidth which is contained within the carrierBandwidth indicated in downlinkConfigCommon for the SCS of the initial downlink BWP, and which
        is wider than or equal to the bandwidth of the initial BWP for the downlink;
      4> select the first frequency band in the frequencyBandList, for FDD from frequencyBandList for uplink, or for TDD from frequencyBandList for downlink, which the UE supports and for which the UE supports at least one of the additionalSpectrumEmission values in nr-NS-PmaxList, if present;
      4> forward the cellIdentity to upper layers (2060);
      4> forward the trackingAreaCode to upper layers (2055);
      4> forward the PLMN identity or SNPN identity or PNI-NPN identity to upper layers (2065);
      4> if in RRC_INACTIVE and the forwarded information does not trigger message transmission by upper layers:
        5> if the serving cell does not belong to the configured ran-NotificationAreaInfo:
          6> initiate an RNA update (2090);
      4> forward the ims-EmergencySupport to upper layers, if present (2070);
      4> forward the eCallOverIMS-Support to upper layers, if present (2075);
      4> forward the uac-AccessCategory1-SelectionAssistanceInfo to upper layers, if present (2080);
      4> apply the configuration included in the servingCellConfigCommon (2085);
      4> apply the specified PCCH configuration (2085);
      4> if the UE has a stored valid version of a SIB, that the UE requires to operate within the cell:
        5> use the stored version of the required SIB;
      4> if the UE has not stored a valid version of a SIB, of one or several required SIB(s):
        5> for the SI message(s) that, according to the si-SchedulingInfo, contain at least one required SIB and for which si-BroadcastStatus is set to broadcasting:

6> acquire the SI message(s) (2095);
5> for the SI message(s) that, according to the si-SchedulingInfo, contain at least one required SIB and for which si-BroadcastStatus is set to notBroadcasting:
6> trigger a request to acquire the SI message(s) (2095);
4> apply the first listed additionalSpectrumEmission (20100) which it supports among the values included in NR-NS-PmaxList within frequencyBandList in uplinkConfigCommon for FDD or in downlinkConfigCommon for TDD;
4> if the additionalPmax is present in the same entry of the selected additionalSpectrumEmission within NR-NS-PmaxList:
5> apply the additionalPmax for UL;
4> else:
5> apply the p-Max in uplinkConfigCommon for UL;
4> if supplementaryUplink is present in serving-CellConfigCommon; and
4> if the UE supports one or more of the frequency bands indicated in the frequencyBandList of supplementary uplink; and
4> if the UE supports at least one additionalSpectrumEmission in the NR-NS-PmaxList for a supported supplementary uplink band; and
4> if the UE supports an uplink channel bandwidth with a maximum transmission bandwidth configuration which
is smaller than or equal to the carrierBandwidth (indicated in supplementaryUplink for the SCS of the initial uplink BWP), and which
is wider than or equal to the bandwidth of the initial uplink BWP of the SUL:
5> consider supplementary uplink as configured in the serving cell;
5> select the first frequency band in the frequencyBandList (20105) of supplementary uplink which the UE supports and for which the UE supports at least one of the additionalSpectrumEmission values in nr-NS-PmaxList, if present;
5> apply a supported supplementary uplink channel bandwidth with a maximum transmission bandwidth which
is contained within the carrierBandwidth (indicated in supplementaryUplink for the SCS of the initial uplink BWP), and which
is wider than or equal to the bandwidth of the initial BWP of the SUL;
5> apply the first listed additionalSpectrumEmission which it supports among the values included in NR-NS-PmaxList within frequencyBandList for the supplementaryUplink;
5> if the additionalPmax is present in the same entry of the selected additionalSpectrumEmission within NR-NS-PmaxList for the supplementaryUplink:
6> apply the additionalPmax in supplementaryUplink for SUL;
5> else:
6> apply the p-Max in supplementaryUplink for SUL;

2> else:
3> consider the cell as barred; and
3> perform barring as if intraFreqReselection is set to notAllowed.

Figure 21A:
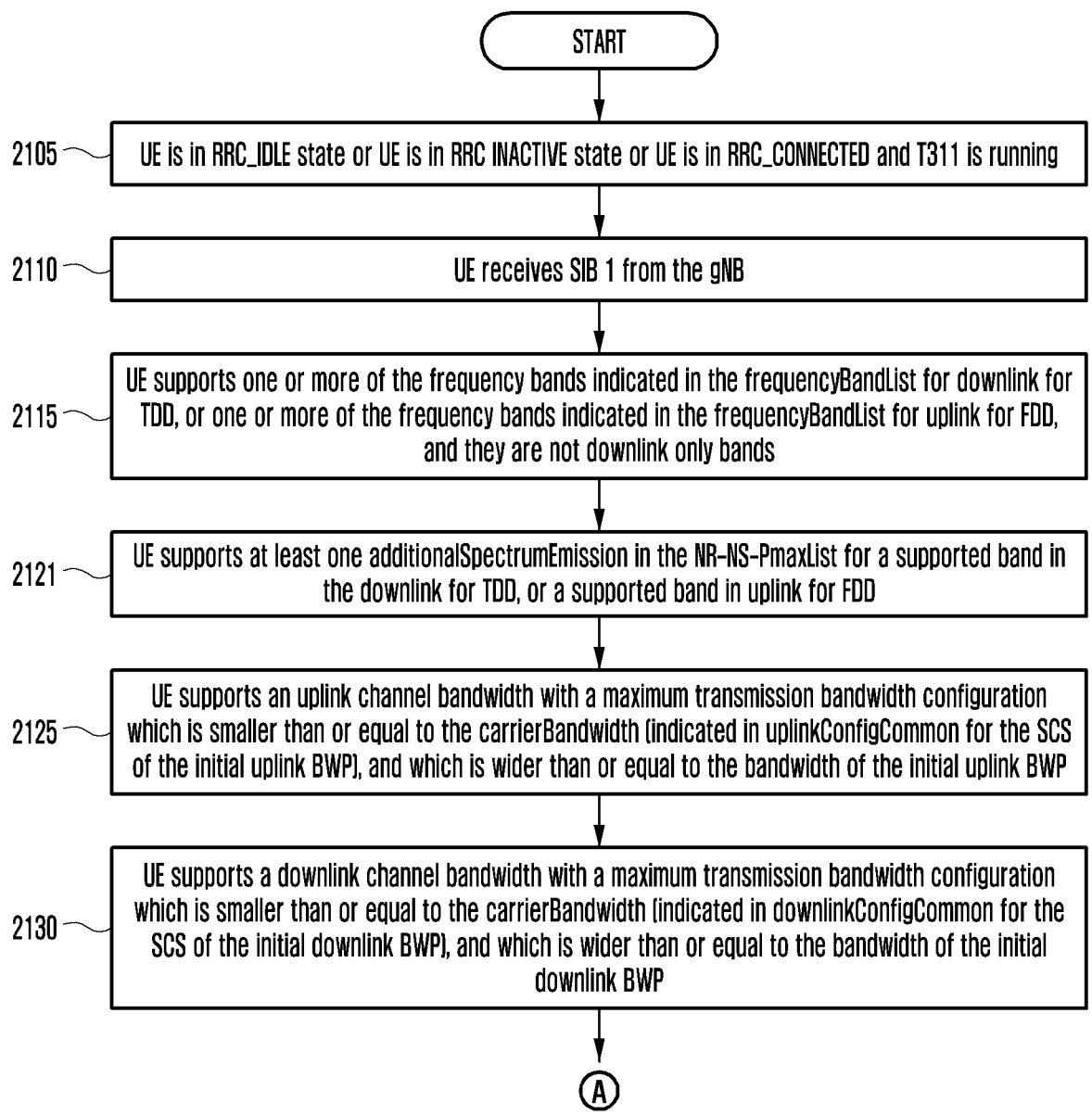
FIG. 21A, FIG. 21B and FIG. 21C illustrate flow chart in accordance with an embodiment of the disclosure.
Figure 21B:
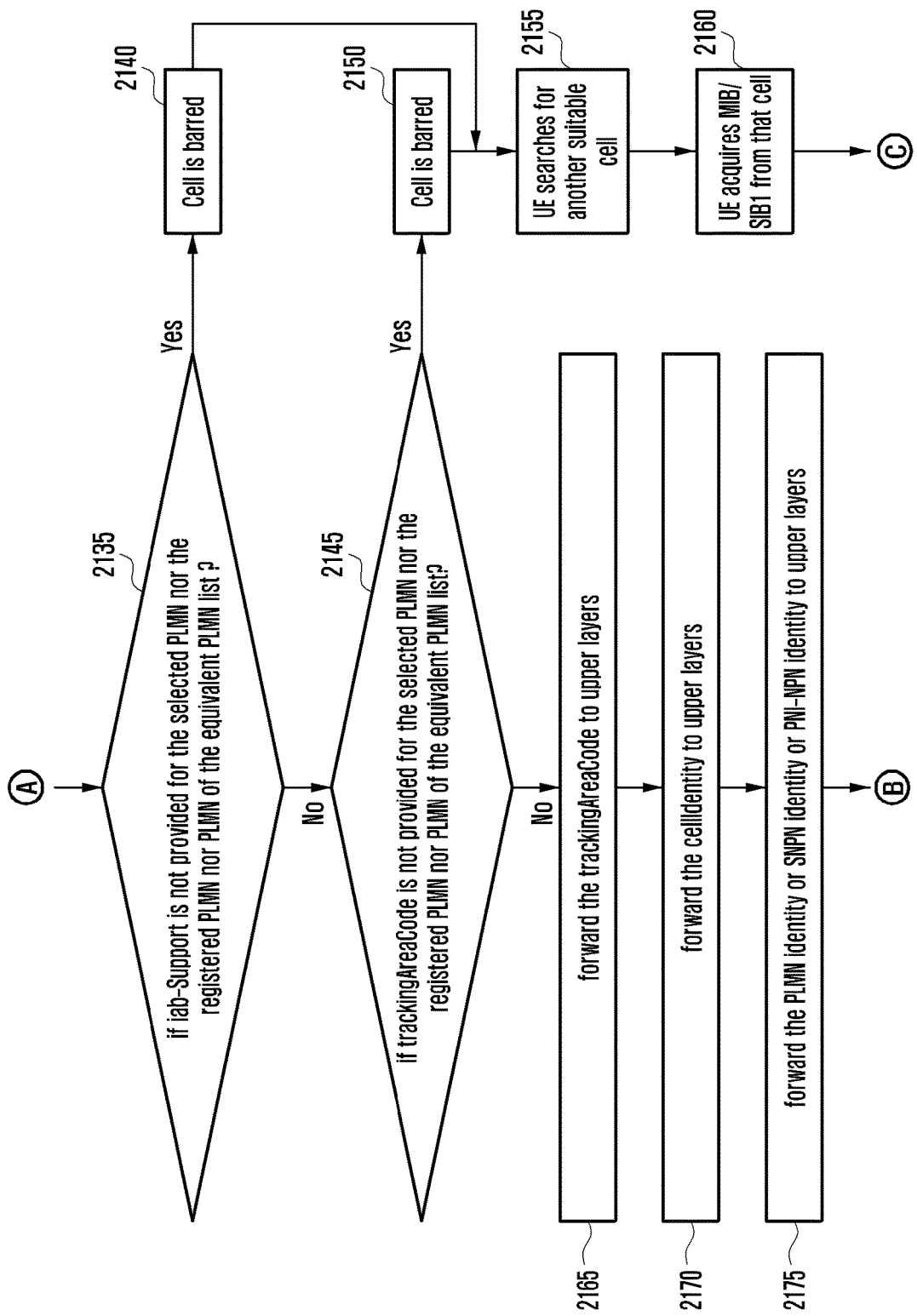
Figure 21C:
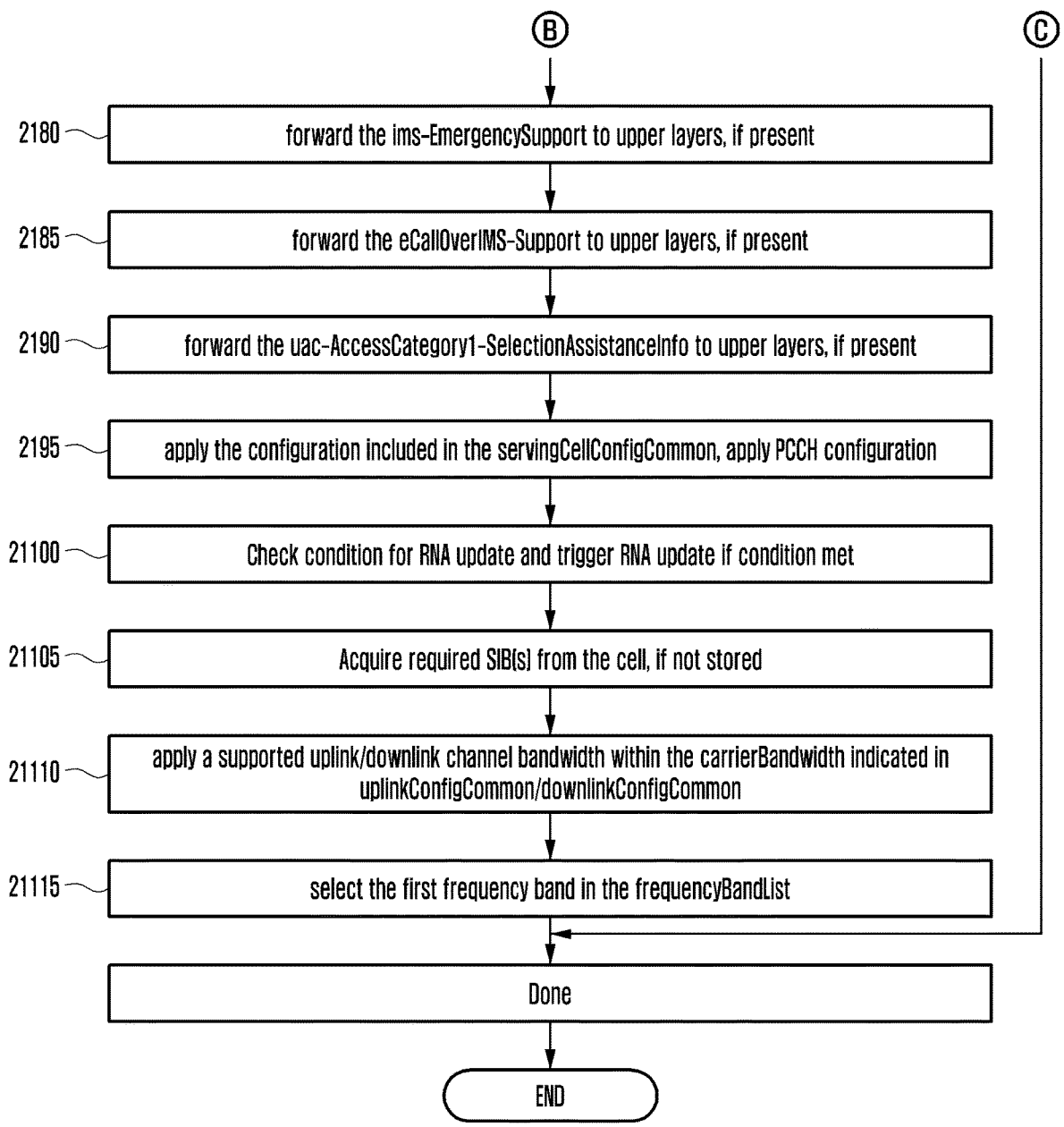

FIG. 21A, FIG. 21B and FIG. 21C illustrate flow chart in accordance with an embodiment of the disclosure. FIG. 21A, FIG. 21B and FIG. 21C illustrates the proposed operation performed by IAB MT upon reception of SIB1. The above-described operation performed by UE in FIG. 20A, FIG. 20B, and FIG. 20C can be applied similarly to the operation performed by IAB MT of FIG. 21A, FIG. 21B, and FIG. 21C.

However, for the embodiment of FIG. 21A, FIG. 21B, and FIG. 21C, whether iab-Support is not provided for the selected PLMN nor the registered PLMN nor PLMN of the equivalent PLMN list can be further determined (2135). In another embodiment of this disclosure, UE operation is as follows:

UE is in RRC_IDLE state or UE is in RRC INACTIVE state or UE is in RRC_CONNECTED and T311 is running:
UE receives SIB1 from the gNB
UE determines whether the cell is barred or not based on received SIB1. The cell is barred if one of the following conditions is met:
if trackingAreaCode is not provided for the selected PLMN nor the registered PLMN nor PLMN of the equivalent PLMN list
if UE is IAB-MT and if iab-Support is not provided for the selected PLMN nor the registered PLMN nor PLMN of the equivalent PLMN list
if the UE supports neither one or more of the frequency bands indicated in the frequencyBandList for downlink for TDD, nor one or more of the frequency bands (non downlink bands) indicated in the frequencyBandList for uplink for FDD,
if the UE does not support any additionalSpectrumEmission in the NR-NS-PmaxList for a supported band in the downlink for TDD, or a supported band in uplink for FDD
if the UE does not support an uplink channel bandwidth with a maximum transmission bandwidth configuration which is smaller than or equal to the carrierBandwidth (indicated in uplinkConfigCommon for the SCS of the initial uplink BWP), and which is wider than or equal to the bandwidth of the initial uplink BWP
if the UE does not supports a downlink channel bandwidth with a maximum transmission bandwidth configuration which is smaller than or equal to the carrierBandwidth (indicated in downlinkConfigCommon for the SCS of the initial downlink BWP), and which is wider than or equal to the bandwidth of the initial downlink BWP.

UE determines whether to forward the parameters received in SIB1 to upper layers (i.e. NAS) as follows:
If the cell is determined to be not barred according to criteria (in step 3 above):
forward the cellIdentity to upper layers;
forward the trackingAreaCode to upper layers;
forward the PLMN identity or SNPN identity or PNI-NPN identity to upper layers;
forward the ims-EmergencySupport to upper layers, if present;
forward the eCallOverIMS-Support to upper layers, if present;
forward the uac-AccessCategory1-SelectionAssistanceInfo to upper layers, if present;

else if the cell is determined to be barred according to criteria:
  do not forward the cellIdentity to upper layers;
  do not forward the trackingAreaCode to upper layers;
  do not forward the PLMN identity or SNPN identity or PNI-NPN identity to upper layers;
  do not forward the ims-EmergencySupport to upper layers, if present;
  do not forward the eCallOverIMS-Support to upper layers, if present;
  do not forward the uac-AccessCategory1-SelectionAssistanceInfo to upper layers, if present;
UE determines whether to initiate RNA update or not as follows:
If the cell is determined to be not barred according to criteria:
  if the UE is in RRC_INACTIVE and the information forwarded to supper layer does not trigger message transmission by upper layers and if the serving cell does not belong to the configured ran-NotificationAreaInfo, UE initiate an RNA update.
UE determines whether to acquire SI or not as follows:
If the cell is determined to be not barred according to criteria:
  1> if the UE has a stored valid version of a SIB, that the UE requires to operate within the cell
    2> use the stored version of the required SIB;
  1> if the UE has not stored a valid version of a SIB, of one or several required SIB(s):
    2> for the SI message(s) that, according to the si-SchedulingInfo, contain at least one required SIB and for which si-BroadcastStatus is set to broadcasting:
      3> acquire the SI message(s);
    2> for the SI message(s) that, according to the si-SchedulingInfo, contain at least one required SIB and for which si-BroadcastStatus is set to notBroadcasting:
      3> trigger a request to acquire the SI message(s);
If the cell is determined to be barred according to criteria:
UE does not acquire one or more required SIBs from the cell
If the cell is determined to be not barred according to criteria:
  1> apply a supported uplink channel bandwidth with a maximum transmission bandwidth which
    is contained within the carrierBandwidth indicated in uplinkConfigCommon for the SCS of the initial uplink BWP, and which
    is wider than or equal to the bandwidth of the initial BWP for the uplink;
  1> apply a supported downlink channel bandwidth with a maximum transmission bandwidth which
    is contained within the carrierBandwidth indicated in downlinkConfigCommon for the SCS of the initial downlink BWP, and which
    is wider than or equal to the bandwidth of the initial BWP for the downlink;
  1> select the first frequency band in the frequencyBandList, for FDD from frequencyBandList for uplink, or for TDD from frequencyBandList for downlink, which the UE supports and for which the UE supports at least one of the additionalSpectrumEmission values in nr-NS-PmaxList, if present;

If the cell is determined to be not barred according to criteria (in step 3 above):
  1> apply the first listed additionalSpectrumEmission which it supports among the values included in NR-NS-PmaxList within frequencyBandList in uplinkConfigCommon for FDD or in downlinkConfigCommon for TDD;
  1> if the additionalPmax is present in the same entry of the selected additionalSpectrumEmission within NR-NS-PmaxList:
    2> apply the additionalPmax for UL;
  1> else:
    2> apply the p-Max in uplinkConfigCommon for UL;
  1> if supplementaryUplink is present in servingCellConfigCommon; and
  1> if the UE supports one or more of the frequency bands indicated in the frequencyBandList of supplementary uplink; and
  1> if the UE supports at least one additionalSpectrumEmission in the NR-NS-PmaxList for a supported supplementary uplink band; and
  1> if the UE supports an uplink channel bandwidth with a maximum transmission bandwith configuration which
    is smaller than or equal to the carrierBandwidth (indicated in supplementaryUplink for the SCS of the initial uplink BWP), and which
    is wider than or equal to the bandwidth of the initial uplink BWP of the SUL:
    2> consider supplementary uplink as configured in the serving cell;
    2> select the first frequency band in the frequencyBandList of supplementary uplink which the UE supports and for which the UE supports at least one of the additionalSpectrumEmission values in nr-NS-PmaxList, if present;
    2> apply a supported supplementary uplink channel bandwidth with a maximum transmission bandwidth which
      is contained within the carrierBandwidth (indicated in supplementaryUplink for the SCS of the initial uplink BWP), and which
      is wider than or equal to the bandwidth of the initial BWP of the SUL;
    2> apply the first listed additionalSpectrumEmission which it supports among the values included in NR-NS-PmaxList within frequencyBandList for the supplementaryUplink;
    2> if the additionalPmax is present in the same entry of the selected additionalSpectrumEmission within NR-NS-PmaxList for the supplementaryUplink:
      3> apply the additionalPmax in supplementaryUplink for SUL;
    2> else:
      3> apply the p-Max in supplementaryUplink for SUL;
In another embodiment,
If UE supports one or more of the frequency bands indicated in the frequencyBandList for downlink for TDD, or one or more of the frequency bands indicated in the frequencyBandList for uplink for FDD, and they are not downlink only bands, and
If UE supports at least one additionalSpectrumEmission in the NR-NS-PmaxList for a supported band in the downlink for TDD, or a supported band in uplink for FDD, and If UE supports an uplink channel bandwidth with a maximum transmission bandwidth configuration which is smaller than or equal to the carrierBandwidth (indicated in uplinkConfigCommon for the SCS of the initial uplink BWP), and which
is wider than or equal to the bandwidth of the initial uplink BWP, and
If UE supports a downlink channel bandwidth with a maximum transmission bandwidth configuration which is smaller than or equal to the carrierBandwidth (indicated in downlinkConfigCommon for the SCS of the initial downlink BWP), and which
is wider than or equal to the bandwidth of the initial downlink BWP:
  If UE is not IAB MT:
    If trackingAreaCode is not included in received SIB1 for UE's PLMN:
      Perform 1st set of operations
    Else
      Perform 2nd set of operations
  Else If UE is IAB MT:
    If trackingAreaCode is not included in received SIB1 for UE's PLMN; OR
    If iab-Support is not included in received SIB1 for UE's PLMN:
      Perform 1st set of operations
    Else
      Perform 2nd Set of operations
1st set of operations
Do not forward the cellIdentity to upper layers;
Do not forward the trackingAreaCode to upper layers;
Do not forward the PLMN identity or SNPN identity or PNI-NPN identity to upper layers;
Do not forward the ims-EmergencySupport to upper layers, if present;
Do not forward the eCallOverIMS-Support to upper layers, if present;
Do not forward the uac-AccessCategory1-SelectionAssistanceInfo to upper layers, if present;
Do not check for RNA update (In an embodiment, if the UE is in RRC_INACTIVE and the information forwarded to supper layer does not trigger message transmission by upper layers and if the serving cell does not belong to the configured ran-NotificationAreaInfo, UE initiate an RNA update)
Do not acquire SIBs from this cell. (In an embodiment, UE can acquire required SIBs from this cell)
Do not apply the configuration included in Serving-CellConfigCommon,
Do not apply PCCH configuration
2nd set of operations
forward the cellIdentity to upper layers;
forward the trackingAreaCode to upper layers;
forward the PLMN identity or SNPN identity or PNI-NPN identity to upper layers;
forward the ims-EmergencySupport to upper layers, if present;
forward the eCallOverIMS-Support to upper layers, if present;
forward the uac-AccessCategory1-SelectionAssistanceInfo to upper layers, if present;
if the UE is in RRC_INACTIVE and the information forwarded to supper layer does not trigger message transmission by upper layers and if the serving cell does not belong to the configured ran-NotificationAreaInfo, UE initiate an RNA update.
Acquire required SIBs from this cell
Apply the configuration included in ServingCellConfigCommon,
Apply PCCH configuration FIG. 22 is a block diagram of a terminal according to an embodiment of the disclosure.

Figure 22:
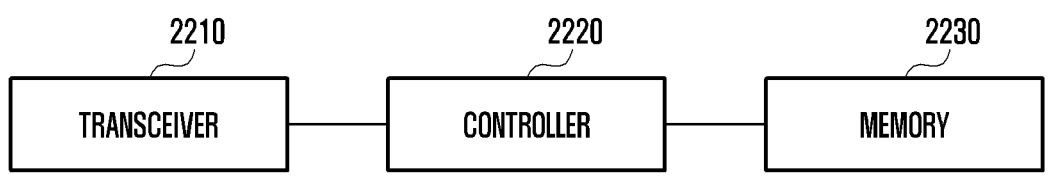
FIG. 22 is a block diagram of a terminal according to an embodiment of the disclosure.

Referring to FIG. 22, a terminal includes a transceiver 2210, a controller 2220 and a memory 2230. The controller 2220 may refer to a circuitry, an application-specific integrated circuit (ASIC), or at least one processor. The transceiver 2210, the controller 2220 and the memory 2230 are configured to perform the operations of the terminal illustrated in the figures, e.g. FIGS. 1 to 21, or described above. Although the transceiver 2210, the controller 2220 and the memory 2230 are shown as separate entities, they may be realized as a single entity like a single chip. Or, the transceiver 2210, the controller 2220 and the memory 2230 may be electrically connected to or coupled with each other.

The transceiver 2210 may transmit and receive signals to and from other network entities, e.g., a base station. The controller 2220 may control the terminal to perform functions according to one of the embodiments described above. The controller 2220 may refer to a circuitry, an ASIC, or at least one processor. In an embodiment, the operations of the terminal may be implemented using the memory 2230 storing corresponding program codes. Specifically, the terminal may be equipped with the memory 2230 to store program codes implementing desired operations. To perform the desired operations, the controller 2220 may read and execute the program codes stored in the memory 2230 by using a processor or a central processing unit (CPU).

Figure 23:
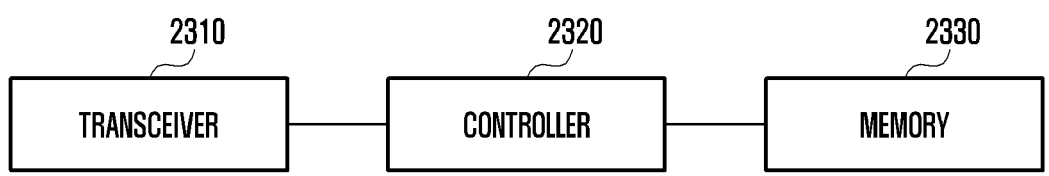
FIG. 23 is a block diagram of a base station according to an embodiment of the disclosure.

FIG. 23 is a block diagram of a base station according to an embodiment of the disclosure.

Referring to FIG. 23, a base station includes a transceiver 2310, a controller 2320 and a memory 2330. The transceiver 2310, the controller 2320 and the memory 2330 are configured to perform the operations of the network entity (e.g., gNB) illustrated in the figures, e.g. FIGS. 1 to 21, or described above. Although the transceiver 2310, the controller 2320 and the memory 2330 are shown as separate entities, they may be realized as a single entity like a single chip. The transceiver 2310, the controller 2320 and the memory 2330 may be electrically connected to or coupled with each other.

The transceiver 2310 may transmit and receive signals to and from other network entities, e.g., a terminal. The controller 2320 may control the base station to perform functions according to one of the embodiments described above. The controller 2320 may refer to a circuitry, an ASIC, or at least one processor. In an embodiment, the operations of the base station may be implemented using the memory 2330 storing corresponding program codes. Specifically, the base station may be equipped with the memory 2330 to store program codes implementing desired operations. To perform the desired operations, the controller 2320 may read and execute the program codes stored in the memory 2330 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal in a wireless communication system, the method comprising:
    identifying, by a radio resource control (RRC) entity, that a radio link failure is detected based on a random access problem indication obtained from a medium access control (MAC) entity for a random access procedure;
    identifying, by the RRC entity, whether the random access procedure was initiated for beam failure recovery;
    setting, by the RRC entity, radio link failure cause information as beam failure recovery failure based on the identification that the random access procedure was initiated for the beam failure recovery, for a report of the radio link failure;
    setting, by the RRC entity, the radio link failure cause information as random access problem, based on the identification that the random access procedure was not initiated for the beam failure recovery, for the report of the radio link failure; and
    transmitting, to a base station, the report of the radio link failure including the radio link failure cause information.

2. The method of claim 1,
    wherein the random access problem indication is obtained from the MAC entity of a master cell group (MCG), and the radio link failure is detected for a primary cell (PCell) of the MCG, or wherein the random access problem indication is obtained from the MAC entity of a secondary cell group (SCG), and the radio link failure is detected for a primary SCG cell (PSCell) of the SCG.

3. The method of claim 1, wherein the report of the radio link failure further comprises contention detected information based on whether the random access procedure was performed on contention based or not.

4. A method performed by a base station in a wireless communication system, the method comprising:
    performing a random access procedure with a terminal; and
    receiving, from the terminal, a report of a radio link failure including radio link failure cause information,
    wherein the radio link failure is detected by a radio resource control (RRC) entity, based on a random access problem indication from a medium access control (MAC) entity for the random access procedure,
    wherein the radio link failure cause information is set as beam failure recovery failure based on an identification that the random access procedure was initiated for the beam failure recovery, and
    wherein the radio link failure cause information is set as random access problem, based on the identification that the random access procedure was not initiated for the beam failure recovery.

5. The method of claim 4,
    wherein the random access problem indication is obtained from the MAC entity of a master cell group (MCG), and the radio link failure is detected for a primary cell (PCell) of the MCG, or
    wherein the random access problem indication is obtained from the MAC entity of a secondary cell group (SCG), and the radio link failure is detected for a primary SCG cell (PSCell) of the SCG, and
    wherein the report of the radio link failure further comprises contention detected information based on whether the random access procedure was performed on contention based or not.

6. A terminal in a wireless communication system, the terminal comprising:
    a transceiver configured to transmit and receive a signal; and
    a controller configured to:
        identify, by a radio resource control (RRC) entity, that a radio link failure is detected based on a random access problem indication obtained from a medium access control (MAC) entity for a random access procedure,
        identify, by the RRC entity, whether the random access procedure was initiated for beam failure recovery,
        set, by the RRC entity, radio link failure cause information as beam failure recovery failure based on the identification that the random access procedure was initiated for the beam failure recovery, for a report of the radio link failure,
        set, by the RRC entity, the radio link failure cause information as random access problem, based on the identification that the random access procedure was not initiated for the beam failure recovery, for the report of the radio link failure, and
        transmit, to a base station, the report of the radio link failure including the radio link failure cause information.

7. The terminal of claim 6,
    wherein the random access problem indication is obtained from the MAC entity of a master cell group (MCG), and the radio link failure is detected for a primary cell (PCell) of the MCG, or
    wherein the random access problem indication is obtained from the MAC entity of a secondary cell group (SCG), and the radio link failure is detected for a primary SCG cell (PSCell) of the SCG.

8. The terminal of claim 6, wherein the report of the radio link failure further comprises contention detected information based on whether the random access procedure was performed on contention based or not.

9. A base station in a wireless communication system, the base station comprising:
    a transceiver configured to transmit and receive a signal; and
    a controller configured to:
        perform a random access procedure with a terminal, and
        receive, from the terminal, a report of a radio link failure including radio link failure cause information,
    wherein the radio link failure is detected by a radio resource control (RRC) entity, based on a random access problem indication from a medium access control (MAC) entity for the random access procedure,
    wherein the radio link failure cause information is set as beam failure recovery failure based on an identification that the random access procedure was initiated for the beam failure recovery, and
    wherein the radio link failure cause information is set as random access problem, based on the identification that the random access procedure was not initiated for the beam failure recovery.

10. The base station of claim 9,
    wherein the random access problem indication is obtained from the MAC entity of a master cell group (MCG), and the radio link failure is detected for a primary cell (PCell) of the MCG, or wherein the random access problem indication is obtained from the MAC entity of a secondary cell group (SCG), and the radio link failure is detected for a primary SCG cell (PSCell) of the SCG.

11. The base station of claim 9, wherein the report of the radio link failure further comprises contention detected information based on whether the random access procedure was performed on contention based or not.

* * * * *